United States Patent Office 3,311,161
Patented Mar. 28, 1967

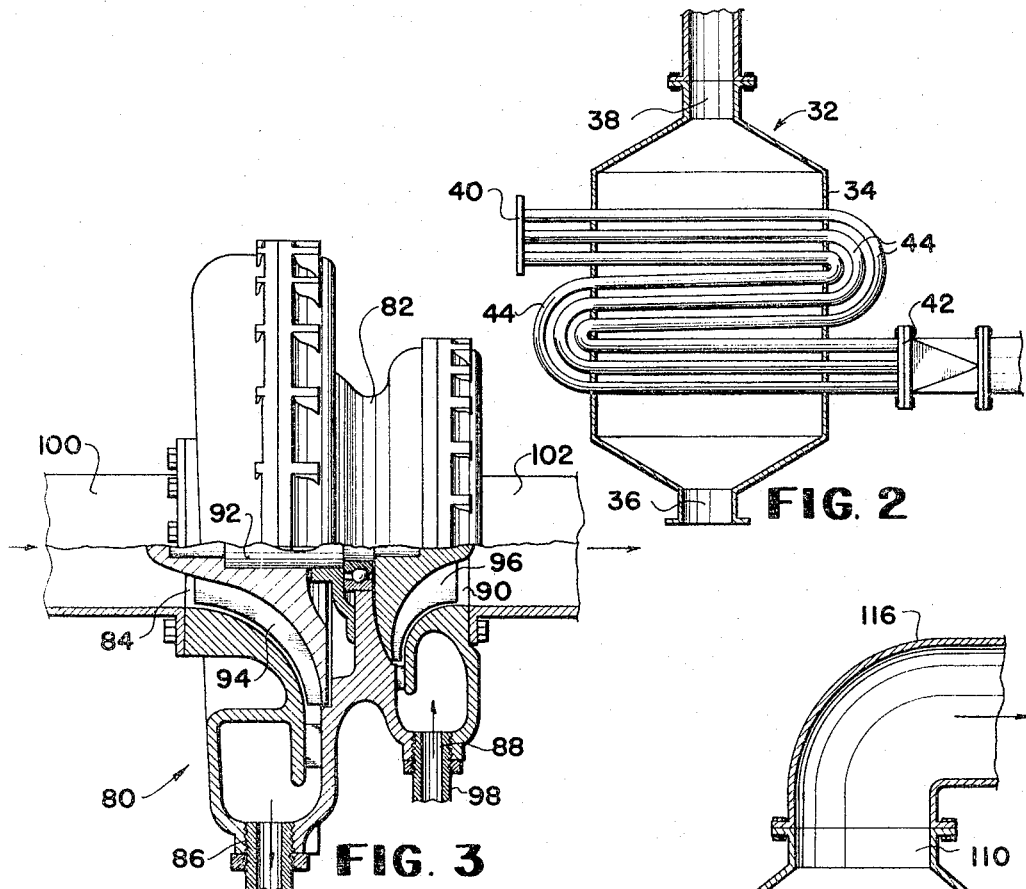
FIG. 2
FIG. 3
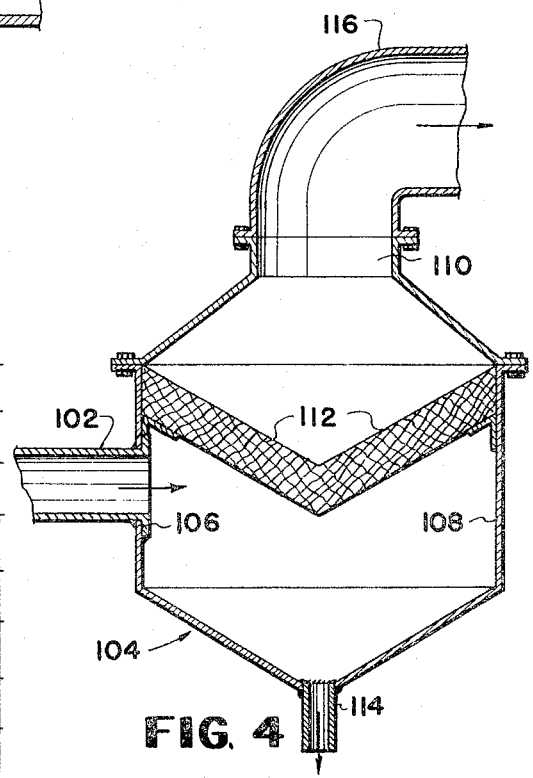
FIG. 4
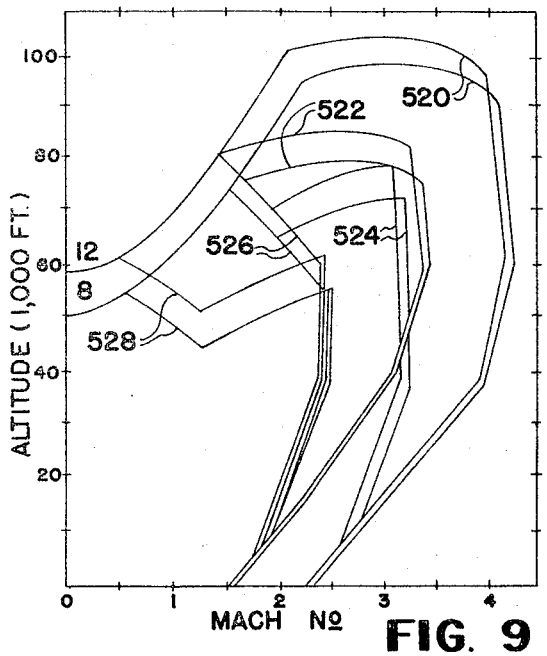
FIG. 9
INVENTOR.
DONALD L. GLASPIE
BY
ATTORNEY

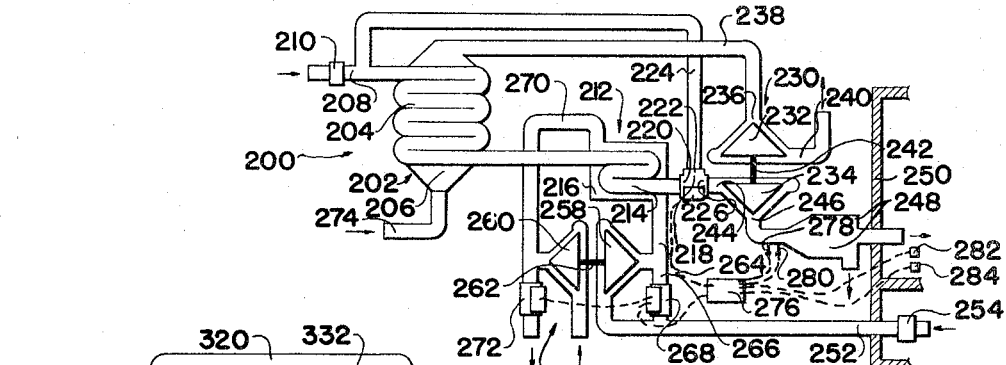

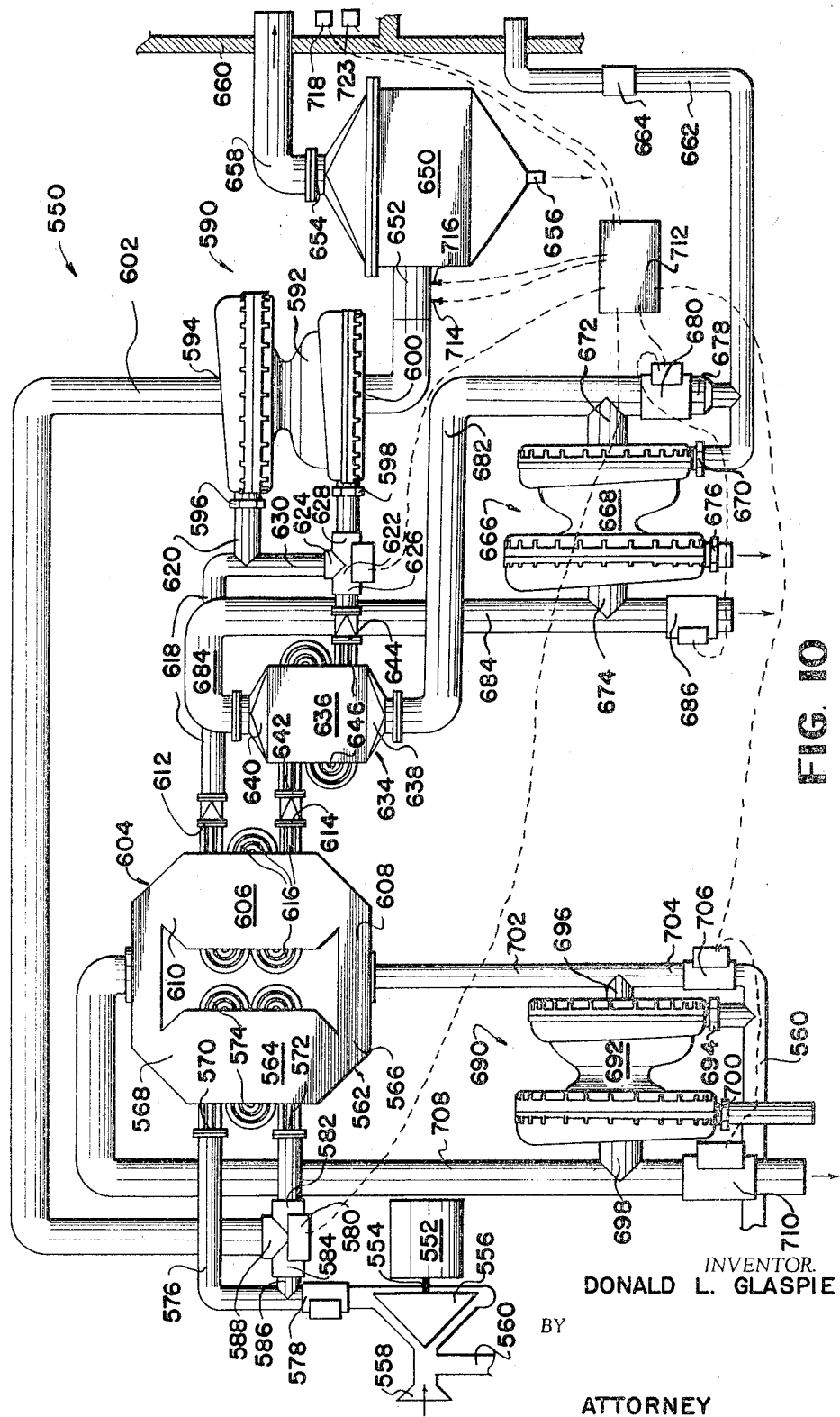

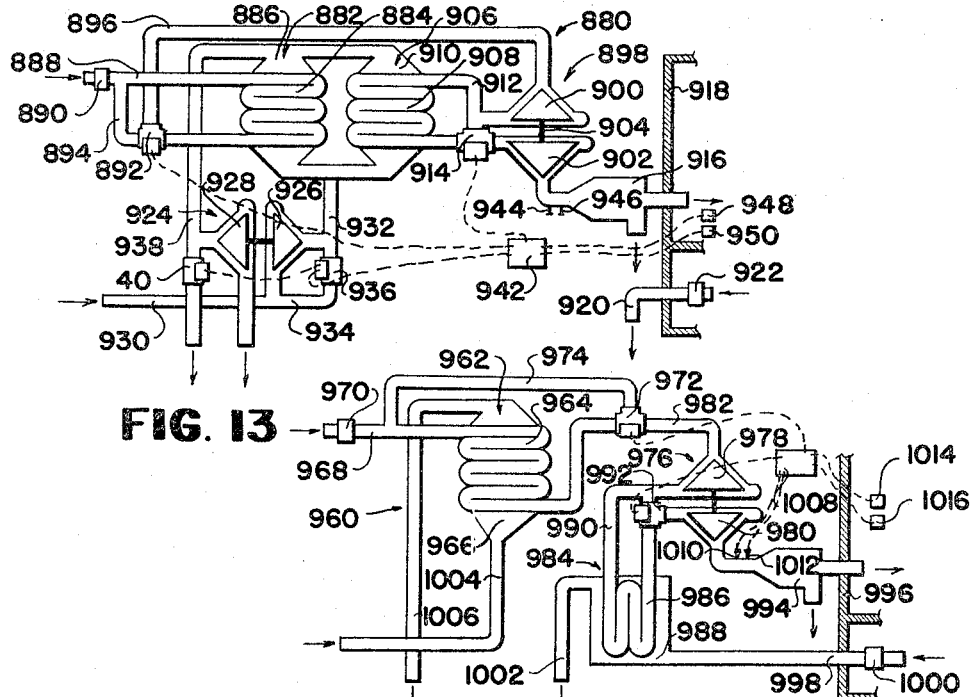
FIG. 13
FIG. 14
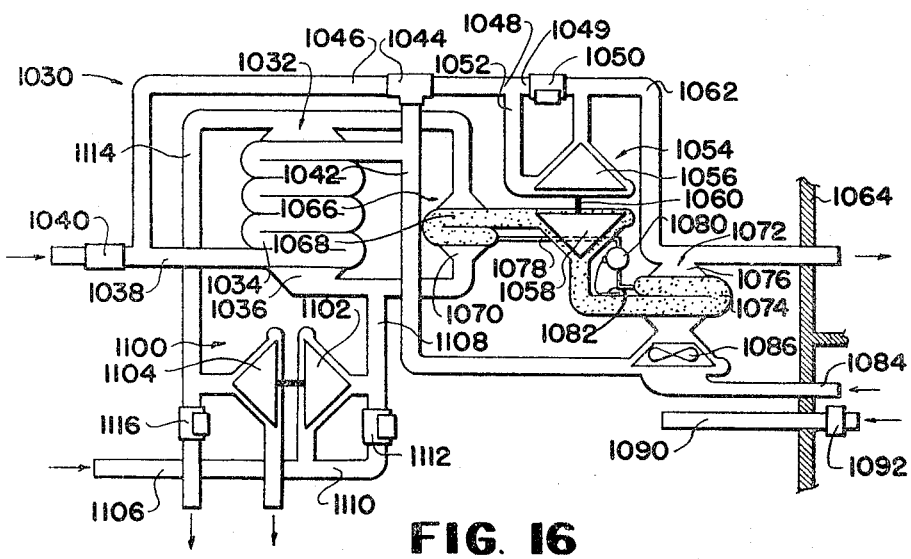
FIG. 16
INVENTOR.
DONALD L. GLASPIE
BY
ATTORNEY

3,311,161
CABIN AIR CONDITIONING SYSTEMS
FOR AIRCRAFT
Donald L. Glaspie, New Orleans, La., assignor to The Boeing Company, Wichita, Kans., a corporation of Delaware
Filed Sept. 9, 1963, Ser. No. 307,399
38 Claims. (Cl. 165—1)

This invention relates to air conditioning systems for aircraft and, more specifically, to method and means for air conditioning and pressurizing cabins of aircraft or the like. In a still more specific aspect, the invention relates to method and means for cooling streams of air or the like to be provided to an aircraft cabin, etc., and including means for mixing streams of air or other fluid at different temperatures to control the temperature of air or other fluid provided to the cabin.

Various air conditioning methods and means are known to the art, including air conditioning systems for aircraft cabins or the like. In many instances, the aircraft conditioning systems of the prior art provide for temperature control by mixing of high pressure air with the cooled air to be provided to the cabin immediately upstream of the cabin, and such results in the entrance of high velocity air into the cabin which is often undesirable. Also, in many instances, the cabin air is discharged from the cabin of the aircraft directly overboard, and is not fully utilized for other cooling functions such as occurs in some preferred embodiments of the invention. In addition, some of the prior art cabin air conditioning systems can be used only in aircraft which fly at relatively low altitudes and Mach numbers, such being undesirable in many modern aircraft.

In accordance with the present invention, new air conditioning method and means are provided. In a preferred air conditioning system of the invention, heat exchange means are provided having a high pressure side in heat exchange relation with a low pressure side, and the high pressure side is connectible to a source of fluid under pressure. Expansion cooling means are provided which has an inlet and an outlet with the inlet being operatively connected to the high pressure side of the heat exchange means to receive fluid therefrom for cooling in the expansion cooling means, and with the outlet of the expansion cooling means being operatively connected to an enclosure, such as an aircraft cabin, to be conditioned. Means are operatively connected to the low pressure side of the heat exchange means to provide a fluid thereto for cooling of the fluid in the high pressure side of the heat exchanger.

In the preferred method of the invention of controlling the temperature of a fluid to be provided to an enclosure of the invention, a first stream of fluid is passed through heat exchange means while simultaneously a second stream of fluid is directed through the heat exchange means in heat exchange relation with the first-named stream of fluid. The first stream of fluid is mixed with another stream of fluid having a different temperature, and the resulting mixture of fluids is expanded and directed into the enclosure to be conditioned.

Accordingly, it is an object of the invention to provide new methods and means for conditioning of air or other fluid provided to enclosures, such as to aircraft cabins.

Another object of the invention is to provide new simple air cycle air conditioning methods and means.

A further object of the invention is to provide new boot-strap air cycle air conditioning methods and means.

A still further object of the invention is to provide a new vapor cycle air conditioning methods and means.

Yet another object of the invention is to provide new cabin air conditioning systems for aircraft or the like wherein a stream of fluid is provided to the aircraft at a substantially constant or uniform pressure.

Still another object of the invention is to provide new cabin air conditioning systems for aircraft or the like wherein high pressure fluids to be provided to the aircraft cabin are expanded immediately upstream of the aircraft cabin with mixing of streams of fluids for regulation of temperature occurring upstream of the expansion means.

Another object of the invention is to provide new cabin air conditioning systems for aircraft or the like wherein air conditioning systems for aircraft or the like wherein recuperating heat exchangers are provided and utilize exhaust air from the cabin of the aircraft or the like for cooling of high pressure fluid to be provided to the aircraft.

A further object of the invention is to provide new cabin air conditioning systems having means for expanding and cooling low pressure air to be provided to the low pressure sides of heat exchanger means for cooling of a high pressure stream of fluid to be subsequently expanded and provided to a cabin or the like to be conditioned.

Another object of the invention is to provide new methods for controlling temperature of fluid to be provided to an enclosure, such as an aircraft cabin, wherein two streams of fluid of different temperatures are mixed and subsequently expanded for cooling with the resulting expanded cooled air being provided to the cabin or the like of the aircraft.

A further object of the invention is to provide new methods for conditioning air or other fluid to be provided to cabins of aircraft or the like wherein air is bled from the compressor of an engine of the aircraft and provided to the cabin, the system being usable with both relatively low and high bleed pressures.

Various other objects, advantages and features of the invention will become apparent to those skilled in the art from the following description taken in connection with the accompanying drawings, in which:

FIG. 2 is a view, partially in cross section, illustrating the construction of a heat exchanger usable with the systems of the invention.

FIG. 3 is a view, partially in cross section, illustrating the construction of a turbine-compressor unit usable with the systems of the invention.

FIG. 4 is a cross section view illustrating the construction of a water separator usable with the systems of the invention.

FIG. 5 is a diagrammatic view illustrating another preferred specific embodiment of the air conditioning and pressurization system for aircraft or the like of the invention.

FIG. 6 is a diagrammatic view of another preferred specific embodiment of the air conditioning and pressurization system of the invention.

FIG. 7 is a diagrammatic view illustrating another preferred specific embodiment of an air conditioning and pressurization system of the invention.

FIG. 8 is a diagrammatic view illustrating another preferred specific embodiment of an air conditioning and pressurization system for aircraft or the like of the invention.

FIG. 9 is a graph or diagram illustrating performance envelopes for the air conditioning and pressurization systems of FIGS. 1, 5, 6, 7, and 8.

FIG. 10 is a view illustrating another preferred specific embodiment of an air conditioning and pressurization system for cabins of aircraft or the like of the invention.

FIG. 13 is a diagrammatic view illustrating another preferred specific embodiment of an air conditioning and pressurization system of the invention.

FIG. 14 is a diagrammatic view illustrating another preferred specific embodiment of the air conditioning and pressurization system of the invention.

FIG. 16 is a diagrammatic view illustrating a preferred specific embodiment of a vapor cycle system for air conditioning and pressurization of aircraft cabins or the like.

Figure 1:
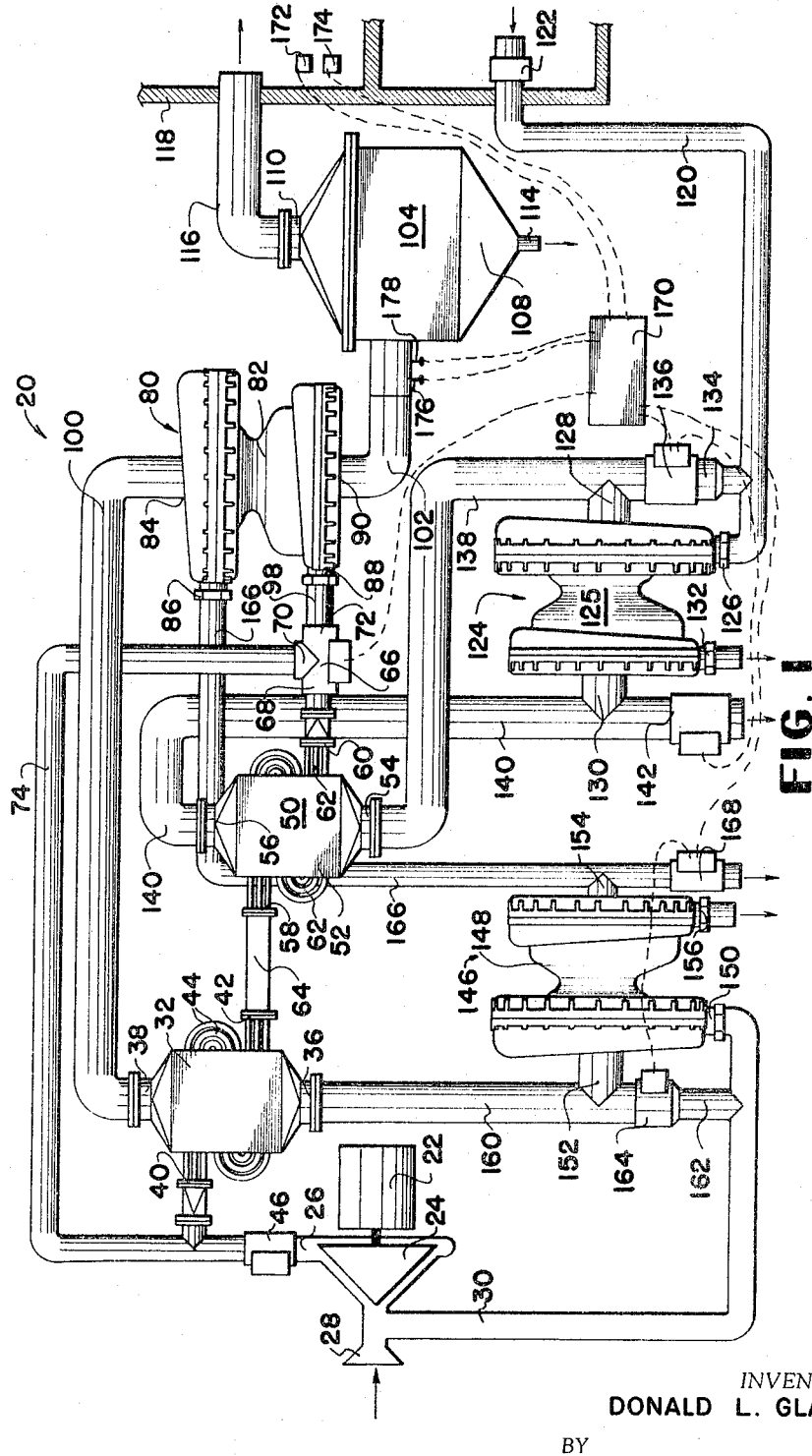
FIG. 1 is a view illustrating a preferred specific embodiment of an air cycle air conditioning and pressurization system for aircraft cabins and the like of the invention.

The following is a discussion and description of preferred specific embodiments of the airconditioning and pressurization systems for aircraft or the like and methods of air conditioning and pressurizing cabins for aircraft and the like of the invention, such being made with reference to the drawings whereon the same reference numerals are used to indicate the same or similar parts and/or structure. It is to be understood that such discussion and description is not to unduly limit the scope of the invention.

Referring now to the drawings in detail, a preferred specific embodiment of the air cycle air conditioning and pressurization system for aircraft and the like of the invention is shown generally at 20 in FIG. 1, and is constructed to receive a source of air or other fluids, preferably high pressure air, from a suitable source for conditioning prior to discharge of same into an aircraft cabin or the like. As illustrated in the drawings, a suitable engine 22 is provided to drive a compressor 24 of any suitable construction to provide a source of pressurized air or other fluid. If desired, the engine 22 and compressor 24 can be portions of a conventional aircraft power plant with pressurized air being bled from the engine compressor 24 into a high pressure air inlet conduit or the like 26 for subsequent conditioning prior to being discharged into the cabin of the aircraft or the like. The compressor 24 is fed through an air inlet 28 and ram air entering the inlet 28 can also be provided to a conduit 30 with the air entering conduit 30 being at a pressure and temperature somewhat greater than the atmospheric conditions surrounding the aircraft due to the ram effect of the air entering the inlet 28.

The air conditioning system 20 preferably includes precooling heat exchanger means for initial cooling of air from compressor 24. As illustrated in the drawings, the heat exchanger means 32 is preferably an air-to-air heat exchanger which can be constructed in the manner best illustrated in FIG. 2 of the drawings. The heat exchanger 32 as shown includes a housing 34 of any suitable configuration having a low pressure air inlet 36 at one end portion thereof and a low pressure air outlet 38 at the other end portion thereof. The heat exchanger 32 has a high pressure air inlet 40 and a high pressure air outlet 42 positioned intermediate the ends of housing 34 and a plurality of tubes or conduits 44 are connected in the end portions to the high pressure inlets 40 and 42 with the intermediate portions of the tubes 44 being positioned across the intermediate portion of the housing 34 of the heat exchanger so that air in the high pressure side of the heat exchanger is in heat exchange relation with air passing through the low pressure side of the heat exchanger.

The high pressure air inlet conduit 26 is operatively connected in the end portion to the air inlet 40 of the heat exchanger 32 and a pressure limiting valve 46 is desirably provided in conduit 26 to regulate pressure of air or other fluid entering the air conditioning and pressurization system. Pressure limiting valves are commercially available and valve 46 can be of any suitable construction.

An air-to-air recuperating heat exchanger, shown generally at 50, is preferably provided and the heat exchanger 50 can be of the same or similar construction as that illustrated in FIG. 2 and described hereinbefore. The heat exchanger 50 includes a housing 52 having a low pressure inlet 54 for air or other fluids and a low pressure outlet 56 for the fluid and a high pressure inlet 58 and a high pressure outlet 60 for air or other fluid. Tubes 62 are connected in the end portions to the high pressure air inlet 58 and the high pressure air outlet 60 and have the intermediate portions thereof positioned across the intermediate portion of housing 52. The high pressure air outlet 42 of heat exchanger 32 is preferably operatively connected to the high pressure air inlet 58 of the heat exchanger 50 by suitable means, such as by a conduit or the like 64.

A mixing valve 66 is provided and has two fluid or air inlets 68 and 70 and a fluid or air outlet 72 and the inlet 68 is preferably operatively connected to the high pressure outlet 60 of heat exchanger 50 to receive high pressure air or other gaseous fluids therefrom. The other air inlet 70 of valve 66 is connected to one end portion of a tube or conduit 74 which has the other end portion connected to the high pressure air inlet conduit 26 between the pressure limiting valve 46 and the high pressure air inlet 40 of heat exchanger 32. The mixing valve 66 is operable to receive and pass air therethrough from the high pressure air conduits 74 and 26, from the outlet 60 of the recuperating heat exchanger 50, or to mix air from the conduit 74 and from the heat exchanger 50 and discharge the resulting mixture of air or other fluid through the outlet 72 of the valve.

A first turbine-compressor unit is shown generally at 80 in FIGS. 1 and 3 and includes a housing 82 having a compressor inlet 84 and outlet 86 for air or other gaseous fluids and a turbine inlet 88 and outlet 90 for the same or similar fluids. A shaft 92 is rotatably mounted in the housing 82 and a plurality of vanes 94 are connected to one end portion of the shaft 92 for rotation therewith and the vanes 94 are shaped and positioned to receive fluid from the compressor air inlet 84 and compress same therein and discharge the compressed air through the compressor air outlet 86.

A plurality of blades 96 are connected to the other end portion of the shaft 92 for rotation therewith. The blades 96 are positioned in the housing 82 to be engaged by pressurized air or other gaseous fluids entering the turbine inlet 88 to cause rotation of the blades and the shaft 92 and thereby move the vanes 94 for compression of air or other fluids with work being done by the turbine portion of the turbine-compressor unit resulting in expansion and cooling of the gaseous fluids passing therethrough. The resulting cooled and expanded gaseous fluid passes through the outlet 90 of the turbine portion of the unit. The turbine inlet 88 is operatively connected to the outlet 72 of valve 66, such as by a conduit 98 or other suitable means to receive cooled high pressure air therefrom for expansion and cooling in the turbine portion of the unit 80. The compressor air inlet 84 is operatively connected by tube or conduit means 100 to the outlet 38 of the low pressure side of the heat exchanger 32. The outlet 90 of the turbine portion of the turbine-compressor unit is connected to one end portion of a tube or conduit 102 and the other end portion of the conduit 102 is connected to a suitable water separator unit 104 at the inlet 106 thereof.

The construction of the water separator 104 is best illustrated in FIG. 4 and includes a housing 108 having the air inlet 106 at a side portion thereof and an outlet 110 for air or other gaseous fluid at an upper portion thereof and a porous element 112 of suitable construction is positioned between the inlet 106 and outlet 110 thereof so that air passing therethrough passes through the element 112. The element 112 is constructed and adapted to remove moisture from air or other fluids passing therethrough and normally functions as a result of condensation of moisture on the element 112. As water is collected on element 112, it is discharged in droplets to the lower portion of housing 108 and is discharged through an outlet 114. Water leaving the outlet 114 of the water separator can be discharged overboard the aircraft or the like or such can be used to cool low pressure air passing through the heat exchanger in the manner shown and described in my co-pending patent application entitled Temperature and Humidity Conditioning Systems for Enclosures or the Like, Ser. No. 307,687, filed September 9, 1963, now U.S. Patent No. 3,222,883. The outlet 110 of the water separator 104 is connected to one end portion of a tube or conduit 116 and the other end portion thereof is connectible to an aircraft cabin 118 or other enclosure to transfer cooled and dried air into the cabin.

A cabin air outlet or exhaust conduit 120 is preferably provided and has one end portion thereof positionable in the aircraft cabin 118. A common pressure regulating valve 122 of any suitable construction is secured to the end portion of the tube or conduit 120 in the cabin 118. The regulating valve 122 can be set to open at a pre-determined pressure of air or fluid in the cabin 118 to exhaust a portion of the air or fluid from the aircraft and, when the pressure in the aircraft decreases below the desired pressure, the valve 122 automatically closes to maintain the desired pressure in the cabin 118.

A second turbine-compressor unit is shown generally at 124 and includes a turbine air inlet 126, a turbine air outlet 128, a compressor air inlet 130, and a compressor air outlet 132 which project from the housing 125 of the unit. The turbine-compressor unit 124 can be of the same or similar construction as the unit 80 illustrated in FIG. 3 of the drawings. The turbine air inlet 126 is connected to the other end portion of the tube or conduit 120 to receive air or other gaseous fluids exhausted from the aircraft cabin 118 with the air thus received being expanded and thus cooled and reduced in pressure as it passes through the turbine portion of unit 124 and the air is discharged through the outlet 128.

A bypass conduit or tube 134 is operatively connected to the turbine air inlet 126 and turbine air outlet 128 to bypass air from the cabin 118 around the turbine when additional cooling of this air is not needed. A control valve 136 is provided in conduit 134 to control passage of exhaust air from the cabin either through the turbine or around the turbine of the unit 124. Another tube or conduit 138 is operatively connected in the end portions to the turbine air outlet 128 of the unit 124 and to the low pressure air inlet 54 of the heat exchanger 50 to provide cool and low pressure air to the heat exchanger 50 for cooling of high pressure air or other fluid passing through the tube or conduit 62.

A tube or conduit 140 is connected in one end portion to the low pressure outlet 56 of housing 52 of the recuperating heat exchanger 50 and is connected in an intermediate portion to the compressor air inlet 130 of the unit 124. Suitable control valve means 142 is secured to the other end portion of the conduit or tube 140 downstream from the inlet 130 of the compressor of the unit 124 and the valve 142 is operable to regulate flow of air to the compressor or to bypass same. Air or other fluids being discharged through the compressor outlet 132 or through the end portion of conduit or tube 140 through valve 142 therein can be discharged overboard the aircraft or used for other suitable purposes.

A third turbine-compressor unit is provided and is shown generally at 146 and includes a housing 148 with a turbine inlet 150 for air or other gaseous fluids and an outlet 152 for the turbine portion of the unit. Also, a compressor inlet 154 for air or other suitable fluids and an outlet 156 are also provided. The unit 146 can be of the same or similar construction to the units 80 and 124 described hereinbefore. The turbine air inlet 130 is connected to an end of the ram air inlet conduit 30 to provide air thereto under pressure during flight of the aircraft. Ram air entering the turbine portion of the unit 146 is expanded and is discharged through the outlet 152 at a reduced temperature and pressure and flows into one end of a tube or conduit 160 which is connected in the other end to the low pressure inlet 36 for air or fluid of the heat exchanger 32 to provide cool, low pressure air to the heat exchanger for cooling of high pressure fluid flowing through the tubes or conduits 44 therein. A bypass conduit 162 having a control valve 164 therein is operatively connected across the turbine inlet 150 and outlet 152 and the valve means 164, when opened, bypasses air or other fluid around the turbine portion of unit 146 so that when less cooling capacity is required the turbine portion of the unit 146 can be bypassed to result in less cooling of the high pressure air in the pre-cooling heat exchanger 32.

Another tube or conduit 166 is connected in one end portion to the compressor outlet 86 of the first turbine-compressor unit 80 and is connected in an intermediate portion to the compressor inlet 154 of the turbine-compressor unit 146 so that air from the low pressure side of pre-cooling heat exchanger 32 can be provided through tube or conduit 100 to the compressor portion of the unit 80 for compression therein and subsequently provided through tube or conduit 166 to the compressor portion of the unit 146 for further compression therein and discharge through the outlet 156 to the atmosphere or for other uses. A control valve 168 is provided in the end portion of tube or conduit 166 downstream from the compressor inlet 154 of the unit 146 so that air in tube or conduit 166 can be bypassed around the compressor portion of the turbine-compressor unit 146.

Preferably, means are provided to automatically operate the various valves controlling operation of the system of the invention. For this purpose, common valve control means 170 of any suitable construction are provided and are operatively connected to the mixing valve 66 and to control valves 136, 142, 164, and 168. As will be observed from FIG. 1 of the drawings, the control or bypass valves 136 and 142 are connected together to be operated in unison and likewise the control or bypass valves 164 and 168 are connected to be operated simultaneously.

The valve control means 170 is desirably thermostatically operated and has a regulator or temperature sensing and control element 172 positionable in the aircraft cabin or the like 118 which can be adjusted by the pilot or other in the aircraft to obtain the desired temperature. Likewise, an on-off switch 174 is desirably provided in the cabin 118 to initiate or terminate operation of the entire system.

Temperature sensing means are provided with the valve control means 170 and preferably two temperature sensing elements 176 and 178 are provided in conduit 102 downstream of the outlet 90 of the turbine portion of the unit 80. Where two temperature sensing elements 176 and 178 are provided, one is for the high temperature limit and the other is for the low temperature limit which together function to prevent icing in the water separator means 104 and to limit maximum temperature of air or other fluids provided to the cabin or the like 118. The temperature of air or other fluid passing through the conduit 102 is sensed by the elements 176 and 178, and transmitted to the control means 170 which functions in cooperation with the thermostat element 172 in the cabin or the like 118 to operate the mixing valve 66 and the bypass valves 136, 142, 164 and 168.

In operation, pressurized air from the compressor 24 is provided through conduit 26 and valve 46 to the high pressure inlet 40 of the pre-cooling heat exchanger 32 and the high pressure air is circulated through tubes or conduits 44 therein. Simultaneously, ram air from the atmosphere entering air inlet 28 of the engine passes into tube or conduit 30 and is provided to the turbine air inlet 150 of the unit 146 for expansion and cooling therein. The resulting cooled low pressure air is discharged through the turbine outlet 152 and passes through tube or conduit 160 into the low pressure side of the pre-cooling heat exchanger 32 to cool the high pressure air circulating through the tubes 44. The low pressure air leaving the low pressure side of the heat exchanger 32 flows through conduit 100 and into the compressor portion of the turbine-compressor unit 80 where it is compressed and discharged into tube or conduit 166 and is thus provided to the compressor portion of turbine-compressor unit 146 for further compression therein and discharged therefrom overboard the aircraft.

The high pressure air thus cooled in pre-cooling heat exchanger 32 is discharged into the tube or conduit 64 and provided to the high pressure side of the recuperating heat exchanger 50. The high pressure air flows through the tubes 62 in the high pressure side of the heat exchanger 50 and simultaneously cabin exhaust air is provided to the turbine portion of the turbine-compressor unit 124 for expansion and cooling therein and discharged therefrom through tube or conduit 138 to the low pressure side of the recuperating heat exchanger. The low pressure air from the recuperating heat exchanger is drawn through the tube or conduit 140 into the compressor portion of unit 124 and discharged overboard the aircraft. The high pressure air cooled in the recuperating heat exchanger 50 is provided to the mixing valve 66 and other high pressure, relatively warm air directly from compressor 24 can be provided through the tubes or conduits 26 and 74 to the other inlet 70 of the mixing valve 66. The mixing valve 66 is operated by the valve control means 170 in response to temperature conditions in the cabin 118 to provide air to the outlet 72 of the valve 66 either entirely from the inlet 68, entirely from the inlet 70, or a mixture of high pressure air from both sources. The resulting mixture of air is expanded in the turbine portion of the turbine-compressor unit 80 and does work in the associated compressor and is discharged through conduit 102 into water separator 104 where moisture or water is removed from the air passing therethrough with the resulting cooled and dried air being discharged through the tube or conduit 116 into the cabin or the like 118.

Pressure regulation of air or other fluid within the cabin 118 is accomplished by operation of the pressure regulating valve 122 connected to tube or conduit 120, the valve 122 being openable at a pre-determined pressure, for example, approximately 13 to 15 p.s.i.a., and is closeable at lower pressures to thereby maintain the desired pressure in the cabin. Since mixing of the high pressure air occurs upstream of the turbine portion of unit 80, and not downstream thereof, pressure regulation is greatly facilitated, all high pressure air being expanded uniformly in the turbine portion of unit 80.

When it is not necessary to cool the air received through inlet 28 of the air inlet structure, or when heating is desired, the heat exchangers 32 and 50 high-pressure sides can be bypassed by operation of the mixing valve 66 to draw high pressure air entirely from conduit or tube 74. Also, where only moderate cooling is desired, one or both of the turbines of the units 124 and 146 can be bypassed by operation of the control valves 136, 142, 164 and 168. Thus, full and accurate control of the air or other fluid being cooled, heated or otherwise conditioned, is obtained by the system of the invention.

Considering now the operation of the specific embodiment of the air conditioning and pressurization system of the invention shown in FIG. 1, when the aircraft or the like is flying at an altitude of approximately 90,561 feet at a velocity of about Mach 4.08 and where the ambient temperature of the atmospheric air is about 440.8° Rankine at a pressure of approximately .241 p.s.i.a., and considering the engine pressure ratio or bleed pressure ratio is 8, then the air entering the air inlet 28 is increased in temperature and pressure as a result of the ram effect and the air entering the compressor 24 has a temperature of approximately 1908.6° R. and a pressure of approximately 16.25 p.s.i.a., the ram air is compressed in compressor 24 and discharged therefrom at a temperature of approximately 3973.7° R. and a pressure of about 130 p.s.i.a. As this high pressure air passes through the pre-cooling heat exchanger 32, it is cooled to a temperature of about 1535.5° R., and passes through the recuperating heat exchanger 50 where it is further cooled and leaves the heat exchanger 50 at a temperature of about 617.6° R. Assuming the air passes directly therefrom through the turbine of the unit 80, the air is expanded and leaves the turbine at a temperature and pressure of about 495° R. and 13 p.s.i.a. This is the temperature and pressure of the air as it enters the cabin 118 and the pressure is maintained therein by operation of the valve 122. The valve 122 opens at a pre-determined pressure to permit exhaust air to enter the conduit 120 and the air leaves the cabin at a temperature of about 617.6° R. and a pressure of about 10.9 p.s.i.a. This exhaust air is expanded and thus cooled in the turbine portion of the unit 124 and leaves same and enters the low pressure side of the recuperating heat exchanger 50 at a temperature of about 409.2° R. and a pressure of about 1.09 p.s.i.a. A portion of the ram air which enters the air inlet 28 at about 1908.6° R. and 16.25 p.s.i.a. is provided to turbine-compressor unit 146 and is expanded in the turbine of the unit 146 and leaves the turbine outlet 152 and flows into the low pressure side of the pre-cooling heat exchanger 32 at a temperature of about 1264.6° R. and a pressure of about 1.63 p.s.i.a. This low pressure air passes through the compressors of units 80 and 146 and is then discharged overboard the aircraft.

The foregoing operating conditions for the air conditioning and pressurization system of FIG. 1 have been calculated from the conditions of altitude, velocity, ambient air conditions and bleed pressure ratios set forth hereinbefore in order to illustrate operation of the system under specific conditions and it will be understood that these values are variable due to efficiencies of heat exchangers and other equipment and also variable with altitude and velocity of the aircraft. This example is given by way of illustration and is not to unduly limit the scope of the invention.

Another preferred specific embodiment of an air cycle air conditioning and pressurization system for aircraft or the like of the invention is illustrated generally at 200 of FIG. 5 and includes a heat exchanger 202 having a high pressure side 204 and a low pressure side 206 in heat exchange relation and the heat exchanger 202 can be of the same or similar construction as that illustrated in FIG. 2 and described hereinbefore. A high pressure air inlet conduit 208 is connected in one end portion to the inlet of the high pressure side 204 of the heat exchanger 202 and the high pressure side 204 of the heat exchanger 202 and the high pressure air inlet 208 is connectible in the other end portion to a suitable source of compressed air, such as an engine compressor as described in connection with FIG. 1. A pressure limiting valve 210 is desirably provided in conduit 208 upstream of the inlet of the high pressure side of heat exchanger 202 to limit the maximum pressure of air or other gaseous fluids supplied to the system.

A recuperating heat exchanger shown generally at 212 is provided and can be of the same or similar construction shown in FIG. 2 and described hereinbefore. Heat exchanger 212 includes a high pressure side 214 and a low pressure side 216 in heat exchange relation with the high pressure side. The inlet to the high pressure side 214 of heat exchanger 212 is connected to the outlet of the high pressure side 204 of heat exchanger 202 to receive high pressure air or other fluid therefrom for further cooling therein.

A proportional type mixing valve 218 has an inlet 220 operatively connected to the outlet of the high pressure side 214 of the heat exchanger 212 and another inlet 222 is connected to one end portion of a tube or conduit 224 which has the other end portion thereof connected to the high pressure air inlet conduit 208 between valve 210 and the inlet of the high pressure side 204 of the heat exchanger 202. The mixing valve 218 is operable to receive and discharge high pressure air or other fluid from the recuperating heat exchanger 212 and/or from the high pressure air inlet conduit 208 and discharge same through the outlet 226 of the valve.

A first turbine-compressor unit 230 having a compressor 232 and a turbine 234 is provided and includes a compressor inlet 236 for air or other gaseous fluids which is connected to one end portion of a conduit or tube 238 with the other end portion of the tube 238 being connected to the low pressure outlet of the heat exchanger 202. Compressed fluid from the outlet 240 of the compressor 232 can be discharged to the atmosphere.

The compressor 232 and turbine 234 are desirably mounted on a single shaft 242 so that operation of the turbine 234 drives the compressor 232. The turbine-compressor unit 230 can be of the same or similar construction as that illustrated in FIG. 3 and described in detail hereinbefore.

The turbine inlet 244 is operatively connected to the outlet 226 of mixing valve 218 to receive high pressure air therefrom and, in operation, high pressure air is expanded in turbine 234 and is discharged through the outlet 246 thereof at a temperature and pressure less than the incoming high pressure air.

A water separator 248 is provided and can be of the same or similar construction to the water separator shown in FIG. 4 and described hereinbefore. Separator 248 has an inlet operatively connected to the outlet 246 of turbine 234 to receive cool air therefrom and the separator is operable to remove moisture or water from air or other gaseous fluids passing therethrough. The outlet of the water separator 248 is operatively connected to an airplane cabin or the like 250 to provide cool and dried air thereto.

A cabinet outlet conduit 252 has one end portion positioned in the cabin 250 and a cabin pressure regulating valve 254 is secured to the conduit 252 and is operable to open at a predetermined pressure and exhaust cabin air into the conduit or tube 252. A second turbine-compressor unit is shown generally at 256 and includes a turbine 258 and a compressor 260 which are preferably mounted on a common shaft 262. The turbine-compressor unit 256 can be of the same or similar construction as that illustrated in FIG. 3 and described hereinbefore. The other end portion of the cabin air outlet conduit 252 is connected to the inlet of the turbine 258 of the turbine-compressor unit 256 with cabin exhaust air provided to the turbine being expanded and cooled therein and discharged into a conduit or tube 264 connected to the low pressure side 216 of the recuperating heat exchanger 212 to thereby provide cooling air to the heat exchanger 212 for cooling of high pressure air passing through the high pressure side 214 thereof. A bypass conduit 266 having a control valve therein is preferably provided between the conduit 252 or the turbine air inlet and the turbine air outlet of the unit 256 to bypass cabin exhaust air around the turbine when less cooling capacity is required in the recuperating heat exchanger 212. A tube or conduit 270 is connected to the outlet of the low pressure side 216 of the recuperating heat exchanger 212 and to the inlet of the compressor 260 of the turbine-compressor unit 256. A control valve 272 is connected to the end portion of conduit 270 downstream of the inlet to the compressor 260 and operates in connection with the control valve 268 to bypass air around the turbine-compressor unit 256.

Air to the low pressure side 206 of the pre-cooling heat exchanger 202 is provided through a ram air conduit 274 which is connected in one end portion to the low pressure side of heat exchanger 202 and is connectible in the other end portion to a source of ram air, such as to the ram air inlet 28 of an engine or the like as illustrated in FIG. 1.

Thermostat operated valve control means 276 are provided and includes temperature sensing elements 278 and 280 positionable at the turbine outlet 246 and a thermostat or regulator 282 and on-off switch 284 positionable in the cabin 250 so that the pilot or others in the cabin can regulate the temperature of the air or other fluid provided thereto. The valve control means 276 and associated structure are operatively connected to the mixing valve 218 and to the control valves 268 and 272 to operate same in response to the temperature conditions in the cabin and the valve control means can be of the same or similar construction as that described in connection with FIG. 1.

The operation of the air conditioning and pressurization system 200 of FIG. 5 is similar to that described hereinbefore in connection with FIG. 1 except that the turbine-compressor unit used to cool low pressure air provided to the pre-cooling heat exchanger in FIG. 1 has been eliminated and ram air through conduit 274 is used for this purpose. The system of FIG. 5 is usable in situations where less cooling capacity is required than with the system of FIG. 1 and will normally be usable at lower altitudes and slower Mach numbers than the system of FIG. 1.

Another preferred specific embodiment of an air cycle air conditioning and pressurization system for aircraft or the like of the invention is illustrated generally at 300 in FIG. 6 of the drawings. The air conditioning and pressurization system 300 includes a pre-cooling heat exchanger 302 which has a high pressure side 304 and a low pressure side 306 in heat exchange relation and the inlet of the high pressure side 304 is connected to one end of a high pressure air inlet conduit 308. The other end portion of the conduit 308 is connectible to a source of air or other fluid under pressure, such as an engine compressor as shown at 24 in FIG. 1. A pressure limiting valve 310 is located in the high pressure air inlet conduit 308 to limit the pressure or air or other fluid being provided to the system of the invention.

A recuperating air-to-air heat exchanger is shown generally at 312 and includes a high pressure side 314 and low pressure side 316 and the inlet of the high pressure side 314 is operatively connected to the outlet of the high pressure side 304 of the heat exchanger 302. A proportional type mixing valve 318 is provided and one inlet of the valve 318 is operatively connected to the outlet of the high pressure side 314 of the heat exchanger 312. Another inlet of the valve 318 is connected to a tube or conduit 320 and the other end portion of the tube or conduit 320 is connected to the high pressure air inlet conduit 308 between valve 310 and the heat exchanger 302 to thereby provide high pressure air or other fluid to the mixing valve 318. Valve 318 operates in response to temperature conditions in the enclosure to be conditioned to mix air or other fluid from the high pressure side 314 of heat exchanger 312 and from conduit 320 or to supply air thereto from either of these sources.

A first turbine-compressor unit is shown generally at 322 and includes a compressor 324 and a turbine 326 which preferably have a common shaft 328. The inlet to the compressor 324 is connected to a tube or conduit 330 which is connected to the low pressure outlet of the heat exchanger 302 and another tube or conduit 332 is connected in the end portion to the low pressure outlet of the heat exchanger 312 and to the tube or conduit 330 so that the compressor 324 draws low pressure air from both of the heat exchangers 302 and 312.

The inlet of the turbine 326 is operatively connected to the outlet of the mixing valve 318 with high pressure fluid received by the turbine 326 being expanded and thereby cooled and reduced in pressure as it passes through the turbine 326. The outlet of turbine 326 is operatively connected to the inlet of a water separator means 331 of any suitable construction which functions to remove water or moisture from air or other fluids passing therethrough. The outlet of the water separator means 331 is operatively connected to the cabin 333 of an aircraft or other means to be conditioned.

A cabin pressure regulating valve 336 is connected to one end portion of a cabin air outlet tube or conduit 338 which is positionable in the cabin or the like 333 to receive cabin exhaust air therefrom and the valve 336 operates to open at a pre-determined pressure in the cabin 333 to exhaust cabin air therefrom through the conduit 338. The other end portion of the conduit 338 is connected to the low pressure side 316 of the recuperating heat exchanger 312 to provide low pressure relatively cool air thereto for cooling of the relatively high temperature air in the high pressure side 314 of the heat exchanger 312.

A second turbine-compressor unit is shown generally at 340 and includes a turbine 342 and a compressor 344 which preferably operate from a common shaft 346 and the turbine-compressor unit 340 can be of the same or similar construction to like units described hereinbefore. A ram air inlet conduit 348 is connectible in one end portion to a source of air or other fluid and is connected in the other end portion to the inlet of the turbine 342 and, in operation, the turbine expands and cools air or other fluid provided thereto through conduit 348. The outlet of turbine 342 is connected to a tube or conduit 350 which is also connected to the low pressure side 306 of the pre-cooling heat exchanger 302 to provide cooling air thereto operation. A bypass conduit 352 having a control valve 354 therein is preferably provided and the conduit 354 is connected across the inlet and outlet of the turbine 342 or across the outlet and to the tube or conduit 348 so that when valve 354 is open ram air or other fluid from conduit 348 is bypassed around turbine 342 and supplied directly to the heat exchanger 302, such being desirable when minimum cooling is required in heat exchanger 302.

Another tube or conduit 356 is connected in one end portion to the outlet of the compressor 324 of the turbine-compressor unit 322 and in an intermediate portion to the inlet of the compressor 344 of the turbine-compressor unit 340 with air compressed in compressor 344 being discharged overboard the aircraft. A further control valve 358 is secured to the other end portion of the conduit 356 and, when opened, is operable to bypass the compressor 344, the valves 354 and 358 preferably operating in unison so that both the turbine 342 and compressor 344 are bypassed or utilized.

Valve control means 360 is provided and includes temperature sensing means 362 and 364 positioned between turbine 326 and water separator means 331 and such are preferably high and low temperature sensing means to prevent freezing of air in the water separator 331 and to limit maximum temperature of air or other fluid provided to the cabin 333. A thermostat or temperature regulating means 366 and an on-off switch 368 are positioned in the cabin 333 and operatively connected to the valve control means 360 to operate same. Valve control means 360 is operatively connected to the mixing valve 318 and to the control valves 354 and 358 to operate same in response to temperature conditions in the cabin 333.

The temperature and pressurization system for aircraft cabins or the like shown at 300 in FIG. 6 operates in a manner similar to that set forth hereinbefore in detail in regard to FIG. 1 of the drawings and in this instance, cabin exhaust air is not cooled before being provided to the low pressure side of the recuperating heat exchanger so that the maximum cooling of the system 300 is somewhat less than the system 20 of FIG. 1. The system 300 is preferably usable in aircraft or the like operating at somewhat lower altitudes and slower Mach numbers than the systems of FIGS. 1 and 5. It will be understood by those skilled in the art that the construction of the heat exchangers, turbine-compressor units, water separator means and the like of system 300 can be the same or similar as that shown and described in detail in connection with FIGS. 1–4.

Another preferred specific embodiment of an air cycle air conditioning and pressurization system for aircraft or the like of the invention is illustrated generally at 400 in FIG. 7 of the drawings. The system 400 includes an air-to-air heat exchanger shown generally at 402 which includes a high pressure side 404 and a low pressure side 406 which are in heat exchange relation so that relatively cool air or fluids passing through the low pressure side 406 will cool air or other fluid passing through the high pressure side of 404 thereof. A high pressure inlet conduit 408 for air or other fluids is connected in one end portion to the high pressure side 404 of the heat exchanger 402 and is connectible in the other end portion to a source of air under pressure or other fluid. A pressure limiting valve 410 is positioned in the conduit 408 between the source of pressurized air or other fluid and the high pressure side 404 of the heat exchanger 402 and operates to limit maximum pressure of air or other fluid provided to the system.

A mixing valve 412 has one inlet thereof operatively connected to the high pressure side 404 of heat exchanger 402 and another inlet of the valve 412 is connected to one end portion of a tube or conduit 414. The other end portion of tube or conduit 414 is connected to the high pressure inlet conduit 408 between valve 410 and the heat exchanger 402 and mixing valve 412 is operable to mix high pressure fluids from heat exchanger 402 and conduit 414 or to pass fluid from either of these sources therethrough and out the outlet end thereof.

A turbine-compressor unit, shown generally, at 416, is provided and includes a compressor portion 418 and a turbine portion 420 which are desirably operated from a single shaft 422. The compressor 418 has an inlet operatively connected to one end portion of a tube or conduit 424 which is also connected to the outlet of the low pressure side 406 of heat exchanger 402 to receive fluid therefrom. The inlet of the turbine 420 is operatively connected to the outlet of the mixing valve 412 to receive high pressure fluid therefrom and, in operation, the high pressure fluid passes through the turbine 420 and is expanded and cooled therein to reduce the temperature and pressure of the fluid with operation of the turbine 420 driving the compressor 418 through shaft 422. The outlet of the turbine 420 is operatively connected to the inlet of water separator means 426 which functions to remove moisture or water from air or other fluids passing therethrough and the outlet of the water separator means 426 is operatively connected to a cabin 428 or the like to provide cooled and dried fluid thereto.

Pressure is maintained in the cabin 428 by operation of a pressure regulating valve 430. The valve 430 is opened when cabin pressure reached a predetermined value to exhaust air or other fluid from the cabin 428. A tube or conduit 432 is connected to the outlet of the valve 430 to discharge exhaust air overboard the aircraft or to other structures if desired.

A second turbine-compressor unit is shown generally at 434 and includes a turbine 436 and a compressor 438 which preferably are mounted on a common shaft 440. The turbine inlet is operatively connected to one end portion of a ram air inlet conduit or the like 442 and the other end portion of the conduit 442 is connectible to a source of ram air or the like.

Ram air or other fluid provided to turbine 436 is expanded therein to reduce the temperature and pressure thereof and discharge same through the outlet of the turbine 436 into a tube or conduit 444 which is operatively connected to the low pressure side 406 of the heat exchanger 402 with the relatively cool air from turbine 436 cooling the high pressure air in the high pressure side 404 of the heat exchanger 402. A bypass tube or conduit 446 can be provided and operatively connected across the turbine air inlet and air outlet or between conduit 442 and the turbine outlet. Control valve means 448 is preferably positioned in conduit 446 and, when opened, ram air or other fluid from conduit 442 can be provided directly to conduit 444 and thereby bypass turbine 436.

A further tube or conduit 450 is connected in one end portion to the outlet of compressor 418 of turbine-compressor unit 416 and is connected in an intermediate portion to the inlet of compressor 438 of the turbine-compressor unit 434. A control valve 452 is positioned in the conduit 450 downstream of the inlet of compressor 438 and valve 452 operates in connection with valve 448 to bypass the entire turbine-compressor unit 434 when minimum cooling is required in the heat exchanger 402.

Valve control means 454 is provided and includes high and low temperature sensing elements 456 and 458 which are desirably located downstream of the outlet of the turbine 420. A thermostat or other suitable control element 460 and an on-off switch 462 are positioned in the cabin 428 with the members 460 and 462 operating the valve control means 454. Valve control means 454 is operatively connected to the mixing valve 412 and to the control valve means 448 and 452 to operate same in response to temperature conditions in the cabin 428.

The construction of the heat exchanger, turbine-compressor units and other structure of the system 400 of FIG. 7 can be of any suitable construction, including the structures shown in FIGS. 1–4 and described hereinbefore.

Another preferred specific embodiment of an air cycle air conditioning and pressurization system for aircraft cabins or the like of the invention is shown generally at 470 in FIG. 8. The system 470 includes an air-to-air pre-cooling heat exchanger shown generally at 472 which includes a high pressure side 474 and a low pressure side 476 which are in heat exchange relation. A conduit 478 for high pressure air or other fluid is connected to the inlet of the high pressure side 474 of the heat exchanger 472 and is connectible in the other end portion to a source of ram or high pressure air such as to the compressor 24 illustrated in FIG. 1. A pressure limiting valve 480 is provided in the conduit 478 upstream of the heat exchanger 472 to limit pressure of fluid provided to the system.

A recuperating heat exchanger is shown generally at 482 and includes a high pressure side 484 and a low pressure side 486 in heat exchange relation for cooling of high pressure fluid passing therethrough. The inlet of the high pressure side of the heat exchanger 482 is operatively connected to the outlet of the high pressure side 474 of heat exchanger 472 with the recuperating heat exchanger 482 further cooling high pressure fluid passing therethrough.

A mixing valve 488 is provided and one inlet of the mixing valve is operatively connected to the outlet of the high pressure side 484 of the heat exchanger 482 and the other inlet of the mixing valve 488 is connected to an end portion of a bypass conduit 490. The other end portion of the conduit 490 is connected to the high pressure conduit 478 between the heat exchanger 472 and the valve 480 so that high pressure fluid can be provided to the mixing valve 488 from conduit 478 or from the high pressure side 484 of the heat exchanger 482 and the mixing valve 488 is operable to provide fluid therethrough from either of these sources or a combination thereof.

A turbine-compressor unit is shown generally at 492 and includes a compressor 494 and a turbine 496 which are preferably connected to a common shaft 498 to be operated in unison. The inlet of the turbine 496 is operatively connected to the outlet of the mixing valve 488 to receive high pressure fluid therefrom and expand and cool the high pressure fluid in the turbine and discharge same to the outlet thereof. Water separator means 500 is provided and has the inlet thereof operatively connected to the outlet of the turbine 496 to receive cool fluid therefrom and the outlet of the water separator means is operatively connected to a cabin 502 or the like to provide cooled fluid thereto.

A cabin air outlet or exhaust conduit 504 has one end portion thereof positionable in the cabin 502 and a cabin pressure regulating valve 506 is connected to the end portion of conduit 504 in the cabin. Valve 506 is operable to open at a pre-determined pressure to exhaust cabin air therethrough and into the conduit 504. The other end portion of the conduit 504 is preferably operatively connected to the low pressure side 486 of the recuperating heat exchanger 482 to thereby provide a source of relatively cool air to the low pressure side of the heat exchanger for cooling of high pressure air passing through the high pressure side 484. Tubes or conduits 507 and 508 are operatively connected to the low pressure sides 486 and 476, respectively, of the heat exchangers 482 and 472 and to the inlet of compressor 494 and, in operation, the compressor draws low pressure air from the low pressure sides of the heat exchangers therethrough and discharges same overboard the aircraft.

An air inlet tube or conduit 510 is connected in one end portion to the low pressure side 476 of the heat exchanger 472 to provide low pressure air or other cooling fluid thereto to, in operation, cool high pressure or other fluids passing through the high pressure side 474 of the heat exchanger. The other end portion of tube or conduit 510 can be connected to a suitable source of ram air or other means to provide a cooling fluid to the heat exchanger 472.

Valve control means 512 are provided and includes heat sensing elements or members 514 and 516 which are preferably high and low temperature sensing elements and are located between the turbine 496 and the water separator means 500 in the cool air stream. A thermostat element or member 518 and an on-off switch 519 are located in the cabin 502 and operatively connected to the valve control means 512 so that the pilot or others in the cabin 502 can operate the system and maintain the desired temperature level therein. The valve control means 512 is operatively connected to the mixing valve 488 to control operation of same in response to temperature conditions sensed by elements 514 and 516 and thereby maintain the desired temperature of air or other fluids being provided to the cabin 502. The construction of the heat exchangers, turbine-compressor units, and water separator means can be the same or similar in construction as that illustrated in FIGS. 1–4 and described hereinbefore.

FIG. 9 of the drawings illustrates various performance envelopes for the temperature and pressurization systems of FIGS. 1 and 5–8. The envelopes shown have been computed for engine or bleed pressure ratios of 8 and 12 and illustrate performance at various altitudes and Mach numbers. The envelope represented by the lines 520 show the performance envelope of the system of FIG. 1, the envelopes defined by the lies 522 represent the performance expected from the system of FIG. 5, and the lines 524 are for the system of FIG. 6. Likewise, the lines indicated at 526 are for the system of FIG. 7 while the lines marked 528 are for the system of FIG. 8. As will be apparent from examination of FIG. 9, where the aircraft is to be operated at relatively high altitudes and Mach numbers, the systems of FIGS. 1, 5 and 6 are most desirable, and where the aircraft is operated at relatively low altitudes and Mach numbers, then the systems of FIGS. 7 and 8 will be desirable. Depending upon the design criteria of the aircraft, the system of FIGS. 1 and 5–8 will be selected to provide adequate temperature and pressure control for the aircraft during expected flight conditions.

A preferred specific embodiment of a so-called bootstrap air cycle air conditioning and pressurized system for the cabins of aircraft or the like shown in FIG. 10 of the drawings and illustrated generally at 550. Means are provided for obtaining a source of pressurized air or other fluid to be provided to the cabin or the like. For this purpose, a motor or engine is shown generally at 552 and is operatively connected by shaft 554 to a compressor 556 and operation of the motor 552 drives compressor 556 to pressurize air or other fluid provided thereto. When the system 550 is used in aircraft, the motor or engine 552 can be a conventional aircraft engine and compressor 556 can be a portion of a jet aircraft engine or driven from a conventional piston engine. An air inlet 558 is provided and can be the air inlet to a jet engine or the like and ram air entering the air inlet 558 is provided to the compressor 556 for compression therein. A ram air inlet conduit 560 is connected between the ram air inlet 558 and the compressor 556 to receive ram air prior to compression with the ram air provided to tube or conduit 560 being utilized for cooling in the manner described more fully hereinafter.

An air-to-air pre-cooling heat exchanger is shown generally at 562 and includes a housing 564 which has a low pressure air inlet 566 and a low pressure air outlet 568 at the ends thereof and a high pressure air inlet 570 and a high pressure air outlet 572 intermediate the ends thereof, a plurality of tubes or conduits 574 are provided and each have the end portions thereof connected to the high pressure air inlet 570 and high pressure air outlet 572 of the heat exchanger with the intermediate portions of the tubes being positioned across the low pressure side of the heat exchanger 562 so that low pressure air provided through inlet 566 is in heat exchange relation with high pressure air or other fluid passing through the high pressure side or tubes 574.

A high presure air inlet conduit or tube 576 has one end portion thereof secured to the high pressure air inlet 570 of the heat exchanger 562 and the other end portion thereof is connected to the outlet of the compressor 556 or to any other suitable source of air or other fluid under pressure. Preferably, a pressure ratio limiting valve 578 is povided in conduit 576 between compressor 556 and inlet 570 of the heat exchanger to thereby limit the maximum pressure provided to the system. The valve 570 also functions to limit the maximum pressure ratio across the air expansion turbine described hereinafter.

A first proportional-type mixing valve 580 is provided and has an inlet 582 operatively connected to the high pressure outlet 572 of the heat exchanger 562 and another inlet 584 is connected to one end portion of a bypass tube or conduit 586 which has the other end portion thereof connected to the high pressure air inlet conduit 576 between valve 578 therein and the inlet 570 of the heat exchanger 562. The mixing valve 580 is operable to receive air or other high pressure fluids from the outlet of the heat exchanger 562 or from the bypass conduit 586 and transfer same individually therethrough and discharge same to the outlet 588 thereof or to mix the air or other fluids from the sources and discharge same through the outlet 588.

A first turbine-compressor unit is provided and is shown generally at 590 and such can be of the same or similar construction to the turbine-compressor unit shown in FIG. 3 and described hereinbefore. The unit 590 has a housing 582 which includes a compressor inlet 594 and a compressor outlet 596 and also includes a turbine inlet 598 and a turbine outlet 600. The compressor inlet 594 is connected to one end portion of a tube or conduit 602 which has the other end portion thereof connected to the outlet 588 of the mixing valve 580 so that high pressure air or other fluid discharged through the mixing valve 580 is received by the compressor portion of the turbine-compressor unit 590 for compression therein and is discharged therefrom through the outlet 596.

An air-to-air intercooling heat exchanger is shown generally at 604 and includes a housing 606 having a low pressure inlet 608 for air or other fluids and a low pressure outlet 610 and a high pressure inlet for air or other fluids as shown at 612 and a high pressure outlet 614 for the fluid. A plurality of tubes or conduits 616 are provided and each have their end portions connected to the high pressure inlet 612 and outlet 614 with the intermediate portions of the tubes or conduits 616 being positioned across the intermediate portion of the housing 606 so that low pressure air passing through the housing 606 will be in heat exchange relation with high pressure and relatively high temperature fluids in the tubes or conduits 616. As illustrated in the drawings, the low pressure inlets 566 and 608 of heat exchangers 562 and 604 are inter-connected to receive low pressure fluid from a single source and likewise the low pressure outlets 568 and 610 are inter-connected although it will be apparent to those skilled in the art that entirely separate inlets can be provided if desired.

The high pressure inlet for air or other fluids 612 of the heat exchanger 604 is desirably connected by suitable conduit means 618 and 620 to the outlet 596 of the compressor portion of the turbine-compressor unit 590 so that compressed high pressure air or other fluids from the compressor portion of the turbine-compressor unit can be provided to the high pressure side of the intercooling heat exchanger 604 for cooling therein.

A second proportional-type mixing valve of any suitable construction is shown generally at 622 and includes inlets 624 and 626 and an outlet 628 and preferably the inlet 624 is connected to one end portion of a tube or conduit 630 which is operatively connected in the other end portion to the outlet 596 of the compressor portion of turbine-compressor unit 590. The outlet 628 of mixing valve 622 is desirably operatively connected to the turbine inlet 598 of the turbine-compressor unit.

An air-to-air recuperating heat exchanger is shown generally at 634 and includes a housing 636 having a low pressure inlet for air or other cooling fluids at 638 and a low pressure outlet 640 at the other end thereof and a high pressure inlet 642 for air or other fluids and a high pressure outlet 644 with the high pressure inlet and outlet being located intermediate the ends of the housing 636 as illustrated in the drawing. Preferably, a plurality of tubes or conduits 646 are provided and have the end portions thereof connected to the high pressure inlet 642 and high pressure outlet 644 with the intermediate portions of the tubes or conduits being positioned in the intermediate portion of the housing 636 of the heat exchanger and in heat exchange relation with low pressure air or other fluids provided through the low pressure side of the heat exchanger to thereby cool high pressure air or other fluids in the tubes or conduits. The high pressure inlet 642 is operatively connected to the high pressure outlet 614 of the heat exchanger 604 and the high pressure outlet 644 is operatively connected to the inlet 626 of the mixing valve 622 and, in operation, high pressure air or other fluids from the intercooling heat exchanger 604 passes through the tubes or conduits 646 in the recuperating heat exchanger 634 for cooling therein and are discharged into the mixing valve 622 where they are mixed with the high pressure air or other fluid from conduit 630. The resulting mixture of high pressure fluid passes through the mixing valve 622 into the inlet 598 of the turbine portion of the turbine-compressor unit for expansion therein and is discharged through the outlet 600 thereof at a temperature and pressure less than that of the incoming fluid and the pressure at the outlet is substantially the same as that in the cabin to be conditioned.

Since the high pressure air or other fluid passing through the turbine portion of the turbine-compressor unit 590 rotates the common shaft of the turbine in the compressor portion thereof the manner explained hereinbefore in connection with FIG. 3 of the drawings, this system may be referred to as a bootstrap system that is, the high pressure air passing through the turbine provides the power for operation of the compressor portion of the turbine-compressor unit and, when it is desired, separate shaft-driven turbine-compressor units can be provided as disclosed and described in my before-mentioned co-pending patent application.

A water separator is shown generally at 650 and has an inlet 652 and an outlet 654 and the inlet 652 is operatively connected to the outlet 600 of the turbine-compressor unit to receive cool air or other fluid therefrom and, in operation, the water separator means removes moisture or water from air or other fluids passing therethrough. Water separator means 650 can be of the same or similar construction as that illustrated generally at 104 in FIG. 4 and described hereinbefore. Water removed from the air or other fluid passing through water separator is discharged through an outlet opening or pipe 656 and can be used for further cooling in the manner disclosed in my before-mentioned co-pending patent application. The outlet 654 of the water separator means 650 is connected to one end portion of a tube or conduit 658 which has the other end portion thereof positioned to discharge air or other gaseous fluids into a cabin or the like 660 for cooling of the cabin.

A cabin air outlet or exhaust conduit 662 has one end portion thereof positionable within the cabin 660 of the aircraft or the like to receive exhaust air from the cabin. A cabin pressure regulating valve 664 is secured to the end portion of the conduit 662 within the cabin 660 and is operable to open at a pre-determined pressure and is closeable at lower pressures to thereby maintain a specific pressure within the cabin 660. When valve 664 is opened as a result of an increase in pressure within the cabin, cabin air is exhausted into the cabin air exhaust conduit 662.

A second turbine-compressor unit is provided and is shown generally at 666 and such can be of the same or similar construction to the unit illustrated in FIG. 3 and described hereinbefore. The turbine-compressor unit 666 includes a housing 668 having a turbine air inlet 670 and a turbine outlet 672 for air or other fluids and a compressor inlet 674 and a compressor outlet 676 for air or other fluids. The turbine inlet 670 is connected to the other end portion of the cabin air outlet conduit 662 to receive cabin exhaust air therefrom and, in operation, the cabin exhaust air is expanded and thereby cooled in the turbine portion of the unit 666 and is discharged through the outlet 672 thereof. In some instances, it is desirable that the cabin air entering tube or conduit 662 bypass the turbine portion of unit 666 and for this purpose a bypass conduit 678 is provided and is operatively connected to the turbine outlet 672 and the turbine inlet 670 or to the tube or conduit 662. Bypass conduit 678 has a control valve 680 therein which is operable when opened to permit passage of air or other fluids therethrough to thereby bypass the turbine portion of the unit 666.

A tube or conduit 682 is operatively connected to its end portions to the turbine air outlet 672 and to the low pressure inlet 638 of the recuperating heat exchanger 634 to thereby provide cooling air to the housing 636 of the recuperating heat exchanger for cooling of high pressure air or other fluids passing through the tubes or conduits 646. Another tube or conduit 684 is connected in one end portion to the low pressure outlet 640 of the recuperating heat exchanger 634 and is connected in an intermediate portion to the inlet 674 of the compressor portion of the turbine-compressor unit 666 with the compressor drawing low pressure air from the low pressure side of the heat exchanger 634 into the compressor for discharge through the outlet 676 to the atmosphere. A control valve 686 is preferably provided in the tube or conduit 684 and located downstream from the compressor inlet 674 and is operable in connection with the control valve 680 and bypass conduit 678 to entirely bypass the turbine-compressor unit 666 when desired, that is, when less cooling capacity is required for the system.

A third turbine-compressor unit is preferably provided and is shown generallly at 690 and desirably is of the same or similar construction as that shown in FIG. 3 and described hereinbefore. The turbine-compressor unit 690 includes a housing 692 having a turbine inlet 694 for air or other fluid and a turbine outlet 696 for the fluid subsequent to being expanded in the turbine. A compressor inlet for air or other fluids is shown at 698 and the compressor outlet is shown at 700. The ram air inlet conduit 560 is connected to the turbine inlet 694 to provide ram air thereto for expansion and cooling in the turbine portion of the unit 690 and discharge through the turbine outlet 696 with the cooled air or other fluid being provided to a tube or conduit 702 which is connected to the low pressure inlets 566 and 608 of the pre-cooling heat exchanger 562 and the intercooling heat exchanger 604 for cooling of high pressure air or other fluid passing through the tubes of the heat exchangers. A bypass tube or conduit 704 can be provided and desirably has a control valve 706 therein and the tube or conduit 704 is operatively connected in the end portions to the turbine inlet 694 and the turbine outlet 696 and when the valve 706 is opened, ram air is passed from conduit 560 around the turbine-compressor unit 690, such being desirable when minimum cooling is desired in heat exchangers 562 and 604.

Another tube or conduit 708 is connected in one end portion to the low pressure outlets 568 and 610 of the heat exchangers 562 and 604, respectively, and is connected in an intermediate portion to the compressor inlet 698 of the turbine-compressor unit 690 with the compressor drawing low pressure air from the heat exchangers and compressing same and discharging same to the atmosphere or overboard the aircraft. A control valve 710 is desirably provided in the tube or conduit 708 downstream of the compressor inlet 698 and is operated in connection with the control valve 706 to bypass the turbine-compressor unit 690.

Thermostat-operated valve control means are provided and shown generally at 712 and includes temperature sensing means or elements 714 and 716 located between the turbine outlet 600 and the water separator inlet 652 and are high and low temperature sensing means to prevent freezing of the air or moisture in the water separator means 650 and also to limit maximum temperature of air or other fluid provided in the cabin 660. A thermostat element or regulator 718 and an on-off switch 723 are provided and are positionable in the cabin 660 or the like to control operation of the valve control means 712. The valve control means 712 is operatively connected to the mixing valves 580 and 622 and to the control valves 680, 686, 706, 710 and, in operation, the valve control means operates the valves to provide the desired temperature of fluid or air to the cabin 660 and the pilot or other person in the cabin 660 can regulate the temperature of the air by operation of the thermostat 718.

In operation, assuming air from the atmosphere is entering the ram air inlet 558 of an engine or the like, the air is compressed in compressor 556 during operation of engine or motor 552 and passes through the valve 578 and tube or conduit 576 to the pre-cooling heat exchanger 562 and simultaneously ram air enters the ram air inlet conduit 560 and passes through the turbine portion of turbine-compressor unit 690 for expansion and cooling therein and subsequently passes through tube or conduit 702 to the low pressure sides of heat exchangers 562 and 604. The high pressure air in pre-cooling heat exchanger 562 is cooled by the low pressure air passing therethrough and the high pressure air is discharged therefrom to the mixing valve 580 and can be mixed with other pressurized air entering bypass conduit 586, such mixing being a result of operation of the valve control means 712 in response to temperature conditions in cabin 660 at that time. The resulting mixture of high pressure air is transferred through conduit 602 to the compressor portion of turbine-compressor unit 590 for compression therein which results in an increase in the temperature and pressure of the air and the resulting compressed air is provided to the high pressure side of the intercooling heat exchanger 604 and to one of the inlets of the mixing valve 622. The portion of the high pressure air passing through the intercooling heat exchanger 604 is cooled as a result of relatively cool air passing through the low pressure side thereof provided from the turbine of the turbine-compressor unit 690. The resulting cooled high pressure air leaving intercooling heat exchanger 604 is provided to the recuperating heat exchanger 634 and passes through the high pressure side thereof for cooling therein and is subsequently discharged into the mixing valve 622 for mixing with high pressure air therein from the compressor portion of the turbine-compressor unit 590.

The resulting mixture of air from mixing valve 622 is provided to the turbine portion of the turbine-compressor unit 590 for expansion therein and is discharged through the outlet 600 thereof at a lower temperature and pressure, the pressure of the resulting cooled air being substantially the pressure of the gas or fluid in the cabin 660. The resulting cooled air is passed through the water separator means 650 for removal of moisture therefrom and is then transferred through conduit 658 into the cabin 660.

When the cabin pressure rises above a specific pressure level, the pressure regulating valve 664 opens and cabin air is exhausted into the tube or conduit 662 and provided to the turbine portion of the turbine-compressor unit 666 for expansion therein and cooling of the cabin exhaust air with the resulting cooled air being provided through tube or conduit 682 into the low pressure side of the recuperating heat exchanger 634 to cool high pressure air passing therethrough. The resulting low pressure air leaving the recuperating heat exchanger 634 is transferred through conduit 684 into the compressor portion of the turbine-compressor unit 666 and is subsequently discharged overboard the aircraft.

When minimum cooling or some heating is desired for the cabin 660, the control valve means 712 operates to close the mixing valve 580 and/or valve 622 so that hot compressed air directly from compressor 556 is provided around the heat exchangers 562, 604, and 634 directly to the turbine portion of turbine-compressor unit 590 and then through water separator means 650 into the cabin 660 and, during the heating or minimum cooling cycle, cabin exhaust air can be bypassed around the turbine-compressor unit 666 and ram air can be bypassed around the turbine-compressor unit 690.

To further illustrate operation of the system of FIG. 10, and assuming that the aircraft or other vehicle containing the cabin 660 is flying at an altitude of approximately 86,267 feet, and at a velocity of approximately Mach 4.54, with the ambient air being approximately 437.5° Rankine, and the ambient pressure is approximately 0.295 p.s.i.a., and assuming a bleed or engine pressure ratio of about 4.0, the temperature of air in the ram air inlet 558 will be at a temperature of about 2246.1° R. and at a pressure of about 24.16 p.s.i.a., and the air leaving compressor 556 will be at a temperature of about 3701.5° R. and a pressure of about 96.62 p.s.i.a. The resulting compressed air is passed through the pre-cooling heat exchanger 562 for cooling therein and the air leaving the pre-cooling heat exchanger and entering the compressor portion of the turbine-compressor unit 590 is at a temperature of about 1709.5° R. The compressor increases the temperature and the pressure of the air to a temperature of about 1961.6° R. at a pressure of about 130 p.s.i.a. and, as this compressed air passes through the intercooling heat exchanger 604, it is cooled to a temperature of about 1535.5° R. This high pressure air is further cooled in the recuperating heat exchanger 634 and leaves the high pressure side thereof at a temperature of about 747.1° R. and is provided to the turbine portion of the turbine-compressor unit 590 for expansion therein. As a result of the expansion in the turbine, the air leaves the outlet 600 thereof at a temperature of about 495° R. and a pressure of about 13 p.s.i.a. The air at this temperature and pressure is provided to the aircraft cabin 660 for cooling of the cabin and such results in heating of the air. Cabin air passes through the regulating valves 664 at a temperature of about 617.6° R. and a pressure of about 10.9 p.s.i.a. This cabin exhaust air passes through the turbine portion of turbine-compressor unit 666 where it is cooled and reduced in pressure to a temperature of about 409.2° R. and a pressure of about 109 p.s.i.a. with this recuperating air being provided to the low pressure side of the recuperating heat exchanger 634 for cooling of the high pressure air therein. The ram air entering ram air inlet conduit 560 passes through the turbine portion of the turbine-compressor unit 690 where same is expanded and cooled to a temperature of about 1488.2° R. and leaves the turbine at a pressure of about 2.42 p.s.i.a. with this air being provided to the low pressure sides of the pre-cooling heat exchanger 562 and the intercooling heat exchanger 604.

The foregoing operating conditions are calculated values for the system shown in FIG. 10 under the specific operating conditions set forth hereinbefore and considering obtainable efficiencies in heat exchangers and the like. These operating conditions are variable with the altitude and mach number of the aircraft which varies the temperature and pressure of the incoming air and the conditions are also variable with different bleed pressure ratios, efficiencies of the elements of equipment required, etc. These operating conditions have been given by way of illustration and are not intended to unduly limit the scope of the invention.

Figure 11:
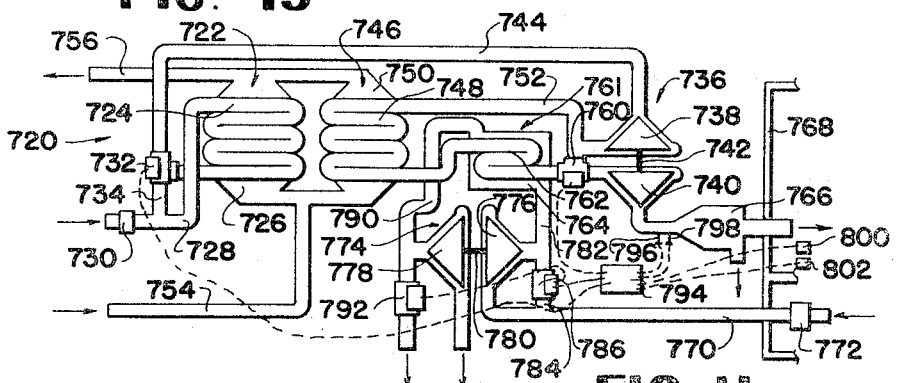
FIG. 11 is a diagrammatic view illustrating another preferred specific embodiment of an air conditioning and pressurization system of the invention.

Referring now to FIG. 11 of the drawings, another preferred specific embodiment of the invention is shown generally at 720 and includes a first heat exchanger shown generally at 722 which can be referred to as an air-to-air pre-cooling heat exchanger and the heat exchanger 722 includes a high pressure side 724 and a low pressure side 726 in heat exchange relation and heat exchanger 722 can be of the same or similar construction to those illustrated hereinbefore in connection with FIGS. 2 and 10. The high pressure side 724 of heat exchanger 722 is desirably connected to one end portion of a high pressure air inlet tube or conduit 728 which is connectible in the other end portion to a source of pressurized air or other fluid, such as the compressor 556 of FIG. 10. A pressure limiting valve 730 is provided in conduit 728 to limit the maximum pressure applied to the system. The high pressure side of heat exchanger 722 has an outlet operatively connected to an inlet of a first mixing valve 732 and the other inlet of the mixing valve 732 is connected to an end portion of a tube or conduit 734 which has the other end portion thereof operatively connected to the inlet conduit 728 between valve 730 and the heat exchanger 722 and the conduit 734 serves to bypass air or other high pressure fluids in conduit 728 around heat exchanger 722 for mixing with cooled air from the heat exchanger in the mixing valve 732.

A first turbine-compressor unit is shown generally at 736 and includes a compressor portion 738 and a turbine portion 740 which are desirably operated from a common shaft 742 and the turbine-compressor unit 736 can be of the same or similar structure such as that illustrated in FIG. 3 and described hereinbefore. The compressor 738 has an inlet connected to one end portion of a tube or conduit 744 and the other end portion of the tube or conduit is connected to the outlet of the mixing valve 732 so that air or other fluids mixed in the valve 732 can be provided to the compressor 738 for further compression therein and discharged therefrom at an increased temperature and pressure.

An air-to-air intercooling heat exchanger is shown generally at 746 and includes a high pressure side 748 and a low pressure side 750 which are in heat exchange relation and the heat exchanger 746 can be of the same or similar construction to like heat exchangers illustrated in FIGS 2 and 10 and described hereinbefore. The tube or conduit 752 connects the inlet of the high pressure side 748 of heat exchanger 746 to the outlet of the compressor 738 so that high pressure air or other fluid can be provided to the heat exchanger 746 for cooling therein. Cooling air or other fluid for the low pressure sides 726 and 750 of the heat exchangers 722 and 746 can be provided by a ram air conduit or tube 754 which is operatively connected in one end portion to the inlets of the low pressure sides of the heat exchangers 722 and 746 and the other end portion of the conduit 754 is connectible to a source of ram air or the like, such as to an air inlet of a jet engine or other suitable means as illustrated in FIG. 10 for the tube or conduit 560. Tube or conduit 756 is operatively connected in the end portion to the low pressure outlet of the heat exchangers 722 and 746 and the other end portion thereof is desirably positionable to discharge low pressure air therefrom overboard the aircraft or the like.

A second proportional-type mixing valve 760 is preferably provided and has an inlet thereof operatively connected to the outlet of the compressor 738 and the outlet of mixing valve 760 is operatively connected to the inlet of the turbine 740. Another inlet of the mixing valve 760 is preferably operatively connected to the high pressure side 762 of a recuperating heat exchanger 761 to receive fluid therefrom. The mixing valve 760 is operable to receive and mix air or other fluids from the compressor 738 and from the high pressure side 762 of heat exchanger 761 or to pass therethrough air or other fluids from only one of these sources. The recuperating heat exchanger 761 also has a low pressure side 764 in heat exchange relation with the high pressure side 762 thereof to cool high pressure air passing therethrough. The inlet of the high pressure side 762 of heat exchanger 761 is operatively connected to the outlet of the high pressure side 748 of the intercooling heat exchanger 746.

Water separator means 766 are preferably provided and has the inlet thereof operatively connected to the outlet of the turbine 740 and the outlet of the water separator means 766 is operatively connected to the interior of a cabin 768 or the like of an aircraft to provide cool and dried air thereto. Water separator means 766 can be constructed as illustrated in FIG. 4 of the drawings or other suitable structures can be used.

A cabin outlet or exhaust conduit for cabin air or other fluids is shown at 770 and one end portion thereof is preferably positionable within the cabin 768 and has a pressure regulating valve 772 therein with the valve 772 being operable to open at a pre-determined pressure of air or other fluid within the cabin 768 to thereby exhaust cabin air through the cabin air outlet conduit 770. Air entering the cabin air outlet conduit 770 is desirably used for cooling of high pressure air in the recuperating heat exchanger 761 and such cabin air outlet air is preferably cooled prior to being discharged into the low pressure side 764 of the heat exchanger 761. For this purpose a second turbine-compressor unit is provided and is shown generally at 774 and includes a turbine 776 and a compressor 778 which are desirably mounted on and rotate with a common shaft 780 in the manner shown in FIG. 3 and described hereinbefore. The inlet for turbine 776 is operatively connected to the other end portion of the cabin air outlet conduit 770 with cabin exhaust air received by the turbine 776 being expanded and thereby cooled therein and discharged through the outlet of the turbine to the tube or conduit 782 which is operatively connected to the inlet of the low pressure side 764 of the recuperating heat exchanger 761. A bypass tube or conduit 784 having a control valve 786 therein can be connected in its end portions to the inlet of turbine 776 or to the cabin air outlet conduit 770 and operatively connected in the other end portion to the outlet of the turbine 776 or to the end portion of tube or conduit 782 so that when valve 786 is opened cabin exhaust air will pass through the bypass conduit 784 and around turbine 776, such being desirable when minimum cooling or some heating is desired.

Another tube or conduit 790 is connected in one end portion to the outlet of the low pressure side 764 of the recuperating heat exchanger 761 and has an intermediate portion thereof operatively connected to the inlet for the compressor 778 so that low pressure air from the recuperating heat exchanger 761 can be received by the compressor 778 for compression therein and such is preferably subsequently discharged overboard the aircraft or the like. The other end portion of tube or conduit 790 desirably has a control valve 792 therein which is openable in connection with the valve 786 to bypass air or other fluid around the turbine-compressor unit 774 when minimum cooling or some heating is desired.

Suitable valve control means 794 is preferably provided and includes temperature or heat sensing elements 796 and 798 which are positionable in the conditioning stream of air or other fluid between the outlet of the turbine 740 and the inlet of the water separator means 766 with the elements 796 and 798 preferably being high and low limit means to prevent freezing of air or other fluid provided to the cabin 768 and to limit maximum temperature of air supplied to the cabin. A thermostat or temperature controlling means 800 is positioned in the cabin 768 as is an on-off switch 802 which are operable by the pilot or other persons in the cabin of the aircraft or the like to control temperature therein. The valve control means 794 is operatively connected to the mixing valves 732 and 760 and to the control valves 786 and 792 and is operable in response to temperature conditions in the cabin 768 or the like to operate the valves and thereby control the temperature of air or other fluid being conditioned and supplied to the cabin.

The construction of the various items or elements of the system 720 can be the same or similar to those described hereinbefore in connection with FIGS. 2–4 and 10 or other suitable structures can be utilized, if desired. The operation of the air conditioning and pressurization system 720 will be apparent to those skilled in the art from the drawings and previous description of the system 550 of FIG. 10, the operation of the system of FIG. 11 differing from that of FIG. 10 in that the ram air entering conduit 754 is not cooled by the turbine means as in FIG. 10.

Figure 12:
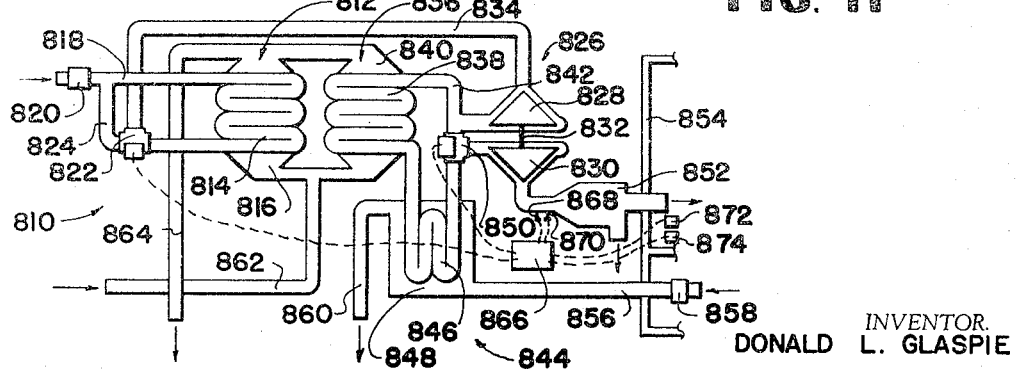
FIG. 12 is a diagrammatic view illustrating a still further preferred specific embodiment of the air conditioning and pressurization system of the invention.

Another preferred specific embodiment of the air cycle air conditioning and pressurization system of the invention is shown generally at 810 in FIG. 12 and includes an air-to-air pre-cooling heat exchanger shown generally at 812 which preferably includes a high pressure side 814 and a low pressure side 816 which are in heat exchange relation to cool high pressure air or other fluid provided to the high pressure side. The inlet of the high pressure side 814 of heat exchanger 812 is preferably connected to one end portion of an inlet conduit 818 for high pressure air or other fluid and the other end portion of tube or conduit 818 is connectible to a source of pressurized fluid, such as to a compressor or the like illustrated at 556 in FIG. 10. A pressure limiting valve 820 is preferably provided in the conduit 818 to limit the maximum pressure of air or other fluids supplied to the system.

The outlet of the high pressure side 814 of heat exchanger 812 is operatively connected to an inlet of a first mixing valve 822 and another inlet of the mixing valve 822 is connected to one end portion of a bypass conduit 824 which has the other end portion thereof operatively connected to a tube or conduit 818 downstream of the valve 820 and upstream of the heat exchanger 812 so that the mixing valve 822 can mix two separate streams of high pressure air or other fluid and discharge same through the outlet thereof.

A first turbine-compressor unit is shown generally at 826 and includes a compressor 828 and turbine 830 which are mounted on a common shaft 832 and the turbine-compressor unit 826 can be of the same or similar construction to that illustrated in FIG. 3 and described hereinbefore. The inlet of the compressor 828 is connected to one end portion of a tube or conduit 834 which has the other end portion thereof connected to the outlet of the mixing valve 822. The mixture of air or other fluids discharged through the mixing valve 822 is provided to the compressor 828 for compression therein.

An air-to-air intercooling heat exchanger is shown generally at 836 and includes a high pressure side 838 and a low pressure side 840 which are in heat exchange relation and heat exchanger 836 can be of the same or similar construction to other heat exchangers shown in FIGS. 2 and 10 and described hereinbefore. Conduit means 842 operatively connect the outlet of compressor 828 to the inlet of the high pressure side 838 of the heat exchanger 836 so that hot compressed air or other fluid from compressor 828 can be circulated through the high pressure side of the heat exchanger 836 for cooling therein.

An air-to-air recuperating heat exchanger is shown generally at 844 and includes a high pressure side 846 and a low pressure side 848 which are in heat exchange relation so that air or other fluids passing through the high pressure side 846 thereof will be cooled by low pressure air passing through the low pressure side thereof. The inlet of the high pressure side 846 of the recuperating heat exchanger is preferably operatively connected to the outlet of the high pressure side 838 of the intercooling heat exchanger 836.

A second proportional-type mixing valve is shown at 850 and has an inlet operatively connected to the outlet of the high pressure side 846 of the recuperating heat exchanger 844 and another inlet of the mixing valve 850 is operatively connected to the outlet of the compressor 828 and the valve 850 is operable to receive high pressure fluids from these two sources and mix same and discharge the resulting mixture through the outlet thereof or to transfer therethrough high pressure fluid or gas from either of these sources. The outlet of the mixing valve 850 is operatively connected to the inlet of the turbine 830 with high pressure air or other fluid being received by the turbine 830 being expanded therein and discharged therefrom through the outlet thereof.

Water separator means 852 of any suitable construction is operatively connected in the inlet end thereof to the outlet of the turbine 830 to receive low pressure fluid or other gas therefrom and the outlet of the water separator means is operatively connected to a cabin 854 of an aircraft or the like. Water separator means 852 is operable to remove moisture or water from air or other fluids passing therethrough and the water separator means can be of the same or similar construction as that illustrated in FIG. 4 and described hereinbefore.

A cabin air outlet tube or conduit 856 has one end portion thereof positionable in the cabin or the like 854 and a pressure regulating valve 858 is secured to one end portion of the tube or conduit 856 and the valve 858 is operable to open at a pre-determined pressure in the cabin 854 to discharge or exhaust cabin air from the cabin through the valve 858 and into the tube or conduit 856. The other end portion of tube or conduit 856 is operatively connected to the inlet of the low pressure side 848 of the recuperating heat exchanger 844 with the relatively cool low pressure air from the cabin 854 being circulated through the low pressure side of the recuperating heat exchanger for cooling of high pressure air or other fluids in the high pressure side thereof. Another tube or conduit 860 can be connected in one end portion to the outlet of the low pressure side 848 of the recuperating heat exchanger 844 and the other end portion thereof is positionable to discharge air or other fluids from the low pressure side of the heat exchanger overboard the aircraft or the like.

A ram air inlet conduit 862 is operatively connected in one end portion to the low pressure sides 816 and 840 of the precooling heat exchanger 812 and intercooling heat exchanger 836, respectively, to provide air or other fluid to the heat exchanger for cooling of air or other fluids in the high pressure side thereof. The ram air inlet conduit 862 is connectible to a source of ram air or other fluid in any suitable manner such as that illustrated for the tube or conduit 560 in FIG. 10.

A tube or conduit 864 can be operatively connected in one end portion to the outlet or downstream end of the low pressure sides 816 and 840 of the heat exchangers 812 and 836, respectively, and the other end portion of tube or conduit is positionable to discharge low pressure air overboard the aircraft or for other uses.

The system is preferably operated in response to temperature conditions in the cabin 854 and, for this purpose, suitable valve control means 866 are provided which desirably includes heat or temperature sensing elements 868 and 870 positioned upstream of the water separator means 852. A thermostat element 872 and an on-off switch 874 are positionable in the cabin 854 to operate the valve control means 866. Valve control means 866 is operatively connected to the mixing valves 822 and 850 to regulate same and operate same in response to temperature conditions in the cabin 854 in the same or similar manner explained hereinbefore in connection with FIG. 10.

Another preferred specific embodiment of the invention is illustrated generally at 880 in FIG. 13 and includes an air-to-air pre-cooling heat exchanger shown generally at 882 which has a high pressure side 884 and a low pressure side 886 which are in heat exchange relation for cooling of air or other fluids in the high pressure side of the heat exchanger when relatively cool fluids are passed through the low pressure sides thereof. The inlet of the high pressure side 884 of heat exchanger 882 is operatively connected to a tube or conduit 888 for providing high pressure air or other fluid to the heat exchanger 882 and the other end portion of the high pressure air inlet conduit 888 is operatively connected to a source of air or other fluid under pressure such as the compressor 556 illustrated in FIG. 10. A pressure limiting valve 890 is desirably provided in tube or conduit 888 to limit maximum pressure of fluids supplied to the system 880.

The outlet of the high pressure side 884 of heat exchanger 882 is operatively connected to an inlet of a first mixing valve 892 which has another inlet operatively connected to a bypass conduit or the like 894 with the other end portion of the bypass conduit being operatively connected to the high pressure air inlet conduit 888 downstream of the valve 890 so that the mixing valve 892 can receive high pressure fluid from conduit 888 or heat exchanger 884 and mix same therein and discharge same through the outlet thereof into one end of a tube or conduit 896.

A first turbine-compressor unit is shown generally at 898 and includes a compressor 900 having an inlet operatively connected to the other end portion of the tube or conduit 896. The turbine-compressor unit 898 has a turbine 902 and preferably the compressor 900 and turbine 902 are connected to the same shaft 904 for simultaneous operation with the turbine-compressor unit 898 being of the same or similar construction as that illustrated in FIG. 3 and described hereinbefore.

An intercooling heat exchanger is preferably provided and is shown generally at 906 and includes a high pressure side 908 and a low pressure side 910 which are in heat exchange relation and the low pressure side 910 of heat exchanger 906 can be operatively connected to the low pressure side 886 of heat exchanger 882 as illustrated. The high pressure side 908 of heat exchanger 906 has the inlet end thereof operatively connected by conduit means 912 to the outlet of compressor 900 to receive high pressure air or other fluids therefrom for cooling in the heat exchanger 906. The outlet of high pressure side 908 of heat exchanger 906 is operatively connected to an inlet of a second mixing valve 914 which has the other inlet thereof operatively connected to the outlet of compressor 900 and mixing valve 914 is operable to pass high pressure fluid therethrough from heat exchanger high pressure side 908, from compressor 900, or from both of these sources with the outlet of the mixing valve being operatively connected to the inlet of turbine 902. Turbine 902, in operation, receives high pressure gaseous fluid and expands same therein and discharges the resulting fluid at a lower temperature and pressure than the incoming fluid.

Water separator means 916 of any suitable construction is provided and has the inlet thereof operatively connected to the outlet of turbine 902 and the outlet of water separator means 916 is operatively connected to a cabin or the like 918 of an aircraft or other suitable means. Water separator means 916 can be of the same or similar construction as that illustrated in FIG. 4 of the drawings and is operable to remove water or moisture from air or other fluid passing therethrough.

A cabin outlet conduit or tube 920 is provided and has one end portion thereof positioned in the cabin or the like 918. A pressure regulating valve 922 is connected to the end portion of tube or conduit 920 and is operable to open at a pre-determined pressure in the cabin 918 to discharge or exhaust cabin air into the tube or conduit 920. The other end portion of the tube or conduit 920 can be positioned to discharge air overboard the aircraft or the cabin exhaust air can be used for other suitable uses.

Another turbine-compressor unit is preferably provided and is illustrated generally at 924 and includes a turbine 926 and a compressor 928 which preferably have a common shaft and the unit 924 can be of the same or similar construction as that illustrated in FIG. 3 and described hereinbefore. A ram air inlet conduit 930 is provided and is operatively connected in one end portion to the inlet of the turbine 926 and has the other end portion thereof positioned to receive ram air or other fluid, such as in the manner shown for the conduit 560 of FIG. 10.

Ram air from tube or conduit 930 is expanded and cooled in the turbine 926 and discharged therefrom into a tube or conduit 932 which is operatively connected to the low pressure sides 886 and 910 of heat exchangers 882 and 906, respectively. A bypass tube or conduit 934 having a control valve 936 therein can be provided and positioned across the inlet and outlet of the turbine 926 so that ram air from conduit 930 can be bypassed around the turbine 926 when additional cooling in the heat exchangers 882 and 906 is not required.

Another tube or conduit 938 has one end portion operatively connected to the outlets of the low pressure sides 886 and 910 of heat exchangers 882 and 906, respectively, and an intermediate portion of the tube or conduit 938 is operatively connected to the inlet of the compressor 928 with the compressor receiving the low pressure fluid and compressing same and discharging same overboard the aircraft. The other end portion of tube or conduit 938 desirably has a control valve 940 therein which is operable in connection with control valve 936 to entirely bypass the turbine-compressor unit 924 when desired.

Suitable valve control means 942 is provided and includes the heat sensing elements 944 and 946 downstream of the turbine 902 to sense temperature of air being provided to the cabin. A thermostat or suitable temperature control means 948 and an on-off switch 950 are preferably provided and positioned in the cabin 918 to control the valve control means 942 in response to temperature conditions in the cabin.

The operation of the air conditioning and pressurization system 880 of FIG. 13 will be apparent to those skilled in the art from the foregoing description and of the description of the system of FIG. 10 of the drawings, FIG. 13 being the same or similar in construction to FIG. 10 with the exception of the recuperating heat exchanger and associated parts in FIG. 10 which have been eliminated here.

Another preferred specific embodiment of an air cycle air conditioning and pressurization system is shown generally at 960 in FIG. 14 and desirably includes an air-to-air pre-cooling heat exchanger shown generally at 962 which includes a high pressure side 964 and a low pressure side 966 which, in operation, are in heat exchange relation relative to each other so that relatively cool low pressure air or other fluid can be passed through the low pressure side 966 for cooling of high pressure air or other fluid in the high pressure side 964.

A conduit 968 for high pressure air or other fluid is connected to the inlet of the high pressure side 964 of the heat exchanger 962 and is also connectible to a suitable source of high pressure air or other fluid, such as to a compressor as illustrated at 556 in FIG. 10. A pressure limiting valve 970 is positionable in conduit 968 to limit maximum pressure of air or other fluid supplied to the system. The high pressure air or other fluid discharged from the high pressure side 964 of heat exchanger 962 is supplied to one inlet of a proportional-type mixing valve 972 which has the other inlet thereof connected to one end portion of a tube or a conduit 974. The other end portion of tube or conduit 974 is connectible to a source of fluid under pressure, such as to the high pressure air inlet conduit 968 downstream of the valve 970 and upstream of the heat exchanger 962. Valve 972 is operable to receive and mix fluid from the two streams in response to temperature conditions in the cabins or the like to be conditioned.

A turbine-compressor unit is shown generally at 976 and includes a compressor 978 and a turbine 980 which have desirably a common shaft and the inlet of compressor 978 is operatively connected through tube or conduit means 982 to the outlet of the mixing valve 972.

A recuperating heat exchanger is preferably provided and is shown generally at 984 and includes a high pressure side 986 and a low pressure side 988 in heat exchange relation and the inlet of the high pressure side 986 is desirably operatively connected by conduit means or the like 990 to the outlet of the compressor 978. The outlet of the high pressure side 986 of heat exchanger 984 is operatively connected to an inlet of a second proportional-type mixing valve 992 which has the other inlet operatively connected to the outlet of compressor 978 and valve 992 is operable to receive and mix fluid from these two sources and discharge same therefrom through the outlet thereof which is operatively connected to the inlet of the turbine 980.

Water separator means 994 is provided and has the inlet thereof operatively connected to the outlet of the turbine 980 to receive expanded and cooled air or other fluids therefrom and the outlet of the water separator means 994 is operatively connected to a cabin 996 of an aircraft or the like. Water separator 994 can be of any suitable construction, such as that shown in FIG. 4 and described hereinbefore.

A cabin air outlet conduit 998 has one end portion positioned in the cabin or the like 996 and a pressure regulating valve 1000 is positioned in the tube or conduit 998 and is operable to open at a pre-determined pressure in the cabin to exhaust cabin air into the conduit 998. The other end portion of the tube or conduit 998 is operatively connected to the low pressure side 988 of the recuperating heat exchanger 984 to provide the relatively cool cabin exhaust air to the heat exchanger 984 for cooling of high pressure air or other fluids in the high pressure side 986 thereof. A tube or conduit 1002 can be connected to the outlet of the low pressure side 988 of the recuperating heat exchanger 984 to receive low pressure air therefrom and discharge same overboard the aircraft or for other suitable uses.

Cooling air or other fluid is provided to the low pressure side 966 of heat exchanger 962 by a ram air inlet conduit 1004 which is connected in one end portion to the low pressure side 966 of the heat exchanger 962 and the other end portion thereof is connectible to a suitable source of ram air, such as the ram air inlet of an engine or the like as shown for the tube or conduit 560 in FIG. 10. A ram air outlet conduit 1006 can be connected in one end portion to the low pressure outlet of the low pressure side 966 of the heat exchanger 962 to receive low pressure air therefrom and the other end portion thereof is positionable to discharge low pressure air therefrom overboard the aircraft or the like.

Valve control means is shown at 1008 and includes heat sensing means or elements 1010 and 1012 positioned between the outlet of the turbine 980 and the inlet of the water separator means 994 and such are desirably high and low temperature sensing elements to prevent icing of the fluid provided to the cabin or the like and to limit maximum temperature of such fluid. A thermostate element 1014 and an on-off switch 1016 are positionable in the aircraft cabin 996 and operate the valve control means 1008. The valve control means 1008 is operatively connected to mixing valves 972 and 992 and is operable in response to temperature conditions in the cabin or the like to open and close the valve and regulate passage of fluid therethrough to maintain the desired temperature in the cabin.

The operation of the air conditioning and pressurization system 960 shown in FIG. 14 is similar to that described hereinbefore in connection with FIG. 10 with the high pressure air or other fluid entering conduit 968 being cooled in heat exchangers 962 and 984 and further cooled and expanded in turbine 980 and subsequently dried in water separator means 994 for discharge into the aircraft or the like with pressurization being maintained in the cabin 996 by operation of the valve 1000. Structurally, the elements of the system 960 can be the same or similar to those shown in FIGS. 2–4 and 10 and described hereinbefore.

Figure 15:
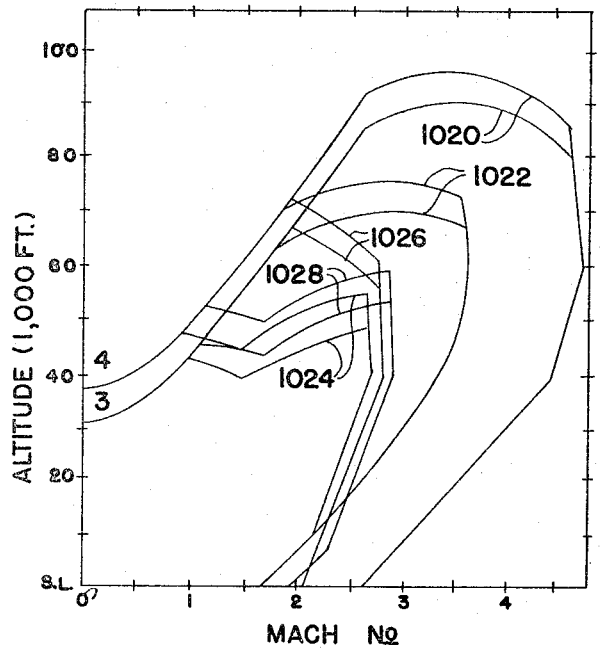
FIG. 15 is a graph or diagram illustrating performance envelopes for the air conditioning and pressurization systems illustrated in FIGS. 10–14.

FIG. 15 of the drawings illustrates performance envelopes for each of the bootstrap systems of FIGS. 10–14 of the drawings. In FIG. 15 the altitude of operation of the aircraft or the like is indicated on one side, the ordinate, of the graph or diagram and the Mach number of the vehicle is illustrated along the other side, the abscissa, of the graph and, in each instance, the performance is shown for bleed or engine pressure ratios of 3 and 4 as indicated on the left portion of the FIG. 15. The performance envelope for the system 550 of FIG. 10 is illustrated at 1020 for the various pressure ratios and the performance envelope for the system of FIG. 11 is shown at 1022 for the various bleed pressure ratios. Also, the performance envelope for the system of FIG. 12 is illustrated at 1024, the performance envelope for the system of FIG. 13 is shown at 1026, and the performance envelope for the system of FIG. 14 is illustrated at 1028.

Another preferred specific embodiment of the air conditioning and pressurization system for aircraft and the like is illustrated generally at 1030 in FIG. 16. The system 1030 is a vapor cycle system and includes an air-to-air heat exchanger means to condition portions of the cooling of the air or other fluid to be provided to the aircraft cabin or the like. The air-to-air pre-cooling heat exchanger is shown generally at 1032 and includes a high pressure side 1034 and a low pressure side 1036 which are in heat exchange relation. The heat exchanger 1032 can be of the same or similar structure as that illustrated in FIG. 2 and described hereinbefore. The high pressure side 1034 of heat exchanger 1032 preferably has an inlet operatively connected to a high pressure air inlet conduit 1038 which is also connectible to a source of pressurized air or other fluid, such as to a compressor or the like of the aircraft engine. A pressure limiting valve 1040 is provided in the conduit 1038 to limit maximum pressure of fluid supplied to the system.

The high pressure side 1034 of heat exchanger 1032 has the outlet thereof operatively connected to an intermediate portion of a tube or conduit 1042 which has one end portion thereof connected to an inlet of a mixing valve 1044. The other inlet of the mixing valve 1044 is connected to a tube or conduit 1046 which is also connected to the high pressure air inlet conduit 1038 between valve 1040 and heat exchanger 1032. Mixing valve 1044 is operable to receive high pressure fluid from the heat exchanger high pressure side or from the high pressure air inlet conduit 1038 and mix same therein and discharge same therefrom into one end portion of a tube or conduit 1048. Conduit 1048 is connected in the other end portion to a bypass conduit 1049 and to a tube or conduit 1052 to provide a mixture of air or other fluid to the tube or conduit 1052. A throttling valve 1050 is provided in bypass conduit 1049 to regulate passage of fluid therethrough.

A first turbine-compressor unit is shown generally at 1054 and includes an air turbine 1056 and a refrigerant compressor 1058 which are preferably operatively connected to a common shaft 1060 and the turbine compressor unit 1054 can be of the same or similar construction as that shown in FIG. 3 and described hereinbefore. The inlet of turbine 1056 is operatively connected to the other end portion of the tube or conduit 1052 to receive high pressure fluid therefrom with the fluid received by turbine 1056 being expanded during passage therethrough with the air or fluid being discharged therefrom being at a lower temperature and pressure than the incoming fluid.

A cabin air inlet tube or conduit 1062 is operatively connected in one end portion to the outlet of the turbine 1056 and to the other end of the bypass tube or conduit 1049 and the other end of the cabin air inlet conduit is connected to a cabin or the like 1064 of an aircraft or other suitable vehicle. Thus, air under pressure can be supplied to tube or conduit 1038 and passed through the high pressure side of heat exchanger 1032 for cooling therein and subsequently passed through the turbine 1056 for expansion and cooling therein and is then provided to the cabin 1064 of the aircraft or the like and temperature regulation of this air is obtained by operation of the mixing valve 1044 and the throttling valve 1050 to bypass all or a portion of the cooling means.

A refrigerant condensing heat exchanger is shown generally at 1066 and includes a high pressure side 1068 and a low pressure side 1070 which are in heat exchange relation. The inlet of the high pressure side 1068 of the refrigerant condensing heat exchanger is operatively connected to the outlet of the compressor 1058 and the compressor, in operation, compresses vaporized refrigerant and supplies same to the heat exchanger 1066 for condensing therein, such condensing resulting from cooling of the vapor in the heat exchanger as a result of passage of low pressure relatively cool fluid through side 1070 of the heat exchanger.

A refrigerant evaporating heat exchanger is shown generally at 1072 and includes a high pressure or vapor side 1074 for refrigerant vapor and a low pressure side 1076 for air or other fluid to be cooled and, in operation, the refrigerant vapor in side 1074 removes heat from air or other fluid passing through the low pressure side 1076 to thereby cool the air or other fluid. The outlet of the low pressure side 1076 of the heat exchanger 1072 is operatively connected to an intermediate portion of the cabin air inlet conduit 1062 to provide additional low pressure air to the cabin 1064. The outlet of the high pressure or vapor side 1074 of heat exchanger 1072 is operatively connected to the inlet of compressor 1058 to provide expanded and warmed refrigerant vapor to the compressor 1058 for compression and subsequent transfer through the vapor side 1068 of heat exchanger 1066 for condensation therein. A tube or conduit 1078 is connected in its end portions to the outlet of the high pressure or vapor side 1068 of heat exchanger 1066 and to the inlet of the high pressure or vapor side 1074 of the heat exchanger 1072 and a common liquid refrigerant throttling valve 1080 is positioned in tube or conduit 1078 to regulate flow of liquid refrigerant to the high pressure or vapor side of the heat exchanger 1072. Valve 1080 desirably includes a heat sensing element 1082 positioned at the outlet of the vapor side 1074 of heat exchanger 1072 and the valve 1080 operates in response to the temperature of the refrigerant at the outlet of the high pressure side or vapor side 1074 of the heat exchanger 1072 to provide liquid refrigerant from conduit 1078 into the side 1074 of the heat exchanger for expansion or vaporization therein to thereby provide a coolant for the fluid passing through the low pressure side 1076 of the heat exchanger.

A first cabin air outlet conduit or tube 1084 has one end portion positioned in the cabin 1064 and the other end portion thereof is operatively connected to the low pressure side 1076 of the heat exchanger 1072 so that cabin air can be recirculated through the low pressure side of the heat exchanger 1072 for further cooling and return to the cabin through conduit 1062. Preferably, a blower fan 1086 is provided at the inlet of the low pressure side 1076 of heat exchanger 1072 to draw cabin air through conduit 1084 and pass same through the low pressure side of the heat exchanger 1072. The other end portion of conduit or tube 1042 can be operatively connected to the upstream side of blower fan 1086 to provide pressurized air to the blower fan 1086 to drive same and the exhaust air from the blower fan 1086 is mixed with air from conduit or tube 1084.

A second air outlet tube or conduit 1090 is preferably provided and has one end portion positioned in the cabin 1064 and preferably a cabin pressure regulator valve 1092 is connected to the tube or conduit 1090 which is operable to open at a pre-determined pressure and exhaust cabin air from the cabin when the air pressure in the cabin rises above the desired level. The other end portion of tube or conduit 1090 can be located to direct cabin exhaust air to any suitable structure or can be used to discharge cabin exhaust air overboard the aircraft.

A second turbine-compressor unit is preferably provided and is shown generally at 1100 and includes a turbine 1102 and a compressor 1104 preferably mounted on a common shaft and the unit 1100 can be of the same or similar construction as that shown in FIG. 3 and described hereinbefore. A ram air inlet conduit 1106 is connected in one end portion to the inlet of turbine 1102 and the other end portion thereof is connectible to a source of ram air from the atmosphere or from the inlet of a jet engine or the like. The outlet of the turbine 1102 is operatively connected to a tube or conduit 1108 which is also operatively connected to the low pressure sides 1036 and 1070 of the pre-cooling heat exchanger 1032 and the refrigerant condensing heat exchanger 1066. While the low pressure sides 1070 and 1036 of the heat exchangers are shown as being physically interconnected, it will be understood that entirely separate units can be provided if desired.

A bypass tube or conduit 1110 is preferably provided and operatively connected in its end portions to the ram air inlet conduit 1106 and to the tube or conduit 1108 and preferably has control valve means 1112 therein which are operable, when opened, to bypass ram air around the turbine 1102, such being desirable when minimum cooling is desired in the heat exchangers 1032 and 1066.

The outlets of the low pressure sides 1036 and 1070 of the heat exchangers 1032 and 1066 are operatively connected to one end portion of a tube or conduit 1114 and an intermediate portion of this tube or conduit is operatively connected to the inlet of the compressor 1104 to provide low pressure air or fluid thereto with such being compressed in the compressor and discharged therefrom through the outlet thereof to the atmosphere, etc. The other end portion of the tube or conduit 1114 preferably has a control valve 1116 therein which is operable in connection with the control valve 1112 to, when opened, bypass the compressor 1104 and discharge air or other fluid directly from the low pressure side of the heat exchanger overboard the aircraft.

In operation, the air conditioning and pressurization system 1030 can receive high pressure air or other fluid in conduit 1038 and transfer same through the high pressure side of the heat exchanger 1032 for cooling therein or all or a portion thereof can be bypassed through tube or conduit 1046 to mixing valve 1044. Mixing valve 1044 can mix the streams of fluid provided thereto and provides same to the throttling valve 1050 and the turbine 1056 with the fluid supplied to the turbine being expanded and discharged through the cabin air inlet conduit 1062 to the cabin 1064. Cabin air is recirculated for additional cooling by passing same through the conduit 1084 and across the low pressure side of the heat exchanger 1072 while, simultaneously, a liquid refrigerant is evaporated in the high pressure side of the heat exchanger to thereby remove heat from the cabin air being recirculated therethrough. The resulting refrigerant vapor is drawn into the compressor 1058 and compressed therein to thereby result in an increase in the temperature of the refrigerant with such being transferred through the vapor or high pressure side of the heat exchanger 1066 while simultaneously cool ram air is passed through the low pressure side thereof to result in a reduction of temperature of the vapor which results in condensation of the vapor with the resulting refrigerant condensate being transferred through tube or conduit 1078 and valve 1080 back to the refrigerant or vapor side of the heat exchanger 1072. Pressure in cabin 1064 is maintained by operation of the valve 1092 which is closed until pressure in the cabin rises above a specific level at which time the valve 1092 automatically opens and cabin air is exhausted through tube or conduit 1090 to the atmosphere. If desirable, the cabin exhaust air from conduit 1090 can be utilized as a source of air for the turbine of turbine-compressor unit 1100 or in connection with a separate turbine-compressor unit and recuperating heat exchanger as illustrated in other embodiments of the invention described hereinbefore. Also, water separator means can be utilized immediately upstream of the cabin 1064 in the cabin air inlet tube or conduit 1062 in the manner described hereinbefore in connection with other embodiments of the invention. In the event the aircraft or other vehicle is operating in conditions where high humidity is anticipated, then additional water removal or humidity control can be obtained by installation and operation of a re-heat heat exchanger between the water separator means and the cabin of the aircraft, such being disclosed in my co-pending patent application referred to hereinbefore.

While the invention has been described in connection with preferred specific embodiments of the method and means for air conditioning and pressurizing an aircraft cabin or the like, it will be understood that such is intended to illustrate and not to limit the scope of the invention which is defined by the claims.

I claim:

1. An air cycle air conditioning and pressurization system for aircraft and the like comprising, in combination, an air-to-air pre-cooling heat exchanger having a housing with a low pressure air inlet at one end thereof and a low pressure air outlet at the other end thereof and having a high pressure air inlet and a high pressure air outlet intermediate the ends thereof, a plurality of tubes each connected in one end portion to said high pressure air inlet of said heat exchanger and having the other end portion thereof connected to said high pressure air outlet of said heat exchanger with the intermediate portions of said tubes being positioned across the intermediate portion of said housing of said heat exchanger, a high pressure air inlet conduit connected in one end portion to said high pressure air inlet of said heat exchanger and connectible in the other end portion to a source of pressurized air, a pressure limiting valve in said high pressure air inlet conduit operable to limit the maximum pressure of air supplied to said heat exchanger, an air-to-air recuperating heat exchanger having a housing with a low pressure air inlet at one end portion thereof and a low pressure air outlet at the other end portion thereof and having a high pressure air inlet and a high pressure air outlet intermediate the ends of said housing, a plurality of tubes each connected in one end portion to said high pressure air inlet of said recuperating heat exchanger and having the other end portion thereof connected to said high pressure air outlet of said recuperating heat exchanger with the intermediate portions of said tubes being positioned across the intermediate portion of said housing of said recuperating heat exchanger, said high pressure air outlet of said pre-cooling heat exchanger being operatively connected to said high pressure air inlet of said recuperating heat exchanger so that high pressure air leaving said pre-cooling heat exchanger is directed to said recuperating heat exchanger, a proportional type mixing valve having two air inlets and an air outlet with one of said inlets of said valve being operatively connected to said high pressure air outlet of said recuperating heat exchanger, conduit means connected in one end portion to the other of said inlets of said mixing valve and connected in the other end portion to said high pressure air inlet conduit between said pressure limiting valve and said high pressure air inlet of said pre-cooling heat exchanger, said mixing valve being operable to pass air therethrough from said high pressure air conduit, from said recuperating heat exchanger, or mix air from said high pressure air inlet conduit and said recuperating heat exchanger and discharge same through said outlet thereof, a first turbine-compressor unit having a housing with a compressor air inlet and a compressor air outlet and having a turbine air inlet and a turbine air outlet, said compressor air inlet being operatively connected to said low pressure air outlet of said pre-cooling heat exchanger, a shaft rotatably mounted in said housing of said turbine-compressor unit and having a plurality of vanes connected to one end portion of said shaft for rotation therewith with said vanes being shaped and positioned to receive air from said compressor air inlet and compress and discharge same from said compressor air outlet during rotation of said shaft, a plurality of blades connected to the other end portion of said shaft for rotation with said shaft, said blades being positioned to be engaged by air entering said turbine air inlet to cause rotation of said blades and said shaft and with air leaving said housing through said turbine air outlet with air passing through said turbine being expanded therein and discharged at a temperature and pressure lower than the temperature and pressure of air entering said turbine, said turbine air inlet of said turbine-compressor unit being operatively connected to said outlet of said mixing valve with pressurized air entering said turbine causing rotation of said shaft to operate said compressor, a water separator having an air inlet operatively connected to said turbine air outlet of said turbine-compressor unit and an air outlet connectible to an airplane cabin or the like to be cooled, means in said water separator operable to remove water from air passing therethrough, a cabin air outlet conduit having one end portion thereof positionable in the aircraft cabin or the like to be conditioned, a cabin pressure regulating valve secured to said one end portion of said cabin air outlet conduit with said regulating valve being openable at a pre-determined pressure to exhaust air from said cabin of said aircraft and closeable at lower pressures to maintain a desired pressure in said cabin, a second turbine-compressor unit having a housing with a turbine air inlet and a turbine air outlet and having a compressor air inlet and a compressor air outlet, said turbine air inlet of said second turbine-compressor unit being operatively connected to the other end portion of said cabin air outlet conduit, said second turbine-compressor unit having a shaft in said housing and having turbine blades on one end portion of said shaft and compressor vanes connected to the other end portion of said shaft with air from said cabin entering said turbine air inlet and being directed across said turbine blades causing rotation of said shaft and operation of said compressor with air discharged from said turbine air outlet being cooler and lower in pressure than air received from said cabin, bypass conduit means connected to said turbine air outlet and said turbine air inlet of said second turbine-compressor unit, control valve means in said bypass conduit means operable to regulate flow of air from said cabin to said turbine of said second turbine-compressor unit, a conduit operatively connected in its end portions to said turbine air outlet of said second turbine-compressor unit and to said low pressure air inlet of said housing of said recuperating heat exchanger, another conduit connected in one end portion to said outlet of said housing of said recuperating heat exchanger and connected in an intermediate portion to said compressor air inlet of said second turbine-compressor unit, a control valve secured to the other end portion of said last named conduit and operable to regulate flow of air to said compressor of said second turbine-compressor unit, a third turbine-compressor unit having a housing with a turbine air inlet and a turbine air outlet and having a compressor air inlet and a compressor air outlet, a ram air inlet conduit connected in one end portion to said turbine air inlet of said housing of said third turbine-compressor unit and having the other end portion thereof positionable in an aircraft or the like to receive ram air during flight of said aircraft, a conduit connected in the end portions to said turbine outlet of said third turbine-compressor unit to said low pressure air inlet of said pre-cooling heat exchanger, bypass conduit means connected to said turbine air outlet of said third turbine-compressor unit and to said ram air inlet conduit, control valve means positioned in said last-named bypass conduit operable to regulate flow of ram air to said turbine of said third turbine-compressor unit, another conduit connected in one end portion to said compressor air outlet of said first turbine-compressor unit and connected in an intermediate portion to said compressor air inlet of said third turbine-compressor unit, a control valve in said last-named conduit downstream from said compressor air inlet of said third turbine-compressor unit and operable to regulate flow of air through said compressor of said third turbine-compressor unit, thermostat operated valve control means operatively connected to said mixing valve and said control valves, said valve control means having a regulator positionable in the cabin to be conditioned and temperature sensing means positioned at said turbine air outlet of said first turbine-compressor unit, said valve control means being operable in response to said regulator and said temperature sensing means to regulate operation of said mixing valve and said control valves, said air conditioning and pressurization system being constructed and adapted so that pressurized air from said pressurized air inlet conduit can be passed through said high pressure side of said pre-cooling heat exchanger and said recuperating heat exchanger and cooled in said heat exchangers with air leaving said recuperating heat exchanger high pressure side being mixed with air from said pressurized air conduit and expanded and cooled in said turbine of said first turbine-compressor unit and passed through said water separator and into the cabin of an aircraft or the like, the air pressure in said cabin being regulated by operation of said cabin pressure regulating valve, air leaving said cabin being provided to said turbine of said second turbine-compressor unit for expansion and cooling therein and through the low pressure side of said recuperating heat exchanger, air leaving said low pressure outlet of said recuperating heat exchanger being provided to said compressor of said second turbine-compressor unit, and with ram air from said ram air inlet conduit being provided to said turbine of said third turbine-compressor unit and expanded and cooled therein and transferred therefrom through the low pressure side of said pre-cooling heat exchanger and provided from said low pressure outlet of said pre-cooling heat exchanger to said compressor of said first turbine-compressor unit, air being discharged from said compressor of said first turbine-compressor unit being provided to said compressor of said third turbine-compressor unit and discharged therefrom overboard the aircraft.

2. An air cycle air conditioning and pressurization system for aircraft and the like comprising, in combination, an air-to-air pre-cooling heat exchanger having a low pressure air inlet and a low pressure air outlet and having a high pressure air inlet and a high pressure air outlet, tube means in said heat exchanger to transfer air from said high pressure air inlet to said high pressure air outlet, conduit means connected to said high pressure air inlet and connectible to a source of pressurized air, an air-to-air recuperating heat exchanger having a low pressure air inlet and a low pressure air outlet and having a high pressure air inlet and a high pressure air outlet with said high pressure air inlet being operatively connected to said high pressure air outlet of said pre-cooling heat exchanger, tube means in said recuperating heat exchanger connected to said high pressure air inlet and said high pressure air outlet thereof, a proportional type mixing valve having two air inlets and an air outlet with one of said inlets being operatively connected to said high pressure air outlet of said recuperating heat exchanger and the other of said air inlets of said valve being connectible to a separate source of air under pressure, a first turbine-compressor unit having air inlets and air outlets for the turbine and compressor thereof, said compressor air inlet being operatively connected to said low pressure air outlet of said pre-cooling heat exchanger and said turbine air inlet being operatively connected to said outlet of said mixing valve, air from said mixing valve passing through said turbine being expanded and cooled therein and discharged from said turbine air outlet thereof, water separator means having an air inlet operatively connected to said turbine air outlet with said water separator means having an air outlet operatively connected to an airplane cabin or the like to be cooled, cabin air outlet conduit means operatively connectible to said cabin, pressure regulator valve means in said cabin air outlet conduit means operable to open at a pre-determined pressure in said cabin to exhaust air therefrom, a second turbine-compressor unit having turbine and compressor air inlets and air outlets, said turbine air inlet of said second turbine-compressor unit being operatively connected to said cabin air outlet conduit means and said air outlet of said turbine of said second turbine-compressor unit being operatively connected to said low pressure air inlet of said recuperating heat exchanger, said compressor air inlet of said second turbine-compressor unit being operatively connected to said low pressure air outlet of said recuperating heat exchanger, and a third turbine-compressor unit having turbine and compressor air inlets and air outlets with said compressor air inlet of said third turbine-compressor unit being operatively connected to said compressor air outlet of said first turbine-compressor unit, conduit means operatively connected to said turbine air inlet of said third turbine-compressor unit to provide air thereto in operation, said turbine air outlet of said third turbine-compressor unit being operatively connected to said low pressure air inlet of said pre-cooling heat exchanger, said air conditioning and pressurization system being constructed and adapted so that air from a pressurized source can be cooled in said pre-cooling and recuperating heat exchangers and further cooled in said turbine of said first turbine-compressor unit and passed through said water separator means for removal of water therefrom prior to being discharged into an aircraft cabin or the like, and with air from the cabin or the like being further cooled and reduced in pressure by passing through said turbine of said second turbine-compressor unit and being provided through the low pressure side of said recuperating heat exchanger, air being provided through said turbine of said third turbine-compressor unit for expansion and cooling therein with air from said turbine of said third turbine-compressor unit being provided to the low pressure side of said pre-cooling heat exchanger for cooling of high pressure air passing therethrough.

3. An air conditioning system comprising, in combination, pre-cooling heat exchanger means having a high pressure side in heat exchange relation with a low pressure side, said high pressure side of said heat exchanger means being connectible to a source of gas under pressure, recuperating heat exchanger means having a high pressure side operatively connected to the outlet of said high pressure side of said pre-cooling heat exchanger means, said recuperating heat exchanger means having a low pressure side in heat exchange relation with said high pressure side thereof, first expansion cooling means having the inlet thereof operatively connected to the outlet of said high pressure side of said recuperating heat exchanger means and having the outlet side thereof operatively connectible to an enclosure to be cooled, second expansion cooling means having the inlet thereof connectible to the enclosure to be cooled to receive gas therefrom and having the outlet thereof operatively connected to the inlet of said low pressure side of said recuperating heat exchanger means, and third expansion cooling means having the outlet thereof operatively connected to the inlet of said low pressure side of said pre-cooling heat exchanger means, said air-conditioning system being constructed and adapted so that a gas can be passed through said high pressure side of said pre-cooling heat exchanger means and said high pressure side of said recuperating heat exchanger means for cooling therein with further cooling of the gas being obtained by expansion of the gas in said first expansion cooling means, and with gas from the enclosure or the like to be cooled being passed therefrom through said second expansion cooling means and provided to said low pressure side of said recuperating heat exchanger means, and with gas from said third expansion cooling means being provided to said low pressure side of said pre-cooling heat exchanger means for cooling of gas in said high pressure side thereof.

4. An air cycle air conditioning and pressurization system for aircraft and the like comprising, in combination, an air-to-air pre-cooling heat exchanger having a housing with a low pressure air inlet at one end thereof and a low pressure air outlet at the other end thereof and having a high pressure air inlet and a high pressure air outlet intermediate the ends thereof, a plurality of tubes each connected in one end portion to said high pressure air inlet of said heat exchanger and having the other end portion thereof connected to said high pressure air outlet of said heat exchanger with the intermediate portions of said tubes being positioned across the intermediate portion of said housing of said heat exchanger, a high pressure air inlet conduit connected in one end portion to said high pressure air inlet of said heat exchanger and connectible in the other end portion to a source of pressurized air, a pressure limiting valve in said high pressure air inlet conduit operable to limit the maximum pressure of air supplied to said heat exchanger, an air-to-air recuperating heat exchanger having a housing with a low pressure air inlet at one end portion thereof and a low pressure air outlet at the other end portion thereof and having a high pressure air inlet and a high pressure outlet intermediate the ends of said housing, a plurality of tubes each connected in one end portion to said high pressure air inlet of said recuperating heat exchanger and having the other end portion thereof connected to said high pressure air outlet of said recuperating heat exchanger with the intermediate portions of said tubes being positioned across the intermediate portion of said housing of said recuperating heat exchanger, said high pressure air outlet of said precooling heat exchanger being operatively connected to said high pressure air inlet of said recuperating heat exchanger so that high pressure air leaving said pre-cooling heat exchanger is directed to said recuperating heat exchanger, a proportional type mixing valve having two air inlets and an air outlet with one of said inlets of said valve being operatively connected to said high pressure air outlet of said recuperating heat exchanger, conduit means connected in one end portion to the other of said inlets of said mixing valve and connected in the other end portion to said high pressure air inlet conduit between said pressure limiting valve and said high pressure air inlet of said pre-cooling heat exchanger, said mixing valve being operable to pass air therethrough from said high pressure air conduit, from said recuperating heat exchanger, or mix air from said high pressure air inlet conduit and said recuperating heat exchanger and discharge same through said outlet thereof, a first turbine-compressor unit having a housing with a compressor air inlet and a compressor air outlet and having a turbine air inlet and a tubine air outlet, said compressor air inlet being operatively connected to said low pressure air outlet of said pre-cooling heat exchanger, a shaft rotatably mounted in said housing of said turbine-compressor unit and having a plurality of vanes connected to one end portion of said shaft for rotation therewith with said vanes being shaped and positioned to receive air from said compressor air inlet and compress and discharge same from said compressor air outlet during rotation of said shaft, a plurality of blades connected to the other end portion of said shaft for rotation with said shaft, said blades being positioned to be engaged by air entering said turbine air inlet to cause rotation of said blades and said shaft and with air leaving said housing through said turbine air outlet with air passing through said turbine being expanded therein and discharged at a temperature and pressure lower the temperature and pressure of air entering said turbine, said turbine inlet of said turbine-compressor unit being operatively connected to said outlet of said mixing valve with pressurized air entering said turbine causing rotation of said shaft to operate said compressor, a water separator having an air inlet operatively connected to said turbine air outlet of said turbine-compressor unit and an air outlet connectible to an airplane cabin or the like to be cooled, means in said water separator operable to remove water from air passing therethrough, a cabin air outlet conduit having one end portion thereof positionable in the aircraft or the like to be conditioned, a cabin pressure regulating valve secured to said one end portion of said cabin air outlet conduit with said regulating valve being openable at a pre-determined pressure to exhaust air from said cabin of said aircraft and closeable at lower pressures to maintain a desired pressure in said cabin, a second turbine-compressor unit having a housing with a turbine air inlet and a turbine air outlet and having a compressor air inlet and a compressor air outlet, said turbine air inlet of said second turbine-compressor unit being operatively connected to the other end portion of said cabin air outlet conduit, said second turbine-compressor unit having a shaft in said housing and having turbine blades on one end portion of said shaft and compressor vanes connected to the other end portion of said shaft and compressor vanes connected to the other end portion of said shaft with air from said cabin entering said turbine air inlet and being directed across said turbine blades causing rotation of said shaft and operation of said compressor with air discharging from said turbine air outlet being cooler and lower in pressure than air received from said cabin, bypass conduit means connected to said turbine air outlet and said turbine air inlet of said second turbine-compressor unit, control valve means in said bypass conduit means operable to regulate flow of air from said cabin to said turbine of said second turbine-compressor unit, a conduit operatively connected in its end portions to said turbine air outlet of said second turbine-compressor unit and to said low pressure air inlet of said housing of said recuperating heat exchanger, another conduit connected in one end portion to said outlet of said housing of said recuperating heat exchanger and connected in an intermediate portion to said compressor air inlet of second turbine-compressor unit, a control valve secured to the other end portion of said last-named conduit and operable to regulate flow of air to said compressor of said second turbine-compressor unit, a ram air inlet conduit connected in one end portion to said low pressure air inlet of said housing of said pre-cooling heat exchanger and having other end portion thereof positionable in an aircraft, thermostat operated valve control means operably connected to said mixing valve and said control valves, said valve control means having a regulator positionable in the cabin to be conditioned and temperature sensing means positioned at said turbine air outlet of said first turbine-compressor unit, said control valve means being operable in response to said regulator and said temperature sensing means to regulate operation of said mixing valve and said control valves, said air conditioning and pressurization system being constructed and adapted so that pressurized air from said pressurized air inlet conduit can be passed through the high pressure side of said pre-cooling heat exchanger and said recuperating heat exchanger and cooled in said heat exchangers with air leaving said recuperating heat exchanger high pressure side being mixed with air from said high pressure air inlet conduit and expanded and cooled in said turbine of said first turbine-compressor unit and passed through said water separator into the cabin of the aircraft or the like, the air pressure in said cabin being regulated by operation of said pressure regulating valve, air leaving said cabin being provided to said turbine of said second turbine-compressor unit for expansion and cooling therein and then through the low pressure side of said recuperating heat exchanger, air leaving said low pressure outlet of said recuperating heat exchanger being provided to said compressor of said second turbine-compressor unit, and ram air from said ram air inlet conduit being provided to said low pressure air inlet of said housing of said pre-cooling heat exchanger and provided from said low pressure outlet of said pre-cooling heat exchanger to said compressor of said first turbine-compressor unit, air being discharged from said compressor of said first turbine-compressor unit overboard the aircraft.

5. An air cycle air conditioning and pressurization system for aircraft and the like comprising, in combination, an air-to-air pre-cooling heat exchanger having a low pressure air inlet and a low pressure air outlet and having a high pressure air inlet and a high pressure air outlet, tube means in said heat exchanger to transfer air from said high pressure air inlet to said high pressure air outlet, conduit means connected to said high pressure air inlet and connectible to a source of pressurized air, an air-to-air recuperating heat exchanger having a lower pressure air inlet and a low pressure air outlet and having a high pressure air inlet and a high pressure air outlet with said high pressure air inlet being operatively connected to said high pressure air outlet of said pre-cooling heat exchanger, tube means in said recuperating heat exchanger connected to said high pressure air inlet and said high pressure air outlet thereof, a proportional type mixing valve having two air inlets and an air outlet with one of said inlets being operatively connected to said high pressure air outlet of said recuperating heat exchanger and the other of said air inlets of said valve being connectible to a separate source of air under pressure, a first turbine-compressor unit having air inlets and air outlets for the turbine and compressor thereof, said compressor air inlet being operatively connected to said lower pressure air outlet of said precooling heat exchanger and said turbine air inlet being operatively connected to said outlet of said mixing valve, air from said mixing valve passing through said turbine being expanded and cooled therein and discharged from said turbine air outlet thereof, water separator means having an air inlet operatively connected to said turbine air outlet with said water separator means having an air outlet operatively connected to an airplane cabin or the like to be cooled, cabin air outlet conduit means operatively connectible to said cabin, pressure regulating valve means in said cabin air outlet conduit means operable to open at a pre-determined pressure in said cabin to exhaust air therefrom, a second turbine-compressor unit having turbine and compressor air inlets and air outlets, said turbine air inlets of said second turbine-compressor unit being operatively connected to said cabin air outlet conduit means and said air outlet of said turbine of said second turbine-compressor unit being operatively connected to said low pressure air inlet of said recuperating heat exchanger, said compressor air inlet of said second turbine-compressor unit being operatively connected to said low pressure air outlet of said recuperating heat exchanger, and ram air inlet conduit means operatively connected to said low pressure air inlet of said pre-cooling heat exchanger, said air conditioning and pressurization system being constructed and adapted so that air from a pressurized source can be cooled in said pre-cooling and recuperating heat exchangers and further cooled in said turbine of said first turbine-compressor unit and passed through said water separator means for removal of water therefrom prior to being discharged into an aircraft or the like, and with air from the cabin or the like being further cooled and reduced in pressure by passing through said turbine of said second turbine-compressor unit and being provided through the low pressure side of said recuperating heat exchanger, ram air from said ram air inlet conduit means being provided to the low pressure side of said pre-cooling heat exchanger for cooling of high pressure air passing therethrough.

6. An air conditioning system comprising, in combination, pre-cooling heat exchanger means having a high pressure side and a low pressure side in heat exchanger relation, recuperating heat exchanger means having a high pressure side with the inlet thereof operatively connected to the outlet of said high pressure side of said pre-cooling heat exchanger means, said recuperating heat exchanger means having a low pressure side in heat exchange relation with said high pressure side thereof, first expansion cooling means having the inlet thereof operatively connected to the outlet of said high pressure side of said recuperating heat exchanger means and the outlet of said first expansion cooling means being operatively connectible to an enclosure to be cooled, second expansion cooling means having the inlet thereof operatively connected to the enclosure to be cooled and having the outlet thereof operatively connected to the inlet of said low pressure side of said recuperating heat exchanger means, and means operatively connected to the low pressure inlet of said low pressure side of said pre-cooling heat exchanger means operable to a direct cooling fluid thereto, said air conditioning system being constructed and adapted so that high pressure gas can be supplied through said high pressure side of said pre-cooling heat exchanger means and said high pressure side of said recuperating heat exchanger means for cooling therein with further cooling of the high pressure gas being obtained by passage of the gas through said first expansion cooling means, a gas from the enclosure to be cooled being provided to said second expansion cooling means for expansion and cooling therein with the resulting cooled gas being directed through said low pressure side of said recuperating heat exchanger means to cool high pressure gas passing therethrough.

7. An air cycle air conditioning and pressurization system for aircraft and the like comprising, in combination, an air-to-air pre-cooling heat exchanger having a housing with a low pressure air inlet at one end thereof and a low pressure air outlet at the other end thereof and having a high pressure air inlet and a high pressure air outlet intermediate the ends thereof, a plurality of tubes each connected in one end portion to said high pressure air inlet of said heat exchanger and having the other end portion thereof connected to said high pressure air outlet of said heat exchanger with the intermediate portions of said tubes being positioned across the intermediate portion of said housing of said heat exchanger, a high pressure air inlet conduit connected in one end portion to said high pressure air inlet of said heat exchanger and connectible in the other end portion to a source of pressurized air, a pressure limiting valve in said high pressure air inlet conduit operable to limit the maximum pressure of air supplied to said heat exchanger, an air-to-air recuperating heat exchanger having a housing with a low pressure air inlet at one end portion thereof and a low pressure air outlet at the other end portion thereof and having a high pressure air inlet and a high pressure air outlet intermediate the ends of said housing, a plurality of tubes each connected in one end portion to said high pressure air inlet of said recuperating heat exchanger and having the other end portion thereof connected to said high pressure air outlet of said recuperating heat exchanger with the intermediate portions of said tubes being positioned across the intermediate portion of said housing of said recuperating heat exchanger, said high pressure air outlet of said pre-cooling heat exchanger being operatively connected to said high pressure air inlet of said recuperating heat exchanger so that high pressure air leaving said pre-cooling heat exchanger is directed to said recuperating heat exchanger, a proportional type mixing valve having two air inlets and an air outlet with one of said inlets of said valve being operatively connected to said high pressure air outlet of said recuperating heat exchanger, conduit means connected in one end portion to the other of said inlets of said mixing valve and connected in the other end portion to said high pressure air inlet conduit between said pressure limiting valve and said high pressure air inlet of said pre-cooling heat exchanger, said mixing valve being operable to pass air therethrough from said high pressure air conduit, from said recuperating heat exchanger, or mix air from said high pressure air inlet conduit and said recuperating heat exchanger and discharge same through said outlet thereof, a first turbine-compressor unit having a housing with a compressor air inlet and a compressor air outlet and having a turbine air inlet and a turbine air outlet, said compressor air inlet being operatively connected to said low pressure air outlet of said pre-cooling heat exchanger, a shaft rotatably mounted in said housing of said turbine compressor unit and having a plurality of vanes connected to one end portion of said shaft for rotation therewith with said vanes being shaped and positioned to receive air from said compressor air inlet and compress and discharge same from said compressor air inlet and compress and discharge same from said compressor air outlet during rotation of said shaft, a plurality of blades connected to the other end portion of said shaft for rotation with said shaft, said blades being positioned to be engaged by air entering said turbine air inlet to cause rotation of said blades and said shaft and with air leaving said housing through said turbine air outlet with air passing through said turbine being expanded therein and discharged at a temperature and pressure lower than the temperature and pressure of air entering said turbine, said turbine inlet of said turbine-compressor unit being operatively connected to said outlet of said mixing valve with pressurized air entering said turbine causing rotation of said shaft to operate said compressor, a water separator having an air inlet operatively connected to said turbine air outlet of said turbine-compressor unit and an air outlet connectible to an airplane cabin or the like to be cooled, means in said water separator operable to remove water from air passing therethrough, a cabin air outlet conduit having one end portion thereof positioned in the aircraft cabin or the like to be conditioned, a cabin pressure regulating valve secured to said one end portion of said cabin air outlet conduit with said regulating valve being openable at a pre-determined pressure to exhaust air from said cabin of said aircraft and closable at lower pressures to maintain a desired pressure in said cabin, the other end portion of said cabin air outlet conduit being connected to said low pressure air inlet of said housing of said recuperating heat exchanger, another conduit connected in one end portion to said low pressure air outlet of said housing of said recuperating heat exchanger and operatively connected in the other end portion to said compressor air inlet of said first turbine-compressor unit, a second turbine-compressor unit having a housing with a turbine air inlet and a turbine air outlet and having a compressor air inlet and a compressor air outlet, a ram air inlet conduit connected in one end portion to said turbine air inlet of said housing of said second turbine-compressor unit and having the other end portion thereof positionable in an aircraft or the like to receive ram air during flight of said aircraft, a conduit connected in the end portions to said turbine outlet of said second turbine-compressor unit and to said low pressure air inlet of said pre-cooling heat exchanger, bypass conduit means connected to said turbine air outlet of said second turbine compressor unit and to said ram air inlet conduit, control valve means positioned in said last-named bypass conduit operable to regulate flow of ram air to said turbine of said second turbine-compressor unit, another conduit connected in one end portion to said compressor air outlet of said first turbine-compressor unit and connected in an intermediate portion to said compressor air inlet of said second turbine-compressor unit, a control valve in said last-named conduit downstream from said compressor air inlet of said second turbine-compressor unit and operable to regulate flow of air through said compressor of said second turbine-compressor unit, thermostat operated valve control means operatively connected to said mixing valve and said control valves, said valve control means having a regulator positionable in the cabin to be conditioned and temperature sensing means positioned at said turbine air outlet of said first turbine-compressor unit, and said valve control means being operable in response to said regulator and said temperature sensing means to regulate operation of said mixing valve and said control valves, said air conditioning and pressurization system being constructed and adapted so that pressurized air from said pressurized air inlet conduit can be passed through said high pressure side of said pre-cooling heat exchanger and said recuperating heat exchanger and cooled in said heat exchangers with air leaving said recuperating heat exchanger high pressure side being mixed with air from said pressurized air conduit and expanded and cooled in said turbine of said first turbine-compressor unit and passed through said water separator and into the cabin of an aircraft or the like, the air pressure in said cabin being regulated by operation of said cabin pressure regulating valve, air leaving said cabin being provided to said low pressure side of said recuperating heat exchanger, air leaving said low pressure outlet of said recuperating heat exchanger being provided to said compressor of said first turbine-compressor unit, and with ram air from said ram air inlet conduit being provided to said turbine of said second turbine-compressor unit and expanded and cooled therein and transferred therefrom through the low pressure side of said pre-cooling heat exchanger and provided from the low pressure outlet of said pre-cooling heat exchanger to said compressor of said first turbine-compressor unit, air being discharged from said compressor of said first turbine-compressor unit being provided to said compressor of said second turbine-compressor unit and discharged therefrom overboard the aircraft.

8. An air cycle air conditioning and pressurization system for aircraft and the like comprising, in combination, an air-to-air pre-cooling heat exchanger having a low pressure air inlet and a low pressure air outlet and having a high pressure air inlet and a high pressure air outlet, tube means in said heat exchanger to transfer air from said high pressure air inlet to said high pressure air outlet, conduit means connected to said high pressure air inlet and connectible to a source of pressurized air, an air-to-air recuperating heat exchanger having a low pressure air inlet and a low pressure air outlet and having a high pressure air inlet and a high pressure air outlet with said high pressure air inlet being operatively connected to said high pressure air outlet of said pre-cooling heat exchanger, tube means in said recuperating heat exchanger connected to said high pressure air inlet and said high pressure air outlet thereof, a proportional type mixing valve having two air inlets and an air outlet with one of said inlets being operatively connected to said high pressure air outlet of said recuperating heat exchanger and the other of said air inlets of said valve being connectible to a separate source of air under pressure, a first turbine-compressor unit having air inlets and air outlets for the turbine and compressor thereof, said compressor air inlet being operatively connected to said low pressure air outlet of said precooling heat exchanger and said turbine air inlet being operatively connected to said outlet of said mixing valve, air from said mixing valve passing through said turbine being expanded and cooled therein and discharged from said turbine air outlet thereof, water separator means having an air inlet operatively connected to said turbine air outlet with said water separator means having an air outlet operatively connected to an airplane cabin or the like to be cooled, cabin air outlet conduit means operatively connected to said low pressure air inlet of said recuperating heat exchanger and connectible to said cabin pressure regulating valve means in said cabin air outlet conduit means operable to open at a pre-determined pressure in said cabin to exhaust air therefrom, said low pressure air outlet of said recuperating heat exchanger being operatively connected to said compressor air inlet, a second turbine-compressor unit having turbine and compressor air inlets and air outlets, said compressor air inlet of said second turbine-compressor unit being operatively connected to said compressor air outlet of said first turbine-compressor unit, conduit means operatively connected to said turbine air inlet of said second turbine-compressor unit to provide air thereto in operation, said turbine air outlet of said second turbine-compressor unit being operatively connected to said low pressure air inlet of said pre-cooling heat exchanger, said air conditioning and pressurization system being constructed and adapted so that air from a pressurized source can be cooled in said pre-cooling and recuperating heat exchangers and further cooled in said turbine of said first turbine-compressor unit and passed through said water separator means for removal of water therefrom prior to being discharged into an aircraft cabin or the like, and with air from the cabin or the like being provided through the low pressure side of said recuperating heat exchanger for cooling of air therein, air being provided through said turbine of said second turbine-compressor unit for expansion and cooling therein with air from said turbine of said second turbine-compressor unit being provided to the low pressure side of said pre-cooling heat exchanger for cooling of high pressure air passing therethrough.

9. An air-cycle air conditioning and pressurization system for the cabin of an aircraft or the like comprising, in combination, pre-cooling heat exchanger means having a low pressure side and a high pressure side, recuperating heat exchanger means having a low pressure side and a high pressure side with the inlet of said high pressure side of said recuperating heat exchanger being operatively connected to the outlet of said high pressure side of said pre-cooling heat exchanger, first expansion cooling means having an inlet operatively connected to the outlet of said high pressure side of said recuperating heat exchanger means with the outlet of said expansion cooling means being operatively connectible to the cabin or the like to be conditioned, pressure regulator valve means having the inlet thereof operatively connectible to the cabin or the like to be conditioned with said valve means being operable to maintain pressure in the cabin or the like, the outlet of said valve means being operatively connected to the inlet of said low pressure side of said recuperating heat exchanger so that air can be exhausted from said cabin through said valve means to said low pressure side of said recuperator heat exchanger means, and second expansion cooling means having an inlet operatively connectible to a source of air and having the outlet thereof operatively connected to the inlet of said low pressure side of said pre-cooling heat exchanger means, said air conditioning and pressurization system being constructed and adapted so that high pressure air can be passed through said high pressure side of said pre-cooling heat exchanger means and said high pressure side of said recuperator heat exchanger means for cooling therein with the resulting cooled air being expanded and cooled in said first expansion cooling means and provided to the cabin or the like to be conditioned, air leaving the cabin or the like to be conditioned passing through said pressure regulator valve means and through said low pressure side of said recuperator heat exchanger means to cool high pressure air passing therethrough, and with air from said second expansion cooling means being provided through said low pressure side of said pre-cooling heat exchanger means to cool high pressure air passing therethrough.

10. An air cycle air conditioning and pressurization system for aircraft and the like comprising, in combination, an air-to-air heat exchanger having a housing with a low pressure air inlet at one end thereof and a low pressure air outlet at the other end thereof and having a high pressure air inlet and a high pressure air outlet intermediate the ends thereof, a plurality of tubes each connected in one end portion to said high pressure air inlet of said heat exchanger and having the other end portion thereof connected to said high pressure air outlet of said heat exchanger with the intermediate portions of said tubes being positioned across the intermediate portion of said housing of said heat exchanger, a high pressure air inlet conduit connected in one end portion to said high pressure air inlet of said heat exchanger and connectible in the other end portion to a source of pressurized air, a pressure limiting valve in said high pressure air inlet conduit operable to limit the maximum pressure of air supplied to said heat exchanger, a proportional type mixing valve having two air inlets and an air outlet with one of said inlets of said valve being operatively connected to said high pressure air outlet of said heat exchanger, conduit means connected in one end portion to the other of said inlets of said mixing valve and connected in the other end portion to said high pressure air inlet conduit between said pressure limiting valve and said high pressure air inlet of said heat exchanger, said mixing valve being operable to pass air therethrough from said high pressure air conduit, from said heat exchanger, or mix air from said high pressure air inlet conduit and said heat exchanger and discharge same through said outlet thereof, a first turbine-compressor unit having a housing with a compressor air inlet and a compressor air outlet and having a turbine inlet and a turbine air outlet, said compressor air inlet being operatively connected to said low pressure air outlet of said heat exchanger, a shaft rotatably mounted in said housing of said turbine-compressor unit and having a plurality of vanes connected to one end portion of said shaft for rotation therewith with said vanes being shaped and positioned to receive air from said compressor air inlet and compress and discharge same from said compressor air outlet during rotation of said shaft, a plurality of blades connected to the other end portion of said shaft for rotation with said shaft, said blades being positioned to be engaged by air entering said turbine air inlet to cause rotation of said blades and said shaft and with air leaving said housing through said turbine air outlet with air passing through said turbine being expanded therein and discharged at a temperature and pressure lower than the temperature and pressure of air entering said turbine, said tubine inlet of said turbine compressor unit being operatively connected to said outlet of said mixing valve with pressurized air entering said turbine causing rotation of said shaft to operate said compressor, a water separator having an air inlet operatively connected to said turbine air outlet of said turbine-compressor unit and an air outlet connectible to an airplane cabin or the like to be cooled, means in said water separator operable to remove water from air passing therethrough, a cabin air outlet conduit having one end portion thereof positionable in the aircraft cabin or the like to be conditioned, a cabin pressure regulating valve secured to said one end portion of said cabin air outlet conduit with said regulating valve being openable at a predetermined pressure to exhaust air from said cabin of said aircraft and closeable at lower pressures to maintain a desired pressure in said cabin, the other end portion of said cabin air outlet conduit being positioned to discharge air therefrom overboard the aircraft, a second turbine-compressor unit having a housing with a turbine air inlet and a turbine air outlet and having a compressor air inlet and a compressor air outlet, a ram air inlet conduit connected in one end portion to said turbine air inlet of said housing of said second turbine-compressor unit and having the other end portion thereof positionable in an aircraft or the like to receive ram air during flight of said aircraft, a conduit connected in the end portions to said turbine outlet of said second turbine-compressor unit and to said low pressure air inlet of said heat exchanger, bypass conduit means connected to said turbine air outlet of said second turbine-compressor unit and to said ram air inlet conduit, control valve means positioned in said last-named bypass conduit operable to regulate flow of ram air to said turbine of said second turbine-compressor unit, another conduit connected in one end portion to said compressor air outlet of said first turbine-compressor unit and connected in an intermediate portion to said compressor air inlet of said second turbine-compressor unit, a control valve in said last-named conduit downstream from said compressor air inlet of said second turbine-compressor unit and operable to regulate flow of air to said compressor of said second turbine-compressor unit, thermostat operated valve control means operatively connected to said mixing valve and said control valves, said valve control means having a regulator positionable in the cabin to be conditioned and temperature sensing means positioned at said turbine air outlet of said first turbine-compressor unit, said valve control means being operable in response to said regulator and said temperature sensing means to regulate operation of said mixing valve and said control valves, said air conditioning and pressurization system being constructed and adapted so that pressurized air from said pressurized air inlet conduit can be passed through said high pressure side of said heat exchanger and cooled in said heat exchanger with air leaving said heat exchanger high pressure side being mixed with air from said pressurized air conduit and expanded and cooled in said turbine of said first turbine-compressor unit and passed through said water separator and into the cabin of an aircraft or the like, the air pressure in said cabin being regulated by operation of said cabin pressure regulating valve, and with ram air from said ram air inlet conduit being provided to said turbine of said second turbine-compressor unit and expanded and cooled therein and transferred therefrom through the low pressure side of said heat exchanger and provided from the low pressure outlet of said heat exchanger to said compressor of said first turbine-compressor unit, air being discharged from said compressor of said first turbine-compressor unit being provided to said compressor of said second turbine-compressor unit and discharged therefrom overboard the aircraft.

11. An air cycle air conditioning and pressurization system for aircraft and the like comprising, in combination, air-to-air heat exchanger having a low pressure air inlet and a low pressure air outlet and having a high pressure air inlet and a high pressure air outlet, tube means in said heat exchanger to transfer air from said high pressure air inlet to said high pressure air outlet, conduit means connected to said high pressure air inlet and connectible to a source of pressurized air, a proportional type mixing valve having two air inlets and an air outlet with one of said inlets being operatively connected to said high pressure air outlet of said heat exchanger and the other of said air inlets of said valve being connectible to a separate source of air under pressure, a first turbine-compressor unit having air inlets and air outlets for the turbine and compressor thereof, said compressor air inlet being operatively connected to said low pressure air outlet of said heat exchanger and said turbine air inlet being operatively connected to said outlet of said mixing valve, air from said mixing valve passing through said turbine being expanded and cooled therein and discharged from said turbine air outlet thereof, water separator means having an air inlet operatively connected to said turbine air outlet with said water separator means having an air outlet operatively connected to an airplane cabin or the like to be cooled, cabin air outlet conduit means operatively connectible to said cabin, pressure regulating valve means in said cabin air outlet conduit means operable to open at a pre-determined pressure in said cabin to exhaust air therefrom, a second turbine-compressor unit having turbine and compressor air inlets and air outlets, said compressor air inlet of said second turbine-compressor unit being operatively connected to said compressor air outlet of said first turbine-compressor unit, conduit means operatively connected to said turbine air inlet of said second turbine-compressor unit to provide air thereto in operation, said turbine air outlet of said second turbine-compressor unit being operatively connected to said low pressure air inlet of said heat exchanger, said air conditioning and pressurization system being contructed and adapted so that air from a pressurized source can be cooled in said heat exchanger and further cooled in said turbine of said first turbine-compressor unit and passed through said water separator means for removal of water therefrom prior to being discharged into an aircraft cabin or the like, air from the cabin or the like being discharged through said cabin air outlet conduit means, and air from said turbine of said second turbine-compressor unit being provided to the low pressure side of said heat exchanger for cooling of high pressure air passing therethrough.

12. An air cycle air conditioning and pressurization system for aircraft and the like comprising, in combination, an air-to-air pre-cooling heat exchanger having a housing with a low pressure air inlet at one end thereof and a low pressure air outlet at the other end thereof and having a high pressure air inlet and a high pressure air outlet intermediate the ends thereof, a plurality of tubes each connected in one end portion to said high pressure air inlet of said heat exchanger and having the other end portion thereof connected to said high pressure air outlet of said heat exchanger with the intermediate portions of said tubes being positioned across the intermediate portion of said housing of said heat exchanger, a high pressure air inlet conduit connected in one end portion to said high pressure air inlet of said heat exchanger and connectible in the other end portion to a source of pressurized air, a pressure limiting valve in said high pressure air inlet conduit operable to limit the maximum pressure of air supplied to said heat exchanger, an air-to-air recuperating heat exchanger having a housing with a low pressure air inlet at one end portion thereof and a low pressure air outlet at the other end portion thereof and having a high pressure air inlet and a high pressure air outlet intermediate the ends of said housing, a plurality of tubes each connected in one end portion to said high pressure air inlet of said recuperating heat exchanger and having the other end portion thereof connected to said high pressure air outlet of said recuperating heat exchanger with the intermediate portions of said tubes being positioned across the intermediate portion of said housing of said recuperating heat exchanger, said high pressure air outlet of said pre-cooling heat exchanger being operatively connected to said high pressure air inlet of said recuperating heat exchanger so that high pressure air leaving said pre-cooling heat exchanger is directed to said recuperating heat exchanger, a proportional type mixing valve having two air inlets and an air outlet with one of said inlets of said valve being operatively connected to said high pressure air outlet of said recuperating heat exchanger, conduit means connected in one end portion to the other of said inlets of said mixing valve and connected in the other end portion to said high pressure air inlet conduit between said pressure limiting valve and said high pressure air inlet of said pre-cooling heat exchanger, said mixing valve being operable to pass air therethrough from said high pressure air conduit, from said recuperating heat exchanger, or mix air from said high pressure air inlet conduit and said recuperating heat exchanger and discharge same through said outlet thereof, a turbine-compressor unit having a housing with a compressor air inlet and a compressor air outlet and having a turbine air inlet and a turbine air outlet, said compressor air inlet being operatively connected to said low pressure air outlet of said pre-cooling heat exchanger and to said low pressure air outlet of said recuperating heat exchanger, a shaft rotatably mounted in said housing of said turbine compressor unit and having a plurality of vanes connected to one end portion of said shaft for rotation therewith with said vanes being shaped and positioned to receive air from said compressor air inlet and compress and discharge same from said compressor air outlet during rotation of said shaft, a plurality of blades connected to the other end portion of said shaft for rotation with said shaft, said blades being positioned to be engaged by air entering said turbine air inlet to cause rotation of said blades and said shaft and with air leaving said housing through said turbine air outlet with air passing through said turbine being expanded therein and discharged at a temperature and pressure lower than the temperature and pressure of air entering said turbine, said turbine inlet of said turbine-compressor unit being operatively connected to said outlet of said mixing valve with pressurized air entering said turbine causing rotation of said shaft to operate said compressor, a water separator having an air inlet operatively connected to said turbine air outlet of said turbine-compressor unit and an air outlet connectible to an airplane cabin or the like to be cooled, means in said water separator operable to remove water from air passing therethrough, a cabin air outlet conduit having one end portion thereof positionable in the aircraft cabin or the like to be conditioned and having the other end portion thereof operatively connected to said low pressure air inlet of said recuperating heat exchanger, a cabin pressure regulating valve secured to said one end portion of said cabin air outlet conduit with said regulating valve being openable at a pre-determined pressure to exhaust air from said cabin of said aircraft and closeable at lower pressures to maintain a desired pressure in said cabin, a ram air inlet conduit operatively connected in one end portion to said housing of said pre-cooling heat exchanger and having the other end portion thereof positionable in an aircraft or the like to receive ram air during flight of said aircraft, thermostat operated valve control means operatively connected to said mixing valve, said valve control means having a regulator positionable in the cabin to be conditioned and temperature sensing means positioned at said turbine air outlet of said turbine-compressor unit, said valve control means being operable in response to said regulator and said temperature sensing means to regulate operation of said mixing valve, said air conditioning and pressurization system being constructed and adapted so that pressurized air from said pressurized air inlet conduit can be passed through said high pressure side of said pre-cooling heat exchanger and said recuperating heat exchanger and cooled in said heat exchangers with air leaving said recuperating heat exchanger high pressure side being mixed with air from said pressurized air conduit and expanded and cooled in said turbine of said turbine-compressor unit and passed through said water separator and into the cabin of an aircraft or the like, the air pressure in said cabin being regulated by operation of said cabin pressure regulating valve, air leaving said cabin being provided to the low pressure side of said recuperating heat exchanger, air leaving said low pressure outlet of said recuperating heat exchanger being provided to said compressor of said turbine-compressor unit, and with ram air from said ram air inlet conduit being provided to the low pressure side of said pre-cooling heat exchanger and provided from the low pressure outlet of said pre-cooling heat exchanger to said compressor of said turbine-compressor unit and discharged therefrom overboard the aircraft.

13. An air cycle air conditioning and pressurization system for aircraft and the like comprising, in combination an air-to-air pre-cooling heat exchanger having a low pressure air inlet and a low pressure air outlet and having a high pressure air inlet and a high pressure air outlet, conduit means connected to said low pressure air inlet to provide air thereto, tube means in said heat exchanger to transfer air from said high pressure air inlet to said high pressure air outlet, conduit means connected to said high pressure air inlet and connectible to a source of pressurized air, an air-to-air recuperating heat exchanger having a low pressure air inlet and a low pressure air outlet and having a high pressure air inlet and a high pressure air outlet with said high pressure air inlet being operatively connected to said high pressure air outlet of said pre-cooling heat exchanger, tube means in said recuperating heat exchanger connected to said high pressure air inlet and said high pressure air outlet thereof, a proportional type mixing valve having two air inlets and an air outlet with one of said inlets being operatively connected to said high pressure air outlet of said recuperating heat exchanger and the other of said air inlets of said valve being connectible to a separate source of air under pressure, a turbine-compressor unit having air inlets and air outlets for the turbine and compressor thereof, said compressor air inlet being operatively connected to said low pressure air outlets of said pre-cooling heat exchanger and said recuperating heat exchanger, said turbine air inlet being operatively connected to said outlet of said mixing valve, air from said mixing valve passing through said turbine being expanded and cooled therein and discharged from said turbine air outlet thereof, water separator means having an air inlet operatively connected to said turbine air outlet with said water separator means having an air outlet operatively connected to an airplane cabin or the like to be cooled, cabin air outlet conduit means operatively connected to said low pressure air inlet of said recuperating heat exchanger and connectible to said cabin, pressure regulating valve means in said cabin air outlet conduit means operable to open at a pre-determined pressure in said cabin to exhaust air therefrom and provide same to said recuperating heat exchanger, said air conditioning and pressurization system being constructed and adapted so that air from a pressurized source can be cooled in said pre-cooling and recuperating heat exchangers and further cooled in said turbine of said first turbine-compressor unit and passed through said water separator means for removal of water therefrom prior to being discharged into an aircraft cabin or the like, and with air from the cabin or the like being provided through the low pressure side of said recuperating heat exchanger.

14. An air cycle air conditioning and pressurization system for aircraft and the like comprising, in combination, an air-to-air pre-cooling heat exchanger having a housing with a low pressure air inlet at one end thereof and a low pressure air outlet at the other end thereof and having a high pressure air inlet and a high pressure air outlet intermediate the ends thereof, a plurality of tubes each connected in one end portion to said high pressure air inlet of said heat exchanger and having the other end portion thereof connected to said high pressure air outlet of said heat exchanger with the intermediate portions of said tubes being positioned across the intermediate portion of said housing of said heat exchanger, a high pressure air inlet conduit secured in one end portion to said high pressure air inlet of said heat exchanger and connectible in other end portion to a source of pressurized air, a pressure limiting valve in said high pressure air inlet conduit operable to limit the maximum pressure exerted on said system, a first proportional type mixing valve having two air inlets and an air outlet with one of said inlets of said valve being operatively connected to said high pressure air outlet of said pre-cooling heat exchanger, bypass conduit means connected in the end portions to the other of said air inlets of said first mixing valve and to said high pressure air inlet conduit between said heat exchanger and said valve in said conduit with said mixing valve being operable to pass therethrough air from said heat exchanger, from said high pressure air inlet conduit, or mix air from said heat exchanger and said high pressure air inlet conduit and discharge same through said outlet of said mixing valve, a first turbine-compressor unit having a housing with a compressor air inlet and a compressor air outlet and having a turbine air inlet and a turbine air outlet, said compressor air inlet being operatively connected to said outlet of said first mixing valve to receive high pressure air therefrom, a shaft rotatably mounted in said housing of said turbing-compressor unit and having a plurality of vanes connected to one end portion of said shaft for rotation therewith said vanes being shaped and positioned to receive air from said compressor air inlet and compress and discharge same from said compressor air outlet during rotation of said shaft, a plurality of blades connected to the other end portion of said shaft for rotation with such shaft, said blades being positioned to be engaged by air entering said turbine air inlet to cause rotation of said blades and said shaft with air leaving said outlet through said turbine air outlet, air passing through said turbine being expanded therein and discharged at a temperature and pressure lower than the temperature and pressure of air entering said turbine, an air-to-air intercooling heat exchanger having a housing with a low pressure air inlet at one end thereof and a low pressure air outlet at the other end thereof and having a high pressure air inlet and a high pressure air outlet intermediate the ends thereof, a plurality of tubes each connected in one end portion to said high pressure air inlet of said intercooling heat exchanger and having the other end portion thereof connected to said high pressure air outlet of said intercooling heat exchanger with the intermediate portions of said tubes being positioned across the intermediate portion of said housing of said intercooling heat exchanger, conduit means operatively connecting said compressor air outlet of said first turbine-compressor unit to said high pressure air inlet of said intercooling heat exchanger, a second proportional type mixing valve having two air inlets and an air outlet with one of said inlets of said valve being operatively connected to said compressor air outlet of said turbine-compressor unit and with said outlet of said valve being operatively connected to said turbine air inlet of said first turbine-compressor unit, an air-to-air recuperating heat exchanger having a housing with a low pressure air inlet at one end portion thereof and a low pressure air outlet at the other end portion thereof and having a high pressure air inlet and a high pressure air outlet intermediate the ends of said housing, a plurality of tubes each connected in one end portion to said high pressure air inlet of said recuperating heat exchanger and having the other end portion thereof connected to said high pressure air outlet of said recuperating heat exchanger with the intermediate portions of said tubes being positioned across the intermediate portion of said housing of said recuperating heat exchanger, said high pressure air inlet of said recuperating heat exchanger being operatively connected to said high pressure air outlet of said intercooling heat exchanger and said high pressure air outlet of said recuperating heat exchanger being operatively connected to the other of said air inlets of said second proportional type mixing valve, said second mixing valve being operable to receive and pass therethrough air from said compressor of said first turbine-compressor unit, from said high pressure outlet of said recuperating heat exchanger, or from said recuperating heat exchanger and said compressor, said turbine inlet of said first turbine-compressor unit receiving air from said outlet of said second proportional type mixing valve with pressurized air entering said turbine engaging said blades and causing rotation of said shaft to operate said compressor and with air being discharged from said turbine air outlet of said first turbine-compressor unit at a temperature and pressure lower than the temperature and pressure of the incoming air, a water separator having an air inlet operatively connected to said turbine air outlet of said turbine-compressor unit and an air outlet connectible to an airplane cabin or the like to be conditioned, means positioned in said water separator operable to remove water from air passing therethrough, a cabin air outlet conduit having one end portion thereof positionable in the aircraft cabin or the like to be conditioned, a cabin pressure regulating valve secured to said one end portion of said cabin air outlet conduit with said regulating valve being openable at a pre-determined pressure to exhaust air from said cabin of said aircraft and closeable at lower pressures to maintain a desired pressure in said cabin, a second turbine-compressor unit having a housing with a turbine air inlet and a turbine air outlet and having a compressor air inlet and a compressor air outlet, said turbine air inlet of said second turbine-compressor unit being operatively connected to the other end portion of said cabin air outlet conduit, said second turbine-compressor unit having a shaft in said housing and having turbine blades on one end portion of said shaft and compressor vanes connected to the other end portion of said shaft with air from said cabin entering said turbine air inlet and being directed across said turbine blades causing rotation of said shaft and operation of said compressor with air discharged from said turbine air outlet being cooler and lower in pressure than air received from said cabin, bypass conduit means connected to said turbine air outlet and said turbine air inlet of said second turbine-compressor unit, control valve means in said bypass conduit means operable to regulate flow of air from said cabin to said turbine of said second turbine-compressor unit, a conduit operatively connected in its end portions to said turbine air outlet of said second turbine-compressor unit and to said low pressure air inlet of said housing of said recuperating heat exchanger, another conduit connected in one end portion to said outlet of said housing of said recuperating heat exchanger and connected in an intermediate portion to said compressor air inlet of said second turbine-compressor unit, a control valve secured to the other end portion of said last named conduit and operable to regulate flow of air to said compressor of said second turbine-compressor unit, a third turbine-compressor unit having a housing with a turbine air inlet and a turbine air outlet and having a compressor air inlet and a compressor air outlet, a ram air inlet conduit connected in one end portion to said turbine air inlet of said housing of said third turbine-compressor unit and having the other end portion thereof positionable in an aircraft or the like to receive ram air during flight of said aircraft, a conduit connected in the end portions to said turbine air outlet of said third turbine-compressor unit and to said low pressure air inlet of said pre-cooling heat exchanger and said intercooling heat exchanger, bypass conduit means connected to said turbine air outlet of said third turbine-compressor unit and to said ram air inlet conduit, control valve means positioned in said last named bypass conduit operable to regulate flow of ram air through said turbine of said third turbine-compressor unit, another conduit operatively connected in one end portion to said low pressure air outlet of said pre-cooling heat exchanger and said low pressure air outlet of said intercooling heat exchanger and being connected in an intermediate portion to said compressor air inlet of said third turbine-compressor unit, a control valve in said last named conduit downstream of said compressor air inlet of said third-compressor unit and operable to regulate flow of air through said compressor of said third turbine-compressor unit, thermostat operated valve control means operatively connected to said mixing valves and said control valves, said valve control means having a regulator positionable in the cabin to be conditioned and temperature sensing means positioned at said turbine air outlet of said first turbine-compressor unit, said valve control means being operable in response to said regulator and said temperature sensing means to regulate operation of said mixing valves and said control valves, said air conditioning and pressurization system being constructed and adapted so that pressurized air from said pressurized air inlet conduit can be passed through said tubes in said pre-cooling heat exchanger for cooling therein and mixed with air from said high pressure air inlet conduit and transferred to said compressor of said first turbine-compressor unit for compression therein with air being discharged therefrom and passed through the high pressure side of said intercooling heat exchanger for cooling therein and subsequently passed through the high pressure side of said recuperating heat exchanger for further cooling therein, the resulting cooled air being expanded in said turbine of said first turbine-compressor unit to cause rotation of said shaft therein and expansion and cooling of air passing through said water separator for removal of water therefrom and discharged into the cabin to be conditioned, air from said cabin passing through said turbine of said second turbine-compressor unit for cooling therein and reduction in pressure beneath the air pressure in said cabin, the outlet of said turbine of said second turbine-compressor unit being discharged through the low pressure side of said recuperating heat exchanger and discharged therefrom through said compressor of said second turbine-compressor unit to the atmosphere, ram air being provided to said turbine of said third turbine-compressor unit for expansion and cooling therein with the resulting low pressure air passing through the low pressure side of said pre-cooling and intercooling heat exchangers and being discharged through said compressor of said third turbine-compressor unit to the atmosphere.

15. An air cycle air conditioning and pressurization system for aircraft and the like comprising, in combination, an air-to-air pre-cooling heat exchanger having a low pressure air inlet and a low pressure air outlet and having a high pressure air inlet and a high pressure air outlet, tube means positioned in said heat exchanger and connected in the end portions to said high pressure air inlet and said high pressure air outlet, a first mixing valve having two air inlets and an air outlet with one of said inlets being operatively connected to said high pressure air outlets of said heat exchanger and with the other of said inlets being operatively connectible to a source of air, a first turbine-compressor unit having turbine and compressor air inlets and air outlets with said compressor air inlet being operatively connected to said outlet of said mixing valve, an air-to-air intercooling heat exchanger having a low pressure air inlet and a low pressure air outlet and having a high pressure air inlet and a high pressure air outlet, the tube means positioned in said intercooling heat exchanger and connected in the end portions to said high pressure air inlet and said high pressure air outlet thereof, said high pressure air inlet of said intercooling heat exchanger being operatively connected to said compressor air outlet of said turbine-compressor unit, a second mixing valve having two air inlets and an air outlet with one of said air inlets of said valve being operatively connected to said compressor air outlet and with said outlet of said second mixing valve being operatively connected to said turbine air inlet of said turbine-compressor unit, an air-to-air recuperating heat exchanger having a low pressure air inlet and a low pressure air outlet and having a high pressure air inlet and a high pressure air outlet, tube means positioned in said recuperating heat exchanger and having end portions thereof operatively connected to said high pressure air inlet and said high pressure air outlet, said high pressure air inlet of said recuperating heat exchanger being operatively connected to said high pressure air outlet of said intercooling heat exchanger, said high pressure air outlet of said recuperating heat exchanger being operatively connected to the other of said air inlets of said second mixing valve, water separator means having an air inlet operatively connected to said turbine air outlet of said turbine-compressor unit with said water separating means having an air outlet operatively connectible to an airplane cabin or the like to be conditioned, cabin air outlet conduit means having one end portion positionable in the aircraft cabin or the like to be conditioned, cabin pressure regulating valve means secured to said one end portion of said cabin air outlet means, a second turbine-compressor unit having turbine and compressor air inlets and air outlets with said turbine air inlet being operatively connected to the other end portion of said cabin air outlet conduit means, bypass conduit means connected between said turbine air inlet and said turbine air outlet of said second turbine-compressor unit being operatively connected to said low pressure air inlet of said recuperating heat exchanger and said low pressure air outlet of said recuperating heat exchanger being operatively connected to said compressor air inlet of said second turbine-compressor unit, bypass conduit means connected to said compressor air inlet of said second turbine-compressor unit, a third turbine-compressor unit having turbine and compressor air inlets and air outlets, conduit means connected to said turbine air inlet of said third turbine-compressor unit to provide ram air from the atmosphere thereto, said turbine air outlet of said third turbine-compressor unit being operatively connected to said low pressure air inlets of said pre-cooling and intercooling heat exchangers, and the low pressure air outlets of said pre-cooling and intercooling heat exchangers being operatively connected to said compressor air inlet of said third turbine-compressor unit, said air conditioning and pressurization system being constructed and adapted so that pressurized air can be provided to the high pressure side of said pre-cooling heat exchanger and cooled therein and transferred therefrom through said first mixing valve and said compressor of said first turbine-compressor unit to the high pressure side of said intercooling heat exchanger for further cooling therein, air from the high pressure side of said intercooling heat exchanger being provided through the high pressure side of said recuperating heat exchanger and said second mixing valve to said turbine of said first turbine-compressor unit for further cooling therein, air leaving said turbine of said turbine-compressor unit being discharged through said water separator into the cabin or the like to be conditioned, air leaving the cabin to be conditioned passing through said regulating valve and said conduit means to said turbine of said second turbine-compressor unit for cooling therein and then transferred through the low pressure side of said recuperating heat exchanger to cool air passing through the high pressure side thereof, ram air being provided to said turbine of said third turbine-compressor unit for expansion and cooling therein and transfer therefrom through the low pressure sides of said pre-cooling and intercooling heat exchanger and transferred therefrom to the compressor of said third turbine-compressor unit.

16. An air conditioning system for aircraft or the like comprising, in combination, first heat exchanger means having a high pressure side in heat exchange relation with a low pressure side, compressor means having a fluid inlet and a fluid outlet with said fluid inlet being operatively connected to said high pressure side of said first heat exchanger means to receive fluid therefrom, second heat exchanger means having a high pressure side and a low pressure side in heat exchange relation with said high pressure side being operatively connected to said outlet of said compressor means, third heat exchanger means having a high pressure side in heat exchange relation with a low pressure side thereof and with said high pressure side of said third heat exchanger means being operatively connected to said high pressure side of said second heat exchanger means to receive fluid therefrom, first expansion cooling means having a fluid inlet and a fluid outlet with said fluid inlet being operatively connected to said high pressure side of said third heat exchanger means to receive fluid therefrom, said expansion cooling means being operable to expand and cool fluid passing therethrough, said outlet of said expansion cooling means being operatively connected to a cabin or the like to be conditioned to provide fluid thereto, pressure regulating valve means positionable in the cabin or the like to be conditioned and operable to open at a pre-determined pressure and discharge gas from the cabin or the like, second expansion cooling means having a fluid inlet and a fluid outlet with said fluid inlet being operatively connected to said valve means to receive cabin exhaust gas and expand and cool same, said outlet of said second expansion cooling means being operatively connected to said low pressure side of said third heat exchanger means to provide cooling gas thereto, and third expansion cooling means having a fluid inlet and a fluid outlet with said fluid inlet being operatively connectible to a source of fluid, said fluid outlet of said third expansion cooling means being operatively connected to said low pressure sides of said first and second heat exchanger means to provide cooling fluid thereto, said air conditioning system being constructed and adapted so that a fluid under pressure can be provided through said heat exchanger means and said first expansion cooling means for cooling therein with the resulting cooled fluid being provided to the cabin or the like to be conditioned while simultaneously fluid from said second and third expansion cooling means is provided to said low pressure sides of said first and second heat exchanger means for cooling of high pressure fluid therein.

17. An air cycle air conditioning and pressurization system for aircraft and the like comprising, in combination, an air-to-air pre-cooling heat exchanger having a housing with a low pressure air inlet at one end thereof and a low pressure air outlet at the other end thereof and having a high pressure air inlet and a high pressure air outlet intermediate the ends thereof, a plurality of tubes each connected in one end portion to said high pressure air inlet of said heat exchanger and having the end portion thereof connected to said high pressure air outlet of said heat exchanger with the intermediate portions of said tube being positioned across the intermediate portion of said housing of said heat exchanger, a high pressure air inlet conduit secured in one end portion to said high pressure air inlet of said heat exchanger and connectible in the other end portion to a source of pressurized air, a pressure limiting valve in said high pressure air inlet conduit operable to limit the maximum pressure exerted on said system, a first proportional-type mixing valve having two air inlets and an air outlet with one of said inlets of said valve being operatively connected to said high pressure air outlet of said pre-cooling heat exchanger, bypass conduit means connected in the end portions to the other of said air inlets of said first mixing valve and to said high pressure air inlet conduit between said heat exchanger and said valve in said conduit with said mixing valve being operable to pass therethrough air from said heat exchanger, from said high pressure air inlet conduit, or mix air from said heat exchanger and said high pressure air inlet conduit and discharge same through said outlet of said mixing valve, a first turbine-compressor unit having a housing with a compressor air inlet and a compressor air outlet and having a turbine air inlet and a turbine air outlet, said compressor air inlet being operatively connected to said outlet of said first mixing valve to receive high pressure air therefrom, a shaft rotatably mounted in said housing of said turbine-compressor unit and having a plurality of vanes connected to one end portion of said shaft for rotation therewith with said vanes vanes being shaped and positioned to receive air from said compressor air inlet and compress and discharge same from said compressor air outlet during rotation of said shaft, a plurality of blades connected to the other end portion of said shaft for rotation with such shaft, said blades being positioned to be engaged by air entering said turbine air inlet to cause rotation of said blades and said shaft with air leaving said outlet through said turbine air outlet, air passing through said turbine being expanded therein and discharged at a temperature and pressure lower than the temperature and pressure of air entering said turbine, an air-to-air intercooling heat exchanger having a housing with a low pressure air inlet at one end thereof and a low pressure air outlet at the other end thereof and having a high pressure air inlet and a high pressure air outlet intermediate the ends thereof, a plurality of tubes each connected in one end portion to said high pressure air inlet of said intercooling heat exchanger and having the other end portion thereof connected to said high pressure air outlet of said intercooling heat exchanger with the intermediate portions of said tubes being positioned across the intermediate portion of said housing of said intercooling heat exchanger, conduit means operatively connecting said compressor air outlet of said first turbine-compressor unit to said high pressure air inlet of said intercooling heat exchanger, a second proportional-type mixing valve having two air inlets and an air outlet with one of said inlets of said valve being operatively connected to said compressor air outlet of said turbine-compressor unit and with said outlet of said valve being operatively connected to said turbine air inlet of said first turbine-compressor unit, an air-to-air recuperating heat exchanger having a housing with a low pressure air inlet at one end portion thereof and a low pressure air outlet at the other end portion thereof and having a high pressure air inlet and a high pressure air outlet intermediate the ends of said housing, a plurality of tubes each connected in one end portion to said high pressure air inlet of said recuperating heat exchanger and having the other end portion thereof connected to said high pressure air outlet of said recuperating heat exchanger with the intermediate portions of said tubes being positioned across the intermediate portion of said housing of said recuperating heat exchanger, said high pressure air inlet of said recuperating heat exchanger being operatively connected to said high pressure air outlet of said intercooling heat exchanger and said high pressure air outlet of said recuperating heat exchanger being operatively connected to the other of said air inlets of said second proportional-type mixing valve, said second mixing valve being operable to receive and pass therethrough air from said compressor of said first turbine-compressor unit, from said high pressure outlet of said recuperating heat exchanger, or from said recuperating heat exchanger and said compressor, said turbine inlet of said first turbine-compressor unit receiving air from said outlet of said second proportional-type mixing valve with pressurized air entering said turbine engaging said blades and causing rotation of said shaft to operate said compressor and with air being discharged from said turbine air outlet of said first turbine-compressor unit at a temperature and pressure lower than the temperature and pressure of the incoming air, a water separator having an air inlet operatively connected to said turbine air outlet of said turbine-compressor unit and an air outlet connectible to an airplane cabin or the like to be conditioned, means positioned in said water separator operable to remove water from air passing therethrough, a cabin air outlet conduit having one end portion thereof positionable in the aircraft cabin or the like to be conditioned, a cabin pressure regulating valve secured to said one end portion of said cabin air outlet conduit with said regulating valve being openable at a pre-determined pressure to exhaust air from said cabin of said aircraft and closeable at lower pressures to maintain a desired pressure in said cabin, a second turbine-compressor unit having a housing with a turbine air inlet and a turbine air outlet and having a compressor air inlet and a compressor air outlet, said turbine air inlet of said second turbine-compressor unit being operatively connected to the other end portion of said cabin air outlet conduit, said second turbine-compressor unit having a shaft in said housing and having turbine blades on one end portion of said shaft and compressor vanes connected to the other end portion of said shaft with air from said cabin entering said turbine air inlet and being directed across said turbine blades causing rotation of said shaft and operation of said compressor with air discharged from said turbine air outlet being cooler and lower in pressure than air received from said cabin, bypass conduit means connected to said turbine air outlet and said turbine air inlet of said second turbine-compressor unit, control valve means in said bypass conduit means operable to regulate flow of air from said cabin to said turbine of said second turbine-compressor unit, a conduit operatively connected in its end portions to said turbine air outlet of said second turbine-compressor unit and to said low pressure air inlet of said housing of said recuperating heat exchanger, another conduit connected in one end portion to said outlet of said housing of said recuperating heat exchanger and connected in an intermediate portion to said compressor air inlet of said second turbine-compressor unit, a control valve secured to the other end portion of said last-named conduit and operable to regulate flow of air to said compressor of said second turbine-compressor unit, a ram air inlet conduit connected in one end portion to said low pressure air inlets of said housings of said pre-cooling and intercooling heat exchangers and having the other end portion thereof positionable in an aircraft or the like to receive ram air during flight of said aircraft, thermostat operated valve control means operatively connected to said mixing valves and said control valves, said valve control means having a regulator positionable in the cabin to be conditioned and temperature sensing means positioned at said turbine air outlet of said first turbine-compressor unit, said valve control means being operable in response to said regulator and said temperature sensing means to regulate operation of said mixing valves and said control valves, said air conditioning and pressurization system being constructed and adapted so that pressurized air from said pressurized air inlet conduit can be passed through said tubes in said pre-cooling heat exchanger for cooling therein and mixed with air from said high pressure air inlet conduit and transferred to said compressor of said first turbine-compressor unit for compression therein with air being discharged therefrom and passed through the high pressure side of said intercooling heat exchanger for cooling therein and subsequently passed through the high pressure side of said recuperating heat exchanger for further cooling therein, the resulting cooled air being expanded in said turbine of said first turbine-compressor unit to cause rotation of said shaft therein and expansion and cooling of air passing therethrough with the resulting cool air being passed through said water separator for removal of water therefrom and discharged into the cabin to be conditioned, air from said cabin passing through said turbine of said second turbine-compressor unit for cooling therein and reduction in pressure beneath the air pressure in said cabin, the outlet of said turbine of said second turbine-compressor unit being discharged through the low pressure side of said recuperating heat exchanger and discharged therefrom through said compressor of said second turbine-compressor unit to the atmosphere, ram air being provided to the low pressure side of said pre-cooling and intercooling heat exchangers for cooling of high pressure air passing therethrough.

18. An air cycle air conditioning and pressurization system for aircraft and the like comprising, in combination, an air-to-air pre-cooling heat exchanger having low pressure air inlet and a low pressure air outlet and having a high pressure air inlet and a high pressure air outlet, tube means positioned in said heat exchanger and connected in the end portions to said high pressure air inlet and said high pressure air outlet, a first mixing valve having two air inlets and an air outlet with one of said inlets being operatively connected to said high pressure air outlet of said heat exchanger and with the other of said inlets being operatively connectible to a source of air, a first turbine-compressor unit having turbine and compressor air inlets and air outlets with said compressor air inlet being operatively connected to said outlet of said mixing valve, an air-to-air intercooling heat exchanger having a low pressure air inlet and a high pressure air outlet, tube means positioned in said intercooling heat exchanger and connected in the end portions to said high pressure air inlet and said high pressure air outlet thereof, said high pressure air inlet of said intercooling heat exchanger being operatively connected to said compressor air outlet of said turbine-compressor unit, a second mixing valve having two air inlets and an air outlet with one of said air inlets of said valve being operatively connected to said compressor air outlet and with said outlet of said second mixing valve being operatively connected to said turbine air inlet of said turbine-compressor unit, an air-to-air recuperating heat exchanger having a low pressure air inlet and a low pressure air outlet and having a high pressure air inlet and a high pressure air outlet, tube means positioned in said recuperating heat exchanger and having end portions thereof operatively connected to said high pressure air inlet and said high pressure air outlet, said high pressure air inlet of said recuperating heat exchanger being operatively connected to said high pressure air outlet of said intercooling heat exchanger, said high pressure air outlet of said recuperating heat exchanger being operatively connected to the other of said air inlets of said second mixing valve, water separator means having an air inlet operatively connected to said turbine air outlet of said turbine-compressor unit with said water separating means having an air outlet operatively connectible to an airplane cabin or the like to be conditioned, cabin air outlet conduit means having one end portion positionable in the aircraft cabin or the like to be conditioned, cabin pressure regulating valve means secured to said one end portion of said cabin air outlet conduit means, a second turbine-compressor unit having turbine and compressor air inlets and air outlets with said turbine air inlet being operatively connected to the other end portion of said cabin air outlet conduit means, bypass conduit means connected between said turbine air inlet and said turbine air outlet of said second turbine-compressor unit, control valve means in said bypass conduit means, said turbine air outlet of said second turbine-compressor unit being operatively connected to said low pressure air inlet of said recuperating heat exchanger and said low pressure air outlet of said recuperating heat exchanger being operatively connected to said compressor air inlet of said second turbine-compressor unit, bypass conduit means connected to said compressor air inlet of said second turbine-compressor unit, and conduit means operatively connected to said low pressure air inlets of said pre-cooling and intercooling heat exchangers to provide ram air from the atmosphere thereto, said air conditioning and pressurization system being constructed and adapted so that pressurized air can be provided to the high pressure side of said pre-cooling heat exchanger and cooled therein and transferred therefrom through said first mixing valve and said compressor of said first turbine-compressor unit to the high pressure side of said intercooling heat exchanger for further cooling therein, air from the high pressure side of said intercooling heat exchanger being provided through the high pressure side of said recuperating heat exchanger and said second mixing valve to said turbine of said first turbine-compressor unit for further cooling therein, air leaving said turbine of unit first turbine-compressor unit being discharged through said water separator into the cabin or the like to be conditioned, air leaving the cabin to be conditioned passing through said regulating valve and said conduit means to said turbine of said second turbine-compressor unit for cooling therein and then transferred through the low pressure side of said recuperating heat exchanger to cool air passing through the high pressure side thereof, ram air being provided to the low pressure sides of said pre-cooling and intercooling heat exchangers.

19. An air conditioning system for aircraft or the like comprising, in combination, first heat exchanger means having a high pressure side in heat exchange relation with a low pressure side, compressor means having a fluid inlet and a fluid outlet with said fluid inlet being operatively connected to said high pressure side of said heat exchanger means to receive fluid therefrom and compress same, second heat exchanger means having a high pressure side in heat exchange relation with a low pressure side and with said high pressure side being operatively connected to said fluid outlet of said compressor means, third heat exchanger means having a high pressure side in heat exchange relation with a low pressure side with said high pressure side being operatively connected to said high pressure side of said second heat exchanger means to receive fluid therefrom, first expansion cooling means having a fluid inlet and a fluid outlet with said fluid inlet being operatively connected to said high pressure side of said third heat exchanger means to receive fluid therefrom and expand same to cool the fluid, said outlet of said expansion cooling means being operatively connectible to a cabin or the like to be conditioned, pressure regulating valve means positionable and the cabin or the like to be cooled and operable to open at a pre-determined pressure to exhaust gas from the cabin or the like, second expansion cooling means having a fluid inlet and a fluid outlet with said fluid inlet being operatively connected to said valve to receive exhaust gases from the cabin for cooling in said second expansion cooling means, said outlet of said second expansion cooling means being operatively connected to said low pressure side of said third heat exchanger means to provide cooling gas thereto, and means operatively connected to said low pressure sides of said first and second heat exchanger means to provide cooling gas thereto, said air conditioning system being constructed and adapted so that high pressure fluid can be provided through said high pressure sides of said heat exchanger means for cooling therein and further cooled and expanded and said first expansion cooling means for transfer to an aircraft cabin or the like, exhaust gas from the cabin or the like being provided to said second expansion cooling means for cooling therein and transfer therefrom to said low pressure side of said third heat exchanger means.

20. An air cycle air conditioning and pressurization system for aircraft and the like comprising, in combination, an air-to-air pre-cooling heat exchanger having a housing with a low pressure air inlet at one end thereof and a low pressure air outlet at the other end thereof and having a high pressure air inlet and a high pressure air outlet intermediate the ends thereof, a plurality of tubes each connected in one end portion to said high pressure air inlet of said heat exchanger and having the other end portion thereof connected to said high pressure air outlet of said heat exchanger with the intermediate portions of said tube being positioned across the intermediate portion of said housing of said heat exchanger, a high pressure air inlet conduit secured in one end portion to said high pressure air inlet of said heat exchanger and connectible in other end portion to a source of pressurized air, a pressure limiting valve in said high pressure air inlet conduit operable to limit the maximum pressure exerted on said system, a first proportional-type mixing valve having two air inlets and an air outlet with one of said inlets of said valve being operatively connected to said high pressure air outlet of said pre-cooling heat exchanger, by-pass conduit means connected in the end portions to the other of said air inlets of said first mixing valve and to said high pressure air inlet conduit between said heat exchanger and said valve in said conduit with said mixing valve being operable to pass therethrough air from said heat exchanger, from said high pressure air inlet conduit, or mix air from said heat exchanger and said high pressure air inlet conduit and discharge same through said outlet of said mixing valve, a turbine-compressor unit having a housing with a compressor air inlet and a compressor air outlet and having a turbine air inlet and a turbine air outlet, said compressor air inlet being operatively connected to said outlet of said first mixing valve to receive high pressure air therefrom, a shaft rotatably mounted in said housing of said turbine-compressor unit and having a plurality of vanes connected to one end portion of said shaft for rotation therewith with said vanes being shaped and positioned to receive air from said compressor air inlet and compress and discharge same from said compressor air outlet during rotation of said shaft, a plurality of blades connected to the other end portion of said shaft for rotation with such shaft, said blades being positioned to be engaged by air entering said turbine air inlet to cause rotation of said blades and said shaft with air leaving said outlet through said turbine air outlet, air passing through said turbine being expanded therein and discharged at a temperature and pressure lower than the temperature and pressure of air entering said turbine, an air-to-air intercooling heat exchanger having a housing with a low pressure air inlet at one end thereof and a low pressure air outlet at the other end thereof and having a high pressure air inlet and a high pressure air outlet intermediate the ends thereof, a plurality of tubes each connected in one end portion to said high pressure air inlet of said intercooling heat exchanger and having the other end portion thereof connected to said high pressure air outlet of said intercooling heat exchanger with the intermediate portions of said tubes being positioned across the intermediate portion of said housing of said intercooling heat exchanger, conduit means operatively connecting said compressor air outlet of said turbine-compressor unit to said high pressure air inlet of said intercooling heat exchanger, a second proportional-type mixing valve having two air inlets and an air outlet with one of said inlets of said valve being operatively connected to said compressor air outlet of said turbine-compressor unit and with said outlet of said valve being operatively connected to said turbine air inlet of said turbine-compressor unit, an air-to-air recuperating heat exchanger having a housing with a low pressure air inlet at one end portion thereof and a low pressure air outlet at the other end portion thereof and having a high pressure air inlet and a high pressure air outlet intermediate the ends of said housing, a plurality of tubes each connected in one end portion to said high pressure air inlet of said recuperating heat exchanger and having the other end portion thereof connected to said high pressure air outlet of said recuperating heat exchanger with the intermediate portions of said tubes being positioned across the intermediate portion of said housing of said recuperating heat exchanger, said high pressure air inlet of said recuperating heat exchanger being operatively connected to said high pressure air outlet of said intercooling heat exchanger and said high pressure air outlet of said recuperating heat exchanger being operatively connected to the other of said air inlets of said second proportional-type mixing valve, said second mixing valve being operable to receive and pass therethrough air from said compressor of said turbine-compressor unit, from said high pressure outlet of said recuperating heat exchanger, or from said recuperating heat exchanger and said compressor, said turbine inlet of said turbine-compressor unit receiving air from said outlet of said second proportional-type mixing valve with pressurized air entering said turbine engaging said blades and causing rotation of said shaft to operate said compressor and with air being discharged from said turbine air outlet of said turbine-compressor unit at a temperature and pressure lower than the temperature and pressure of the incoming air, a water separator having an air inlet operatively connected to said turbine air outlet of said turbine-compressor unit and an air outlet connectible to an airplane cabin or the like to be conditioned, means positioned in said water separator operable to remove water from air passing therethrough, a cabin air outlet conduit having one end portion thereof positionable in the aircraft cabin or the like to be conditioned, a cabin pressure regulating valve secured to said one end portion of said cabin air outlet conduit with said regulating valve being openable at a pre-determined pressure to exhaust air from said cabin of said aircraft and closeable at lower pressures to maintain a desired pressure in said cabin, the other end portion of said cabin air outlet conduit being operatively connected to said low pressure air inlet of said housing of said recuperating heat exchanger, another conduit connected in one end portion to said outlet of said housing of said recuperating heat exchanger and having the other end portion thereof positioned to discharge air overboard the aircraft, a ram air inlet conduit operatively connected in one end portion to said low pressure air inlets of said precooling and intercooling heat exchangers and having the other end portion thereof positionable in an aircraft or the like to receive ram air during flight of the aircraft, thermostat operated valve control means operatively connected to said mixing valves, said valve control means having a regulator positionable in the cabin to be conditioned and temperature sensing means positioned at said turbine air outlet of said turbine-compressor unit, said valve control means being operable in response to said regulator and said temperature sensing means to regulate operation of said mixing valves, said air conditioning and pressurization system being constructed and adapted so that pressurized air from said pressurized air inlet conduit can be passed through said tubes in said pre-cooling heat exchanger for cooling therein and mixed with air from said high pressure air inlet conduit and transferred to said compressor of said turbine-compressor unit for compression therein with air being discharged therefrom and passed through the high pressure side of said intercooling heat exchanger for cooling therein and subsequently passed through the high pressure side of said recuperating heat exchanger for further cooling therein, the resulting cooled air being expanded in said turbine of said turbine-compressor unit to cause rotation of said shaft therein and expansion and cooling of air passing therethrough with the resulting cool air being passed through said water separator for removal of water therefrom and discharged into the cabin to be conditioned, air from said cabin being discharged through the low pressure side of said recuperating heating exchanger, ram air being provided to the low pressure side of said pre-cooling and intercooling heat exchangers.

21. An air cycle air conditioning and pressurization system for aircraft and the like comprising, in combination, an air-to-air pre-cooling heat exchanger having low pressure air inlet and a low pressure air outlet and having a high pressure air inlet and a high pressure air outlet, tube means positioned in said heat exchanger and connected in the end portions to said high pressure air inlet and said high pressure air outlet, a first mixing valve having two air inlets and an air outlet with one of said inlets being operatively connected to said high pressure air outlet of said heat exchanger and with the other of said inlets being operatively connectible to a source of air, a first turbine-compressor unit having turbine and compressor air inlets and air outlets with said compressor air inlet being operatively connected to said outlet of said mixing valve, an air-to-air intercooling heat exchanger having a low pressure air inlet and a high pressure air outlet, tube means positioned in said intercooling heat exchanger and connected in the end portions to said high pressure air inlet and said high pressure air outlet thereof, said high pressure air inlet of said intercooling heat exchanger being operatively connected to said compressor air outlet of said turbine-compressor unit, a second mixing valve having two air inlets and an air outlet with one of said air inlets of said valve being operatively connected to said compressor air outlet and with said outlet of said second mixing valve being operatively connected to said turbine air inlet of said turbine-compressor unit, an air-to-air recuperating heat exchanger having a low pressure air inlet and a low pressure air outlet and having a high pressure air inlet and a high pressure air outlet, tube means positioned in said recuperating heat exchanger and having end portions thereof operatively connected to said high pressure air inlet and said high pressure air outlet, said high pressure air inlet of said recuperating heat exchanger being operatively connected to said high pressure air outlet of said intercooling heat exchanger, said high pressure air outlet of said recuperating heat exchanger being operatively connected to the other of said air inlets of said second mixing valve, water separator means having an air inlet operatively connected to said turbine air outlet of said turbine-compressor unit with said water-separating means having an air outlet operatively connectible to an airplane cabin or the like to be conditioned, cabin air outlet conduit means having one end portion positionable in the aircraft cabin or the like to be conditioned and having the other end portion operatively connected to said low pressure air inlet of said recuperating heat exchanger, cabin pressure regulating valve means secured to said one end portion of said cabin air outlet conduit means, and conduit means operatively connected to said low pressure air inlets of said pre-cooling and intercooling heat exchangers to provide ram air from the atmosphere thereto, said air conditioning and pressurization system being constructed and adapted so that pressurized air can be provided to the high pressure side of said pre-cooling heat exchanger and cooled therein and transferred therefrom through said first mixing valve and said compressor of said first turbine-compressor unit to the high pressure side of said intercooling heat exchanger for further cooling therein, air from the high pressure side of said intercooling heat exchanger being provided through the high pressure side of said recuperating heat exchanger and said second mixing valve to said turbine of said first turbine-compressor unit for further cooling therein, air leaving said turbine of unit first turbine-compressor unit being discharged through said water separator into the cabin or the like to be conditioned, air leaving the cabin to be conditioned passing through said regulating valve and said conduit means to said recuperating heat exchanger to cool air passing through the high pressure side thereof, ram air being provided to the low pressure sides of said pre-cooling and intercooling heat exchangers.

22. An air cycle air conditioning and pressurization system for aircraft and the like comprising, in combination, an air-to-air pre-cooling heat exchanger having a housing with a low pressure air inlet at one end thereof and a low pressure air outlet at the other end thereof and having a high pressure air inlet and a high pressure air outlet intermediate the ends thereof, a plurality of tubes each connected in one end portion to said high pressure air inlet of said heat exchanger and having the other end portion thereof connected to said high pressure air outlet of said heat exchanger with the intermediate portions of said tube being positioned across the intermediate portion of said housing of said heat exchanger, a high pressure air inlet conduit secured in one end portion to a high pressure air inlet of said heat exchanger and connectible in the other end portion to a source of pressurized air, a pressure limiting valve in said high pressure air inlet conduit operable to limit the maximum pressure exerted on said system, a first proportional-type mixing valve having two air inlets and an air outlet with one of said inlets of said valve being operatively connected to said high pressure air outlet of said pre-cooling heat exchanger, bypass conduit means connected in the end portions to the other of said air inlets of said first mixing valve and to said high pressure air inlet conduit between said heat exchanger and said valve in said conduit with said mixing valve being operable to pass therethrough air from said heat exchanger, from said high pressure air inlet conduit, or mix air from said heat exchanger and said high pressure air inlet conduit and discharge same through said outlet of said mixing valve, a first turbine-compressor unit having a housing with a compressor air inlet and a compressor air outlet and having a turbine air inlet and a turbine air outlet, said compressor air inlet being operatively connected to said outlet of said first mixing valve to receive high pressure air therefrom, a shaft rotatably mounted in said housing of said turbine-compressor unit and having a plurality of vanes connected to one end portion of said shaft for rotation therewith with said vanes being shaped and positioned to receive air from said compressor air inlet and compress and discharge same from said compressor air outlet during rotation of said shaft, a plurality of blades connected to the other end portion of said shaft for rotation with such shaft, said blades being positioned to be engaged by air entering said turbine air inlet to cause rotation of said blades and said shaft with air leaving said outlet through said turbine air outlet, air passing through said turbine being expanded therein and discharged at a temperature and pressure lower than the temperature and pressure of air entering said turbine, an air-to-air intercooling heat exchanger having a housing with a low pressure air inlet at one end thereof and a low pressure air outlet at the other end thereof and having a high pressure air inlet and a high pressure air outlet intermediate the ends thereof, a plurality of tubes each connected in one end portion to said high pressure air inlet of said intercooling heat exchanger and having the other end portion thereof connected to said high pressure air outlet of said intercooling heat exchanger with the intermediate portions of said tubes being positioned across the intermediate portion of said housing of said intercooling heat exchanger, conduit means operatively connecting said compressor air outlet of said first turbine-compressor unit to said high pressure air inlet of said intercooling heat exchanger, a second proportional type mixing valve having two air inlets and an air outlet with one of said inlets of said valve being operatively connected to said compressor air outlet of said turbine-compressor unit and the other of said inlets being operatively connected to said high pressure air outlet of said intercooling heat exchanger, said outlet of said second mixing valve being operatively connected to said turbine air inlet of said first turbine-compressor unit, said second mixing valve being operable to receive and pass therethrough air from said compressor of said first turbine-compressor unit, from said high pressure outlet of said intercooling heat exchanger, or from said intercooling heat exchanger and said compressor, said turbine inlet of said first turbine-compressor unit receiving air from said outlet of said second proportional type mixing valve with pressurized air entering said turbine engaging said blades and causing rotation of said shaft to operate said compressor and with air being discharged from said turbine air outlet of said first turbine-compressor unit at a temperature and pressure lower than the temperature and pressure of the incoming air, a water separator having an air inlet operatively connected to said turbine air outlet of said turbine-compressor unit and an air outlet connectible to an airplane cabin or the like to be conditioned, means positioned in said water separator operable to remove water from air passing therethrough, a cabin air outlet conduit having one end portion thereof positionable in the aircraft cabin or the like to be conditioned with the other end portion thereof being positioned to discharge air overboard, a cabin pressure regulating valve secured to said one end portion of said cabin air outlet conduit with said regulating valve being openable at a pre-determined pressure to exhaust air from said cabin of said aircraft and closeable at lower pressures to maintain a desired pressure in said cabin, a second turbine-compressor unit having a housing with a turbine air inlet and a turbine air outlet and having a compressor air inlet and a compressor air outlet, a ram air inlet conduit connected in one end portion to said turbine air inlet of said housing of said second turbine-compressor unit and having the other end portion thereof positionable in an aircraft or the like to receive ram air during flight of said aircraft, a conduit connected in the end portions to said turbine air outlet of said second turbine-compressor unit and to said low pressure air inlets of said pre-cooling heat exchanger and said intercooling heat exchanger, bypass conduit means connected to said turbine air outlet of said second turbine-compressor unit and to said ram air inlet conduit, control valve means positioned in said last-named bypass conduit operable to regulate flow of ram air through said turbine of said second turbine-compressor unit, another conduit operatively connected in one end portion to said low pressure air outlet of said pre-cooling heat exchanger and said low pressure air outlet of said intercooling heat exchanger and being connected in an intermediate portion to said compressor air inlet of said second turbine-compressor unit, a control valve in said last-named conduit downstream of said compressor air inlet of said second turbine-compressor unit and operable to regulate flow of air through said compressor of said second turbine-compressor unit, thermostat operated valve control means operatively connected to said mixing valves and said control valves, said valve control means having a regulator positionable in the cabin to be conditioned and temperature sensing means positioned at said turbine air outlet of said first turbine-compressor unit, said valve control means being operable in response to said regulator and said temperature sensing means to regulate operation of said mixing valves and said control valves, said air conditioning and pressurization system being constructed and adapted so that pressurized air from said pressurized air inlet conduit can be passed through said tubes in said pre-cooling heat exchanger for cooling therein and mixed with air from said high pressure air inlet conduit and transferred to said compressor of said first turbine-compressor used for compression therein with air being discharged therefrom and passed through the high pressure side of said intercooling heat exchanger for cooling therein, the resulting cooled air being expanded in said turbine of said first turbine-compressor unit to cause rotation of said shaft therein and expansion and cooling of air passing therethrough with the resulting cool air being passed through said water separator for removal of water therefrom and discharged into the cabin to be conditioned, air from said cabin passing through said pressure regulating valve and being dumped overboard, ram air being provided to said turbine of said second turbine-compressor unit for expansion and cooling therein with the resulting low pressure air passing through the low pressure side of said pre-cooling and intercooling heat exchangers and being discharged through said compressor of said second turbine-compressor unit to the atmosphere.

23. An air-cycle air conditioning and pressurization system for aircraft and the like comprising, in combination, an air-to-air pre-cooling exchanger having low pressure air inlet and a low pressure air outlet and having a high pressure air inlet and a high pressure air outlet, tube means positioned in said heat exchanger and connected in the end portions to said high pressure air inlet and said high pressure air outlet, a first mixing valve having two air inlets and an air outlet with one of said inlets being operatively connected to said high pressure air outlet of said heat exchanger and with the other of said inlets being operatively connectible to a source of air, a first turbine-compressor unit having turbine and compressor air inlets and air outlets with said compressor air inlet being operatively connected to said outlet of said mixing valve, an air-to-air intercooling heat exchanger having a low pressure air inlet and a low pressure air outlet and having a high pressure air inlet and a high pressure air outlet, tube means positioned in said intercooling heat exchanger and connected in the end portions to said high pressure air inlet and said high pressure air outlet thereof, said high pressure air inlet of said intercooling heat exchanger being operatively connected to said compressor air outlet of said turbine-compressor unit, a second mixing valve having two air inlets and an air outlet with one of said air inlets of said valve being operatively connected to said compressor air outlet and with said outlet of said second mixing valve being operatively connected to said turbine air inlet of said turbine-compressor unit, an air-to-air recuperating heat exchanger having a low pressure air inlet and a low pressure air outlet and having a high pressure air inlet and a high pressure air outlet, tube means positioned in said recuperating heat exchanger and having end portions thereof operatively connected to said high pressure air inlet and said high pressure air outlet, said high pressure air inlet of said recuperating heat exchanger being operatively connected to said high pressure air outlet of said intercooling heat exchanger, said high pressure air outlet of said recuperating heat exchanger being operatively connected to the other of said air inlets of said second mixing valve, water separator means having an air inlet operatively connected to said turbine air outlet of said turbine-compressor unit with said water separating means having an air outlet operatively connectible to an airplane cabin or the like to be conditioned, cabin air outlet conduit means having one end portion positionable in the aircraft cabin or the like to be conditioned, cabin pressure regulating valve means secured to said one end portion of said cabin air outlet conduit means, a second turbine-compressor unit having turbine and compressor air inlets and air outlets, conduit means connected to said turbine air inlet of said second turbine-compressor unit to provide ram air from the atmosphere thereto, said turbine air outlet of said second turbine-compressor unit being operatively connected to said low pressure air inlets of said pre-cooling and intercooling heat exchangers, and the low pressure air outlets of said pre-cooling and intercooling heat exchangers being operatively connected to said compressor air inlet of said second turbine-compressor unit, said air conditioning and pressurization system being constructed and adapted so that pressurized air can be provided to the high pressure side of said pre-cooling heat exchanger and cooled therein and transferred therefrom through said first mixing valve and said compressor of said first turbine-compressor unit to the high pressure side of said intercooling heat exchanger for further cooling therein, air from the high pressure side of said intercooling heat exchanger being provided through the high pressure side of said recuperating heat exchanger and said second mixing valve to said turbine of said first turbine-compressor unit for further cooling therein, air leaving said turbine of said first turbine-compressor unit being discharged through said water separator into the cabin or the like to be conditioned, air leaving the cabin to be conditioned passing through said regulating valve to control pressure in the cabin, ram air being provided to said turbine of said second turbine-compressor unit for expansion and cooling therein and transfer therefrom through the low pressure sides of said pre-cooling and intercooling heat exchangers and transferred therefrom to the compressor of said second turbine-compressor unit.

24. An air cycle air conditioning and pressurization system for aircraft and the like comprising, in combination, an air-to-air pre-cooling heat exchanger having a housing with a low pressure air inlet at one end thereof and a low pressure air outlet at the other end thereof and having a high pressure air inlet and a high pressure air outlet intermediate the ends thereof, a plurality of tubes each connected in one end portion to said high pressure air inlet of said heat exchanger and having the other end portion thereof connected to said high pressure air outlet of said heat exchanger with the intermediate portions of said tube being positioned across the intermediate portion of said housing of said heat exchanger, a high pressure air inlet conduit secured in one end portion to said high pressure air inlet of said heat exchanger and connectible in other end portion to a source of pressurized air, a pressure limiting valve in said high pressure air inlet conduit operable to limit the maximum pressure exerted on said system, a first proportional type mixing valve having two air inlets and an air outlet with one of said inlets of said valve being operatively connected to said high pressure air outlet of said pre-cooling heat exchanger, bypass conduit means connected in the end portions to the other of said air inlets of said first mixing valve and to said high pressure air inlet conduit between said heat exchanger and said valve in said conduit with said mixing valve being operable to pass therethrough air from said heat exchanger, from said high pressure air inlet conduit, or mix air from said heat exchanger and said high pressure air inlet conduit and discharge same through said outlet of said mixing valve, a turbine-compressor unit having a housing with a compressor air inlet and a compressor air outlet and having a turbine air inlet and a turbine air outlet, said compressor air inlet being operatively connected to said outlet of said first mixing valve to receive high pressure air therefrom, a shaft rotatably mounted in said housing of said turbine-compressor unit and having a plurality of vanes connected to one end portion of said shaft for rotation therewith with said vanes being shaped and positioned to receive air from said compressor air inlet and compress and discharge same from said compressor air outlet during rotation of said shaft, a plurality of blades connected to the other end portion of said shaft for rotation with such shaft, said blades being positioned to be engaged by air entering said turbine air inlet to cause rotation of said blades and said shaft with air leaving said outlet through said turbine air outlet, air passing through said turbine being expanded therein and discharged at a temperature and pressure lower than the temperature and pressure of air entering said turbine, an air-to-air recuperating heat exchanger having a housing with a low pressure air inlet at one end thereof and a low pressure air outlet at the other end thereof and having a high pressure air inlet and a high pressure air outlet intermediate the ends thereof, a plurality of tubes each connected in one end portion to said high pressure air inlet of said recuperating heat exchanger and having the other end portion thereof connected to said high pressure air outlet of said recuperating heat exchanger with the intermediate portions of said tubes being positioned across the intermediate portion of said housing of said recuperating heat exchanger, conduit means operatively connecting said compressor air outlet of said turbine-compressor unit to said high pressure air inlet of said recuperating heat exchanger, a second proportional type mixing valve having two air inlets and an air outlet with one of said inlets of said valve being operatively connected to said compressor air outlet of said turbine-compressor unit and with said outlet of said valve being operatively connected to said turbine air inlet of said turbine-compressor unit, said high pressure air outlet of said recuperating heat exchanger being operatively connected to the other of said air inlets of said second proportional type mixing valve, said second mixing valve being operable to receive and pass therethrough air from said compressor of said first turbine-compressor unit, from said high pressure outlet of said recuperating heat exchanger, or from said recuperating heat exchanger and said compressor, said turbine inlet of said turbine-compressor unit receiving air from said outlet of said second proportional type mixing valve with pressurized air entering said turbine engaging said blades and causing rotation of said shaft to operate said compressor and with air being discharged from said turbine air outlet of said turbine-compressor unit at a temperature and pressure lower than the temperature and pressure of the incoming air, a water separator having an air inlet operatively connected to said turbine air outlet of said turbine-compressor unit and an air outlet connectible to an airplane cabin or the like to be conditioned, means positioned in said water separator operable to remove water from air passing therethrough, a cabin air outlet conduit having one end portion thereof positionable in the aircraft cabin or the like to be conditioned, a cabin pressure regulating valve secured to said one end portion of said cabin air outlet conduit with said regulating valve being openable at a pre-determined pressure to exhaust air from said cabin of said aircraft and closable at lower pressures to maintain a desired pressure in said cabin, the other end portion of said cabin air outlet conduit being operatively connected to said low pressure air inlet of said recuperating heat exchanger, a ram air inlet conduit connected in one end portion to said low pressure air inlet of said housing of said pre-cooling heat exchanger and having the other end portion thereof positionable in an aircraft or the like to receive ram air during flight of said aircraft, thermostat operated valve control means operatively connected to said mixing valves, said valve control means having a regulator positionable in the cabin to be conditioned and temperature sensing means positioned at said turbine air outlet of said turbine-compressor unit, said valve control means being operable in response to said regulator and said temperature sensing means to regulate operation of said mixing valves, said air conditioning and pressurization system being constructed and adapted so that pressurized air from said pressurized air inlet conduit can be passed through said tubes in said pre-cooling heat exchanger for cooling therein and mixed with air from said high pressure air inlet conduit and transferred to said compressor of said turbine-compressor used for compression therein with air being discharged therefrom and passed through the high pressure side of said recuperating heat exchanger for further cooling therein, the resulting cooled air being expanded in said turbine of said first turbine-compressor unit to cause rotation of said shaft therein and expansion and cooling of air passing therethrough with the resulting cool air being passed through said water separator for removal of water therefrom and discharged into the cabin to be conditioned, air from said cabin passing through the low pressure side of said recuperating heat exchanger, and ram air being provided to the low pressure side of said precooling heat exchanger.

25. An air-cycle air conditioning and pressurization system for aircraft and the like comprising, in combination, and air-to-air pre-cooling heat exchanger having low pressure air inlet and a low pressure air outlet and having a high pressure air inlet and a high pressure air outlet, tube means positioned in said heat exchanger and connected in the end portions to said high pressure air inlet and said high pressure air outlet, a first mixing valve having two air inlets and an air outlet with one of said inlets being operatively connected to said high pressure air outlet of said heat exchanger and with the other of said inlets being operatively connectible to a source of air, a turbine-compressor unit having turbine and compressor air inlets and air outlets with said compressor air inlet being operatively connected to said outlet of said mixing valve, a second mixing valve having two air inlets and an air outlet with one of said air inlets of said valve being operatively connected to said compressor air outlet and with said outlet of said second mixing valve being operatively connected to said turbine air inlet of said turbine-compressor unit, an air-to-air recuperating heat exchanger having a low pressure air inlet and a low pressure air outlet and having a high pressure air inlet and a high pressure air outlet, tube means positioned in said recuperating heat exchanger and having end portions thereof operatively connected to said high pressure air inlet and said high pressure air outlet, said high pressure air inlet of said recuperating heat exchanger being operatively connected to said compressor air outlet of said turbine-compressor unit, said high pressure air outlet of said recuperating heat exchanger being operatively connected to the other of said air inlets of said second mixing valve, water separator means having an air inlet operatively connected to said turbine air outlet of said turbine-compressor unit with said water separating means having an air outlet operatively connectible to an airplane cabin or the like to be conditioned, cabin air outlet conduit means having one end portion positionable in the aircraft cabin or the like to be conditioned and having the other end portion thereof operatively connected to said low pressure air inlet of said recuperating heat exchanger, cabin pressure regulating valve means secured to said one end portion of said cabin air outlet conduit means, conduit means connected to said low pressure air inlet of said pre-cooling heat exchanger to provide ram air from the atmosphere thereto, said air conditioning and pressurization system being constructed and adapted so that pressurized air can be provided to the high pressure side of said pre-cooling heat exchanger and cooled therein and transferred therefrom through said first mixing valve and said compressor of said turbine-compressor unit to the high pressure side of said recuperating heat exchanger for cooling therein air from said recuperating heat exchanger passing through said second mixing valve to said turbine of said turbine-compressor unit for further cooling therein, air leaving said turbine of said turbine-compressor unit being discharged through said water separator into the cabin or the like to be conditioned, air leaving the cabin to be conditioned passing through said regulating valve and said conduit means to the low pressure side of said recuperating heat exchanger to cool air passing through the high pressure side thereof, and ram air being provided to the low pressure sides of said pre-cooling and intercooling heat exchangers.

26. A vapor cycle air conditioning and pressurization system for aircraft and the like comprising, in combination, an air-to-air pre-cooling heat exchanger having a housing with a low pressure air inlet at one end thereof and a low pressure air outlet at the other end thereof and having a high pressure air inlet and a high pressure air outlet intermediate the ends thereof, a plurality of tubes each having one end portion connected to said high pressure air inlet of said heat exchanger and having the other end portion thereof connected to said high pressure air outlet of said heat exchanger with the intermediate portion of said tubes being positioned across the intermediate portion of said housing of said heat exchanger, a high pressure air inlet conduit connected in one end portion to said high pressure air inlet of said heat exchanger and connectible in the other end portion to a source of pressurized air, a pressure limiting valve in said high pressure air inlet conduit operable to limit the maximum pressure of air supplied to said heat exchanger, a proportional type mixing valve having two air inlets and an air outlet with one of said air inlets of said valve being operatively connected to said high pressure air outlet of said pre-cooling heat exchanger, first bypass conduit means connected in one end portion to the other of said air inlets of said mixing valve and connected in the other end portion to said high pressure air inlet conduit between said pressure limiting valve and said heat exchanger with said mixing valve being operable to pass air therethrough from said bypass conduit means or said heat exchanger, a first turbine-compressor unit having a housing with a compressor vapor inlet and a compressor vapor outlet and having a turbine air inlet and a turbine air outlet, a shaft mounted in said housing of said turbine-compressor unit and having a plurality of vanes connected to one end portion of said shaft and a plurality of blades connected to the other end portion of said shaft, said turbine air inlet being operatively connected to said air outlet of said mixing valve, a cabin air inlet conduit operatively connected in one end portion to said turbine air outlet and operatively connectible in the other end portion to the cabin or the like to be conditioned, second bypass conduit means operatively connected in the end portions to said air outlet of said mixing valve and said cabin air inlet conduit, a throttling valve in said second bypass conduit means operable to regulate flow of air around said turbine of turbine-compressor unit, a refrigerant condensing heat exchanger, having a high pressure side with an inlet and an outlet and a low pressure side with an inlet and an outlet, said inlet of said high pressure side of said refrigerant condensing heat exchanger being operatively connected to said compressor vapor outlet to receive vapor under pressure therefrom and cool and condense same therein, a refrigerant evaporating heat exchanger having a high pressure side with an inlet and an outlet and a low pressure side with an inlet and an outlet, said outlet of said high pressure side of said refrigerant evaporating heat exchanger being operatively connected to said compressor vapor inlet, said outlet of said high pressure side of said refrigerant condensing heat exchanger being operatively connected to said inlet of said high pressure side of said refrigerant evaporating heat exchanger to provide refrigerant liquid thereto for expansion therein, a liquid refrigerant throttling expander valve positioned between said outlet of said high pressure side of said refrigerant condensing heat exchanger and said inlet of said high pressure side of said refrigerant evaporating heat exchanger to control passage of liquid therebetween, a first cabin air outlet conduit having one end portion positionable in a cabin or the like, said low pressure outlet of said refrigerant evaporating heat exchanger being connected to said cabin air inlet conduit means and said low pressure inlet of said refrigerant evaporating heat exchanger being operatively connected to said cabin air outlet conduit to recirculate air from the cabin through the low pressure side of said refrigerant evaporating heat exchanger for cooling therein and return to the cabin, an air driven blower fan mounted at said low pressure inlet of said refrigerant evaporating heat exchanger and third bypass conduit means operatively connected in one end portion to said high pressure air outlet of said pre-cooling heat exchanger and connected in the other end portion to said blower fan at said refrigerant evaporating heat exchanger to provide air thereto drive said blower fan, a second cabin air outlet conduit having one end portion positionable in the cabin to be conditioned and the other end portion positioned to discharge cabin exhaust air overboard the aircraft, a pressure regulating valve connected to said one end portion of said second cabin air outlet conduit, a second turbine-compressor unit having a housing with a turbine air inlet and a turbine air outlet and having a compressor air inlet and a compressor air outlet, a ram air inlet conduit connected in one end portion to said turbine air inlet of said second turbine-compressor unit and having the other end portion positionable to receive ram air, said turbine air outlet of said second turbine-compressor unit being operatively connected to said low pressure air inlets of said pre-cooling heat exchanger and said refrigerant condensing heat exchanger to provide air thereto, said compressor air inlet of said second turbine-compressor unit being operatively connected to said low pressure air outlet of said pre-cooling heat exchanger and said low pressure outlet of said refrigerant condensing heat exchanger to receive air therefrom, said air conditioning and pressurization system being constructed and adapted so that high pressure air can be provided through said pre-cooling heat exchanger and mixed with bypass air in said mixing valve and transferred through said turbine of said first turbine-compressor unit for expansion and cooling therein and subsequently transferred to the cabin or the like to be conditioned, air from the cabin to be conditioned passing through said first cabin air outlet conduit and through the low pressure side of said refrigerant evaporating heat exchanger for further cooling and recirculating through the cabin, and with ram air entering said ram air inlet conduit being cooled in said turbine of said second-turbine compressor unit and provided through the low pressure sides of said pre-cooling heat exchanger and said refrigerant condensing heat exchanger for cooling of high pressure fluids therein.

27. A vapor cycle air conditioning system for aircraft and the like comprising, in combination, first heat exchanger means having a high pressure side and a low pressure side with said high pressure side being operatively connected to a source of pressurized fluid, expansion cooling means operatively connected to said high pressure side of said heat exchanger means to receive pressurized fluid therefrom and being operable to expand and cool the fluid, said expansion cooling means being operatively connected to a cabin or the like to be conditioned to provide cooled fluid thereto, refrigerant evaporating heat exchanger means having a vapor side and a low pressure side, means connected to said low pressure side of said refrigerant evaporating heat exchanger means operable to circulate fluid from the cabin through said low pressure side of said refrigerant evaporating heat exchanger means and return the fluid to the cabin, refrigerant vapor compressor means operatively connected to said vapor side of said refrigerant evaporating heat exchanger means to receive vaporized refrigerant therefrom and compress same, and refrigerant condensing heat exchanger means having a vapor side and a low pressure side with said vapor side being operatively connected to said vapor compressor means to receive compressed vapor therefrom and condense same therein, and means connected to said low pressure sides of said first heat exchanger means and said refrigerant condenser heat exchanger means to cool high pressure fluid and condense to vapor therein.

28. An air conditioning system comprising, in combination, heat exchange means having a high pressure side in heat exchange relation with a low pressure side, said high pressure side of said heat exchange means being connectible to a source of fluid under pressure, expansion cooling means having an inlet and an outlet with said inlet being operatively connected to said high pressure side of said heat exchange means to receive fluid therefrom for cooling in said expansion cooling means and with said outlet being operatively connectible to an enclosure to be conditioned, and means operatively connected to said low pressure side of said heat exchange means to provide a fluid thereto.

29. The air conditioning system as defined in claim 28 wherein said means operatively connected to said low pressure side of said heat exchange means to provide a fluid thereto is connectible to the enclosure to be conditioned to receive fluid therefrom for transfer of same to said low pressure side of said heat exchanger means.

30. The air conditioning system as defined in claim 28 wherein said means operatively connected to said low pressure side of said heat exchanger means to provide a fluid thereto includes second expansion cooling means operable to expand and cool a fluid for transfer to said low pressure side of said heat exchanger means.

31. The method of controlling the temperature and pressure of air in an aircraft cabin or the like comprising the steps of, drawing air from the atmosphere into a compressor and compressing the air therein and discharging same therefrom at an increased temperature and pressure, passing the compressed air through the high pressure side of a heat exchanger while simultaneously passing relatively cool air through the low pressure side thereof to cool the high pressure air, passing the resulting high pressure air through the high pressure side of a second heat exchanger while simultaneously passing cooling air through the low pressure side thereof to further cool the high pressure air, mixing the cooled high pressure air with other high pressure air in response to temperature conditions in the cabin to be conditioned, expanding the resulting cooled high pressure air in a turbine to decrease the pressure and further decrease the temperature of the air with the air being discharged from the turbine at approximately cabin pressure, passing the resulting cooled air through a water separator to remove water therefrom, directing the cooled and dried air into the cabin or the like to be conditioned, passing exhaust air from the cabin into the inlet of a second turbine, expanding the cabin exhaust air in the second turbine to decrease the temperature and pressure thereof and passing the resulting cooled exhaust air through the low pressure side of the second heat exchanger to cool high pressure air therethrough, providing ram air from the atmosphere to a third turbine and expanding same therein to decrease the temperature and pressure thereof, and passing the resulting cool ram air through the low pressure side of the first-named heat exchanger to cool the high pressure air therein.

32. The method of controlling the temperature and pressure of air in an aircraft cabin or the like comprising the steps of, passing air under pressure through the high pressure side of a heat exchanger while simultaneously passing relatively cool air through the low pressure side thereof to thereby cool the high pressure air, passing the resulting high pressure air through the high pressure side of a second heat exchanger while simultaneously passing relatively cool air through the low pressure side thereof to further cool the high pressure air in response to temperature conditions in the cabin or the like to be conditioned, expanding the resulting cool high pressure air to decrease the pressure and further decrease the temperature thereof, passing the resulting cooled air through water separator means to remove water therefrom, directing the cooled and dried air into the cabin or the like to be conditioned, passing exhaust air from the cabin into second expansion cooling means to expand and cool the cabin exhaust air, and passing the resulting cooled exhaust air through the low pressure side of the second heat exchanger to cool the high pressure air passing therethrough.

33. The method of controlling the temperature of air provided to an aircraft cabin or the like comprising the steps of, passing pressurized air through the high pressure side of a heat exchanger while simultaneously passing relatively cool air through the low pressure side thereof to cool the high pressure air, passing the resulting cooled high pressure air through the high pressure side of a second heat exchanger while simultaneously passing cooling air through the low pressure side thereof to further cool the high pressure air, mixing the resulting cooled high pressure air with other high pressure air in response to temperature conditions in the cabin to be conditioned, expanding the resulting cooled high pressure air in expansion means to decrease the pressure and further decrease the temperature of the air, passing the resulting cooled air through water separator means to remove water therefrom, directing the cooled and dried air into the cabin or the like to be conditioned, exhausting air from the cabin through the low pressure side of one of the heat exchangers, expanding ram air from the atmosphere in second expansion means to decrease the temperature and pressure thereof, and passing the resulting cooled ram air through the low pressure side of the other of the heat exchangers to cool the high pressure air therein.

34. The method of controlling the temperature and pressure of air in an aircraft cabin or the like comprising the steps of, drawing air from the atmosphere into a compressor and compressing the air therein to increase the temperature and pressure thereof, transferring at least a portion of the resulting compressed air through the high pressure side of a first heat exchanger to cool the high pressure air, mixing the cooled air with other high pressure air in response to temperature conditions in the cabin to be conditioned, compressing the resulting high pressure air to further increase the pressure and temperature thereof, transferring the compressed air through the high pressure side of the second heat exchanger to further cool the high pressure air, passing the resulting cooled air through the high pressure side of a third heat exchanger to cool the high pressure air, mixing the resulting high pressure air with other high pressure air in response to the temperature in the cabin to be conditioned, passing the resulting air through an expansion turbine to reduce the temperature and pressure thereof with the air leaving the turbine being at substantially cabin pressure, passing the resulting cooled air through a water separator to remove moisture therefrom and directing the cooled and dried air into the cabin or the like to be conditioned, passing exhaust air from the cabin through a pressure relief valve and into a second turbine to cool and decrease the pressure of the cabin exhaust air, directing the resulting cooled exhaust air through the low pressure side of the third heat exchanger to cool high pressure air passing therethrough, directing ram air from the atmosphere to a third expansion turbine and expanding and cooling the ram air, and directing the resulting cooled ram air through the low pressure side of the first and second heat exchangers to cool high pressure air passing therethrough.

35. The method of controlling the temperature and pressure of air in an aircraft cabin or the like comprising the steps of, passing high pressure air through the high pressure side of a first heat exchanger while simultaneously passing cool air through the low pressure side thereof to thereby cool the high pressure air, mixing the cooled high pressure air with other high pressure air in response to temperature conditions in the cabin to be conditioned, compressing the resulting air mixture to further increase the pressure and temperature thereof, passing the compressed air through the high pressure side of a second heat exchanger while simultaneously passing cool air through the low pressure side thereof to thereby cool the high pressure air, passing the resulting cooled air through the high pressure side of a third heat exchanger while simultaneously passing relatively cool air through the low pressure side thereof to further cool the high pressure air, mixing the resulting high pressure air with other high pressure air in response to the temperature in the cabin to be conditioned, expanding the resulting mixture of air to reduce the temperature and pressure thereof, passing the resulting cooled air through water separator means to remove water therefrom, and directing the resulting cooled and dried air into the cabin or the like to be conditioned, regulating the pressure of exhaust air leaving the cabin, transferring the exhaust air from the cabin through expansion means to cool and lower the pressure of the exhaust air, and transferring the resulting cooled exhaust air through the low pressure side of the third heat exchanger to cool high pressure air passing therethrough.

36. The method of controlling the temperature of air in an aircraft cabin or the like comprising the steps of, passing high pressure air through the high pressure side of a heat exchanger while simultaneously passing relatively cool air through low pressure side thereof to thereby cool the high pressure air, mixing the cooled high pressure air with other air in response to temperature conditions in the cabin to be conditioned, compressing the resulting mixture of air to increase the temperature and pressure of the air, passing the resulting compressed air through the high pressure side of a second heat exchanger while simultaneously passing relatively cool air to the low pressure side thereof to cool the high pressure air, passing the resulting high pressure air through the high pressure side of a third heat exchanger while simultaneously passing relatively cool air through the low pressure side thereof to further cool the high pressure air, mixing the resulting cooled high pressure air with other high pressure air in response to temperature conditions in the cabin to be conditioned, expanding the resulting cooled high pressure air to approximately cabin pressure to further cool the air, passing the resulting cooled air through water separator means, remove moisture therefrom and discharging the resulting cooled and dry air into the cabin or the like to be conditioned, exhausting air from the cabin or the like through the low pressure side of the third heat exchanger to cool high pressure air passing therethrough.

37. The method of controlling the temperature of a fluid in an aircraft cabin or the like comprising the steps of, passing high pressure fluid through the high pressure side of heat exchanger means while simultaneously passing relatively cool fluid through the low pressure side thereof to thereby cool the high pressure air, mixing the resulting high pressure fluid with other fluid in response to the temperature in the cabin to be conditioned, compressing the resulting mixture of fluids, directing the resulting compressed fluid through the high pressure side of second heat exchanger means for cooling therein, mixing the resulting cooled fluid with other high pressure fluid in response to temperature conditions in the cabin to be conditioned, expanding the resulting fluid to reduce the temperature and pressure thereof, directing the resulting cooled fluid into the cabin or the like to be conditioned, and exhausting fluid from the cabin through the low pressure side of one of the heat exchanger means to cool high pressure air therein.

38. The method of controlling the temperature and pressure of air in an aircraft cabin or the like comprising the steps of, compressing air from the atmosphere and directing at least a portion thereof through the high pressure side of heat exchanger means for cooling therein, mixing the air from the heat exchanger means with another stream of high pressure air at a different temperature, expanding the resulting mixture of high pressure air to decrease the temperature and pressure of the air and directing the resulting cooled air into the cabin or the like to be conditioned, directing pressurized air from the heat exchanger to a blower to drive the blower while simultaneously recirculating at least a portion of the cabin air through the blower and passing the resulting mixture of air through the low pressure side of a refrigerant evaporating heat exchanger for cooling therein, comprising a refrigerant vapor and passing same through the vapor side of a refrigerant condensing heat exchanger while simultaneously directing relatively cool fluid through the low pressure side thereof to thereby provide a liquid refrigerant, passing the liquid refrigerant through a throttling expander and into the refrigerant side of the refrigerant evaporating heat exchanger with the refrigerant removing heat from the air passing through the low pressure side thereof to thereby vaporize the refrigerant, and transferring the vaporized refrigerant to the compressor for subsequent compression and recirculation through the refrigerant system, directing ram air through an expansion turbine to expand and cool the ram air, directing the cooled ram air through the low pressure side of the heat exchanger means and the low pressure side of the refrigerant condensing heat exchanger, and exhausting air from the cabin or the like to be conditioned at a predetermined pressure to maintain the desired air pressure in the cabin.

References Cited by the Examiner
UNITED STATES PATENTS

| | | | |
|---|---|---|---|
| 2,777,301 | 1/1957 | Kuhn | 165—15 |
| 2,937,011 | 5/1960 | Brahm | 165—15 |
| 3,083,546 | 4/1963 | Turek | 62—86 |

ROBERT A. O'LEARY, *Primary Examiner.*

CHARLES SUKALO, *Examiner.*